United States Patent
Irie et al.

(10) Patent No.: US 11,183,962 B2
(45) Date of Patent: Nov. 23, 2021

(54) DRIVING SYSTEM

(71) Applicant: TOYOTA JIDOSHA KABUSHIKI KAISHA, Toyota (JP)

(72) Inventors: Koji Irie, Toyota (JP); Hiroyuki Oyanagi, Toyota (JP); Toshifumi Yamakawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/782,660

(22) Filed: Feb. 5, 2020

(65) Prior Publication Data
US 2020/0259445 A1    Aug. 13, 2020

(30) Foreign Application Priority Data

Feb. 12, 2019   (JP) .............................. JP2019-022724

(51) Int. Cl.
*H02P 27/08*       (2006.01)
*H02P 23/14*       (2006.01)
*H02M 3/158*       (2006.01)
*H02M 7/5387*      (2007.01)

(52) U.S. Cl.
CPC ............ *H02P 27/08* (2013.01); *H02M 3/158* (2013.01); *H02M 7/53871* (2013.01); *H02P 23/14* (2013.01); *H02P 2201/09* (2013.01)

(58) Field of Classification Search
CPC ...... H02P 1/00; H02P 1/04; H02P 1/16; H02P 1/163; H02P 1/18; H02P 1/24; H02P 1/26; H02P 1/42; H02P 1/46; H02P 1/54; H02P 3/00; H02P 6/00; H02P 6/007; H02P 6/10; H02P 6/12; H02P 21/00; H02P 21/003; H02P 21/14; H02P 27/08; H02P 2201/09; H02P 23/14; H02P 21/20; H02P 21/34; H02P 23/00; H02P 23/0004; H02P 23/07; H02P 23/12; H02P 25/04; H02P 27/00; H02P 27/04; H02P 27/06; H02P 29/50;
(Continued)

(56) References Cited

U.S. PATENT DOCUMENTS

| 2004/0232863 | A1* | 11/2004 | Takahashi ............. H02M 1/425 318/432 |
| 2015/0229247 | A1 | 8/2015 | Nakai et al. |
| 2016/0204729 | A1 | 7/2016 | Yamakawa et al. |

FOREIGN PATENT DOCUMENTS

| JP | 2015-056919 A | 3/2015 |
| JP | 2015-154532 A | 8/2015 |

* cited by examiner

*Primary Examiner* — Antony M Paul
(74) *Attorney, Agent, or Firm* — Sughrue Mion, PLLC

(57) ABSTRACT

There is provided a driving system including a motor; an inverter configured to drive the motor; a power storage device connected with the inverter via a power line; a smoothing capacitor mounted to the power line; a voltage sensor configured to detect a voltage of the smoothing capacitor; a current sensor configured to detect an electric current of each phase of the motor; and a control device configured to control the inverter, based on a detected value of the current sensor. The control device performs Fourier series expansion of a detected value of the voltage sensor to calculate an electrical first variation component of the voltage of the smoothing capacitor. The control device controls the inverter, such that the electrical first variation component of the voltage of the smoothing capacitor becomes equal to a value 0.

14 Claims, 43 Drawing Sheets

(58) Field of Classification Search
CPC .... H02M 7/53871; H02M 3/158; H02M 3/07; H02M 3/18
See application file for complete search history.

DRIVING SYSTEM

The present disclosure claims priority to Japanese Patent Application No. 2019-022724 filed on Feb. 12, 2019, which is incorporated herein by reference in its entirety including specification, drawings and claims.

TECHNICAL FIELD

The present disclosure relates to a driving system.

BACKGROUND

A proposed configuration of a driving system includes a motor, an inverter configured to drive the motor, a smoothing capacitor mounted to a direct current side of the inverter, current sensors configured to detect electric currents of respective phases of the motor, and a voltage sensor configured to detect a voltage of the smoothing capacitor (as described in, for example, JP 2015-56919A). This driving system first specifies a target phase that is a phase of a second phase voltage command signal having a largest difference from a first phase voltage command signal having a signal level that is neither a maximum nor a minimum, based on three phase voltage command signals generated from the detected values of the current sensors. The driving system subsequently uses a BPF (band pass filter) to extract a voltage component of an identical frequency that is identical with a frequency of the three phase voltage command signals, from the detected value of the voltage sensor. The driving system then corrects the detected value of the current sensor with respect to the target phase, such that a voltage value of the extracted voltage component becomes equal to a desired voltage value.

CITATION LIST

Patent Literature

PTL 1: JP 2015-56919A

While the motor is driven, not only the voltage component of the identical frequency (electrical first variation component) that is identical with the frequency of the three phase voltage command signals but an electrical second variation component, an electrical sixth variation component and the like are generated as variations in the voltage of the smoothing capacitor. It is, however, difficult to sufficiently remove the variation components of the orders other than the electrical first variation component by BPF. The driving system described above is thus likely to fail to adequately correct the detected value of the current sensor with respect to the target phase and thereby fail to sufficiently suppress a voltage variation of the smoothing capacitor and a torque variation of the motor.

A main object of a driving system of the present disclosure is to more effectively suppress a voltage variation of the smoothing capacitor and a torque variation of the motor.

SUMMARY

In order to achieve the above primary object, the driving system of the present disclosure employs the following configuration.

The present disclosure is directed to a driving system, including: a motor; an inverter configured to drive the motor; a power storage device connected with the inverter via a power line; a smoothing capacitor mounted to the power line; a voltage sensor configured to detect a voltage of the smoothing capacitor; a current sensor configured to detect an electric current of each phase of the motor; and a control device configured to control the inverter, based on a detected value of the current sensor, wherein the control device performs Fourier series expansion of a detected value of the voltage sensor to calculate an electrical first variation component of the voltage of the smoothing capacitor, and the control device controls the inverter, such that the electrical first variation component of the voltage of the smoothing capacitor becomes equal to a value 0.

The driving system according to this aspect of the present disclosure performs Fourier series expansion of the detected value of the voltage sensor to calculate the electrical first variation component of the voltage of the smoothing capacitor and controls the inverter, such that the calculated electrical first variation component of the voltage of the smoothing capacitor becomes equal to the value 0. This configuration sufficiently removes components other than the electrical first variation component of the voltage of the smoothing capacitor (for example, electrical second variation component and electrical sixth variation component) and more effectively suppresses a voltage variation of the smoothing capacitor and a torque variation of the motor.

DESCRIPTION OF EMBODIMENTS

The following describes some aspects of the present disclosure with reference to several embodiments.

First Embodiment

Figure 1:
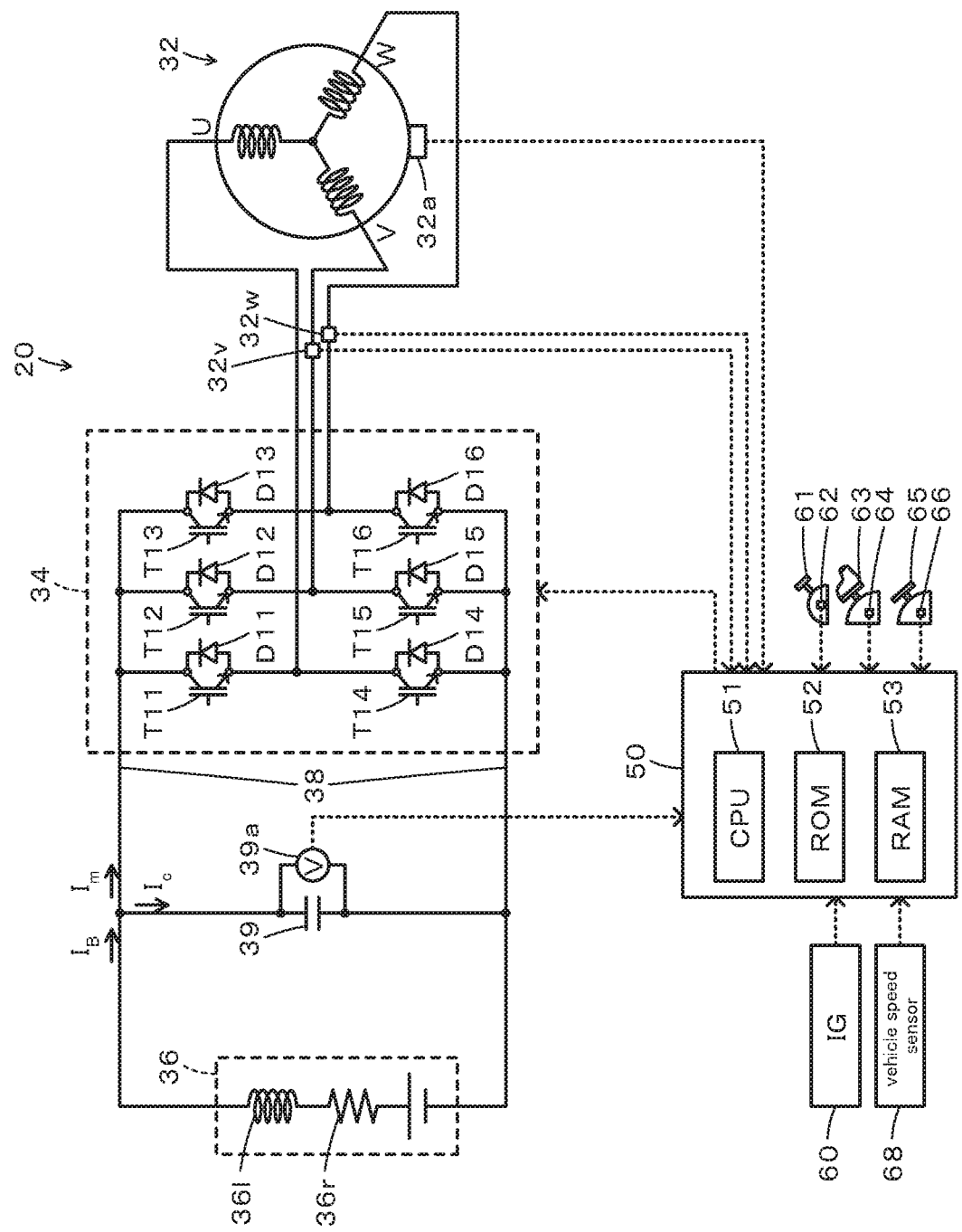
FIG. 1 is a configuration diagram illustrating the schematic configuration of a driving system according to a first embodiment of the present disclosure.

FIG. 1 is a configuration diagram illustrating the schematic configuration of a driving system according to a first embodiment of the present disclosure. The driving system 20 according to the first embodiment is mounted on an electric vehicle or a hybrid vehicle and includes a motor 32, an inverter 34, a battery 36, a smoothing capacitor 39 and an electronic control unit 50.

The motor 32 is configured as a synchronous generator motor and includes a rotor with permanent magnets embedded in a rotor core and a stator with three-phase coils wound on a stator core. The rotor of this motor 32 is connected with a driveshaft that is linked with drive wheels via a differential gear.

The inverter 34 is used to drive the motor 32. This inverter 34 is connected with the battery 36 via power lines 38 and includes six transistors T11 to T16 that serve as switching elements and six diodes D11 to D16 that are respectively connected in parallel with the six transistors T11 to T16. The transistors T11 to T16 are arranged in pairs, such that two transistors in each pair respectively serve as a source and as a sink relative to a positive bus bar and a negative bus bar of the power lines 38. The respective phases of the three-phase coils (U phase, V phase and W phase coils) of the motor 32 are connected with connection points of the respective pairs of the transistors T11 to T16. When a voltage is applied to the inverter 34, the electronic control unit 50 serves to regulate the rate of ON times of the respective pairs of the transistors T11 to T16 included in the inverter 34, such as to form a rotating magnetic field in the three-phase coils of the motor 32 and thereby rotate and drive the rotor of the motor 32.

The battery 36 is configured as, for example, a lithium ion rechargeable battery or a nickel metal hydride battery and is connected with the inverter 34 via the power lines 38 as described above. This battery 36 has an internal resistance 36r and an internal inductance 36l. The smoothing capacitor 39 is mounted to the positive bus bar and the negative bus bar of the power lines 38.

The electronic control unit 50 is configured as a CPU 51-based microprocessor and includes a ROM 52 configured to store processing programs, a RAM 53 configured to temporarily store data, and input/output ports, in addition to the CPU 51. Signals from various sensors are input into the electronic control unit 50 via the input port. The signals input into the electronic control unit 50 include, for example, a rotational position $\theta_m$ of the rotor of the motor 32 from a rotational position detection sensor (for example, resolver) 32a configured to detect the rotational position of the rotor of the motor 32 and AD values (analog-to-digital converted voltage values) $AD_{IV}$ and $AD_{IW}$ corresponding to electric currents $I_V$ and $I_W$ of the V phase and the W phase of the motor 32 from current sensors 32v and 32w mounted to the V phase and the W phase of the motor 32. The input signals also include a voltage $V_H$ of the smoothing capacitor 39 (i.e., the power lines 38) from a voltage sensor 39a placed between terminals of the smoothing capacitor 39. The input signals further include an ignition signal from an ignition switch 60 and a shift position SP from a shift position sensor 62 configured to detect an operating position of a shift lever 61. The input signals also include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68.

Various control signals are output from the electronic control unit 50 via the output port. The signals output from the electronic control unit 50 include, for example, switching control signals to the transistors T11 to T16 included in the inverter 34. The electronic control unit 50 calculates an electrical angle $\theta_e$, a mechanical angular velocity $\omega_m$, an electrical angular velocity $\omega_e$ and a rotation speed $N_m$ of the motor 32, based on the rotational position $\theta_m$ of the rotor of the motor 32 input from the rotational position detection sensor 32a.

In the driving system 20 of the first embodiment configured as described above, the electronic control unit 50 sets a required torque $T_d^*$ that is required for the driveshaft, based on the accelerator position Acc and the vehicle speed V, and sets a torque command $T_m^*$ of the motor 32, such that the set required torque $T_d^*$ is output to the driveshaft. The electronic control unit 50 then performs switching control of the transistors T11 to T16 included in the inverter 34, such that the motor 32 is driven with the torque command $T_m^*$. According to the first embodiment, the electronic control unit 50 controls the inverter 34 in a pulse width modulation (PWM) control mode.

Figure 2:
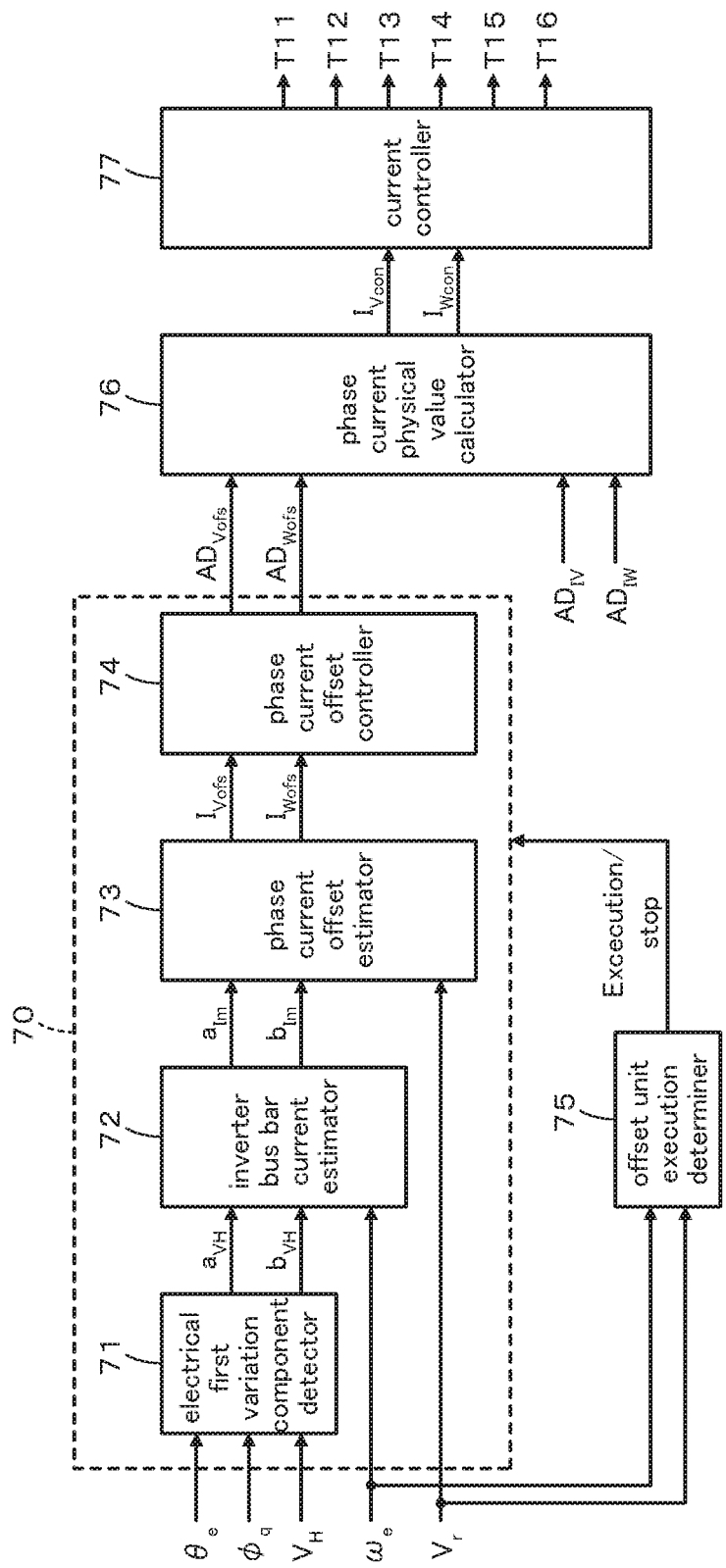
FIG. 2 is a control block diagram illustrating one example of control blocks for controlling an inverter in a PWM control mode by an electronic control unit.

The following describes operations of the driving system 20 according to the first embodiment having the configuration described above or more specifically a series of control of the inverter 34. FIG. 2 is a control block diagram illustrating one example of control blocks for controlling an inverter in a PWM control mode by an electronic control unit. As shown in FIG. 2, the electronic control unit 50 includes an offset unit 70, an offset unit execution determiner 75, a phase current physical value calculator 76 and a current controller 77. The offset unit 70 includes an electrical first variation component detector 71, an inverter bus bar current estimator 72, a phase current offset estimator 73 and a phase current offset controller 74.

The electrical first variation component detector 71 serves to calculate a Fourier cosine coefficient $a_{VH}$ and a Fourier sine coefficient $b_{VH}$ as values relating to an electrical first variation component of the voltage $V_H$ of the smoothing capacitor 39, based on the electrical angle $\theta_e$ of the motor 32, a voltage phase $\phi_q$ with respect to a q axis of an output voltage of the inverter 34, and the voltage $V_H$ of the smoothing capacitor 39.

The inverter bus bar current estimator 72 serves to calculate a Fourier cosine coefficient $a_{Im}$ and a Fourier sine coefficient $b_{Im}$ as values relating to an electrical first variation component of a bus bar current (input current) $I_m$ of the inverter 34, based on the Fourier cosine coefficient $a_{VH}$ and the Fourier sine coefficient $b_{VH}$ of the voltage $V_H$ of the smoothing capacitor 39 calculated by the electrical first variation component detector 71 and the electrical angular velocity $\omega_e$ of the motor 32.

The phase current offset estimator 73 serves to calculate current offset estimated values $I_{Vofs}$ and $I_{Wofs}$ of the V phase and the W phase, based on the Fourier cosine coefficient $a_{Im}$ and the Fourier sine coefficient $b_{Im}$ of the bus bar current $I_m$ of the inverter 34 calculated by the inverter bus bar current estimator 72 and a modulation degree $V_r$ of the output voltage of the inverter 34.

The phase current offset controller 74 serves to calculate offset correction amounts $AD_{Vofs}$ and $AD_{Wofs}$ of the V phase and the W phase that are to be used by the phase current physical value calculator 76, based on the current offset estimated values $I_{Vofs}$ and $I_{Wofs}$ of the V phase and the W phase calculated by the phase current offset estimator 73.

The offset unit execution determiner 75 serves to determine whether the respective processes of the offset unit 70 (i.e., the processes of the electrical first variation component detector 71, the inverter bus bar current estimator 72, the phase current offset estimator 73 and the phase current offset controller 74) are to be performed, based on the electrical angular velocity $\omega_e$ of the motor 32 and the modulation degree $V_r$ of the output voltage of the inverter 34.

The phase current physical value calculator 76 serves to convert the AD values $AD_{IV}$ and $AD_{IW}$ input from the current sensors 32$v$ and 32$w$ into control currents $I_{Vcon}$ and $I_{Wcon}$ of the V phase and the W phase that are to be used by the current controller 77, by using the offset correction amounts $AD_{Vofs}$ and $AD_{Wofs}$ of the V phase and the W phase calculated by the phase current offset controller 74 or by setting both the offset correction amounts $AD_{Vofs}$ and $AD_{Wofs}$ of the V phase and the W phase to a value 0.

The current controller 77 serves to perform switching control of the transistors T11 to T16 included in the inverter 34, such that the motor 32 is driven with the torque command $T_m^*$, based on the control currents $I_{Vcon}$ and $I_{Wcon}$ of the V phase and the W phase calculated by the phase current physical value calculator 76.

Figure 3:
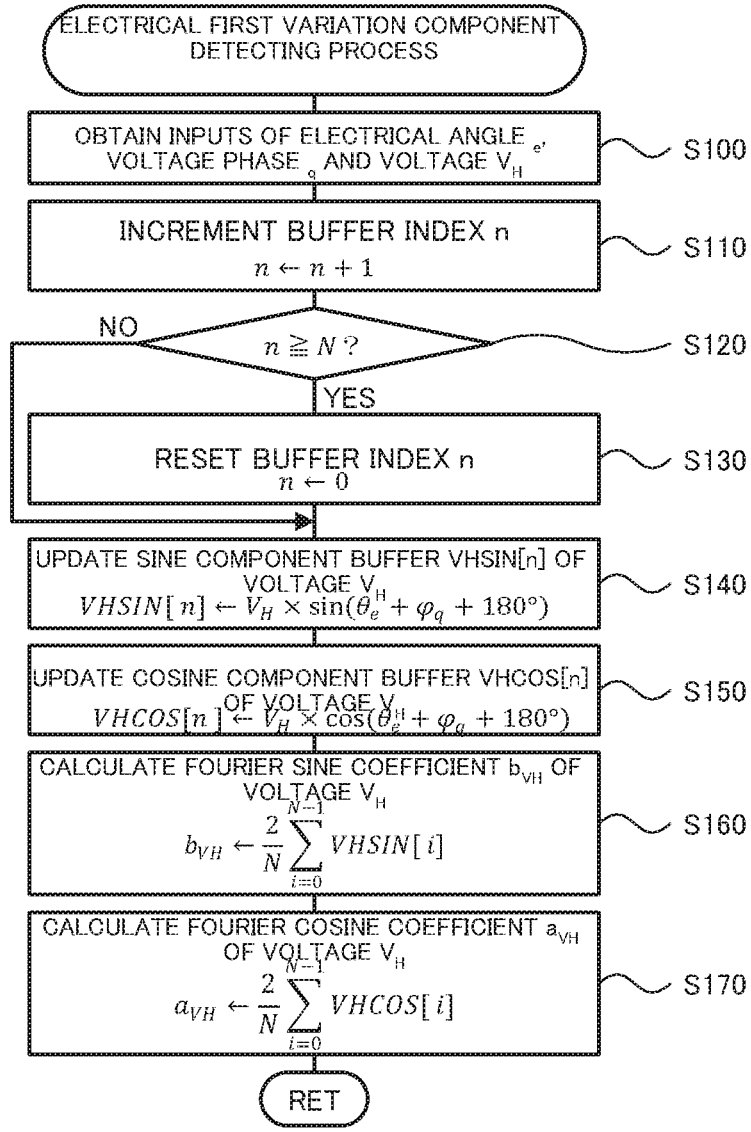
FIG. 3 is a flowchart showing one example of an electrical first variation component detecting process performed by an electrical first variation component detector.

The following sequentially describes the electrical first variation component detector 71 to the current controller 77 more in detail. The electrical first variation component detector 71 is described first in detail. FIG. 3 is a flowchart showing one example of an electrical first variation component detecting process performed by an electrical first variation component detector. This processing routine is performed repeatedly at a period of 360 degrees/N (where a value N denotes a divisor of 360 and is, for example, 3, 6, or 12) in the electrical angle $\theta_e$ of the motor 32. The "electrical first variation component" herein means a variation component of frequency that is equal to an electrical frequency of the motor 32.

When the electrical first variation component detecting process of FIG. 3 is triggered, the electrical first variation component detector 71 first obtains the input data, for example, the electrical angle $\theta_e$ of the motor 32, the voltage phase $\phi_q$ with respect to the q axis of the output voltage of the inverter 34, and the voltage $V_H$ of the smoothing capacitor 39 (step S100). The electrical angle $\theta_e$ of the motor 32 input here is a value calculated from the rotational position $\theta_m$ of the rotor of the motor 32 input from the rotational position detection sensor 32$a$. The voltage phase $\phi_q$ of the output voltage of the inverter 34 input here is a value calculated by the current controller 77. The voltage $V_H$ of the smoothing capacitor 39 input here is a value detected by the voltage sensor 39$a$.

The electrical first variation component detector 71 subsequently updates a buffer index n by incrementing the buffer index n by a value 1 (step S110) and compares the updated buffer index n with the value N given above (step S120). When the buffer index n is smaller than the value N, the electrical first variation component detector 71 updates a sine component buffer VHSIN[n] and a cosine component buffer VHCOS[n] of the voltage $V_H$ of the smoothing capacitor 39 with regard to the buffer index n according to Expression (1-1) and Expression (1-2) given below by using the voltage $V_H$ of the smoothing capacitor 39, the electrical angle $\theta_e$ of the motor 32 and the voltage phase $\phi_q$ of the output voltage of the inverter 34 (steps S140 and S150).

$$VH\ SIN[n] \leftarrow V_H \times \sin(\theta_e + \phi_q + 180°) \qquad (1\text{-}1)$$

$$VH\ COS[n] \leftarrow V_H \times \cos(\theta_e + \phi_q + 180°) \qquad (1\text{-}2)$$

When the buffer index n is equal to or larger than the value N at step S120, on the other hand, the electrical first variation component detector 71 resets the buffer index n to a value 0 (step S130) and updates the sine component buffer VHSIN[n] and the cosine component buffer VHCOS[n] of the voltage $V_H$ of the smoothing capacitor 39 with regard to the buffer index n according to Expression (1-1) and Expression (1-2) given above (steps S140 and S150).

The electrical first variation component detector 71 subsequently calculates a Fourier sine coefficient $b_{VH}$ of the voltage $V_H$ of the smoothing capacitor 39 according to Expression (1-3) given below by using the sine component buffer VHSIN[i] (where i=0, . . . , N−1) of the voltage $V_H$ of the smoothing capacitor 39 (step S160). The electrical first variation component detector 71 also calculates a Fourier cosine coefficient $a_{VH}$ of the voltage $V_H$ of the smoothing capacitor 39 according to Expression (1-4) given below by using the cosine component buffer VHCOS[i] of the voltage $V_H$ of the smoothing capacitor 39 (step S170) and then terminates the electrical first variation component detecting process of FIG. 3.

$$b_{VH} \leftarrow \frac{2}{N}\sum_{i=0}^{N-1} VHSIN[i] \qquad (1\text{-}3)$$

$$a_{VH} \leftarrow \frac{2}{N}\sum_{i=0}^{N-1} VHCOS[i] \qquad (1\text{-}4)$$

The sine component buffer VHSIN[n] and the cosine component buffer VHCOS[n] of the voltage $V_H$ of the smoothing capacitor 39, the Fourier sine coefficient $b_{VH}$ and the Fourier cosine coefficient $a_{VH}$ are values relating to the electrical first variation component of the voltage $V_H$ of the smoothing capacitor 39. The following describes a method of deriving Expressions (1-1) to (1-4) given above. The definition of Fourier series expansion is described first. A periodic function f(x) having a period of $2\pi$ is expanded as shown by Equation (1-5) given below and is decomposable into frequency components of integral multiples of the original frequency. In Equation (1-5), "$a_n$" and "$b_n$" are respectively expressed by Equation (1-6) and Equation (1-7) given below.

$$f(x) = \frac{a_0}{2} + a_1\cos x + b_1\sin x + a_2\cos 2x + \qquad (1\text{-}5)$$
$$b_2\sin 2x + a_3\cos 3x + b_3\sin 3x + \ldots + a_n\cos nx + b_n\sin nx$$

$$a_n = \frac{1}{\pi}\int_{-\pi}^{\pi} f(t)\cos nt\,dt\,(n = 0, 1, 2, 3\ldots) \qquad (1\text{-}6)$$

$$b_n = \frac{1}{\pi}\int_{-\pi}^{\pi} f(t)\sin nt\,dt\,(n = 1, 2, 3\ldots) \qquad (1\text{-}7)$$

Extraction of the electrical first variation component of the voltage $V_H$ of the smoothing capacitor 39 is described next. The electrical first variation component of the voltage $V_H$ of the smoothing capacitor 39 is expressed by Equation (1-8) given below. In Equation (1-8), "$a_{VH}$" and "$b_{VH}$" are respectively referred to as a Fourier cosine coefficient and a Fourier sine coefficient of the voltage $V_H$. The Fourier cosine coefficient $a_{VH}$ and the Fourier sine coefficient $b_{VH}$ of the voltage $V_H$ are respectively expressed by Equation (1-9) and Equation (1-10) given below by substituting a value 1 into "n" of Equation (1-6) and Equation (1-7) described above, replacing "dt" with "dθ" and replacing "f(t) with "VH(θ)".

$$V_H(\theta) = a_{VH}\cos\theta + b_{VH}\sin\theta \quad (1-8)$$

$$a_{VH} = \frac{1}{\pi}\int_{-\pi}^{\pi} V_H(\theta)\cos\theta\, d\theta \quad (1-9)$$

$$b_{VH} = \frac{1}{\pi}\int_{-\pi}^{\pi} V_H(\theta)\sin\theta\, d\theta \quad (1-10)$$

Equation (1-11) and Equation (1-12) given below are obtained by changing the angle from "rad" to "deg" and discretizing Equation (1-9) and Equation (1-10) given above with respect to divisions of 360 degrees/N in the electrical angle $\theta_e$ of the motor 32. Expressions (1-1) to (1-4) are derived from these Equations (1-11) and (1-12). By taking into account the foregoing, the electrical first variation component detector 71 (i.e., the electrical first variation component detecting process of FIG. 3) calculates the Fourier sine coefficient $b_{VH}$ and the Fourier cosine coefficient $a_{VH}$ of the voltage $V_H$ of the smoothing capacitor 39 by using Expressions (1-1) to (1-4) given above (steps S140 to S170). The processing of steps S140 and S150 performs Fourier series expansion with substituting "θe+φq+180°" into "θ" in Equation (1-8) given above. This reason will be described later.

$$a_{VH} = \frac{2}{N}\sum_{i=0}^{N-1} V_H\left(\frac{360° \times i}{N}\right)\cos\left(\frac{360° \times i}{N}\right) \quad (1-11)$$

$$b_{VH} = \frac{2}{N}\sum_{i=0}^{N-1} V_H\left(\frac{360° \times i}{N}\right)\sin\left(\frac{360° \times i}{N}\right) \quad (1-12)$$

Figure 4:
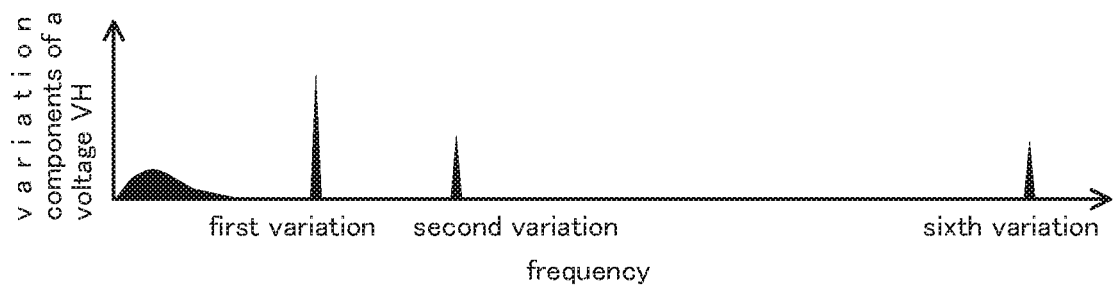
FIG. 4 is a diagram illustrating one example of variation components of a voltage $V_H$ of a smoothing capacitor generated when a motor is driven.

As the result of experiments and analyses, the inventors of the present disclosure have found that a torque variation of the motor 32 can be reduced by extracting only the electrical first variation component of the voltage $V_H$ of the smoothing capacitor 39 and driving the motor 32, such that the electrical first variation component of the voltage $V_H$ of the smoothing capacitor 39 is decreased (or more preferably is made equal to zero) by decreasing offset amounts of electric currents $I_U$, $I_V$ and $I_W$ of the respective phases of the motor 32 (or more preferably decreasing the offset amounts to zero), based on a relationship between the electrical first variation component of the voltage $V_H$ of the smoothing capacitor 39 and the offset amounts of electric currents $I_U$, $I_V$ and $I_W$ of the respective phases of the motor 32. In general, when the motor 32 is driven, variation components of the orders other than the electrical first order (for example, electrical second order and electrical sixth order) are also generated as variation components of the voltage $V_H$ of the smoothing capacitor 39, as shown in FIG. 4. Accordingly, it is required to accurately remove the components of the orders other than the electrical first order out of the variation components of the voltage $V_H$ of the smoothing capacitor 39.

Figure 5:
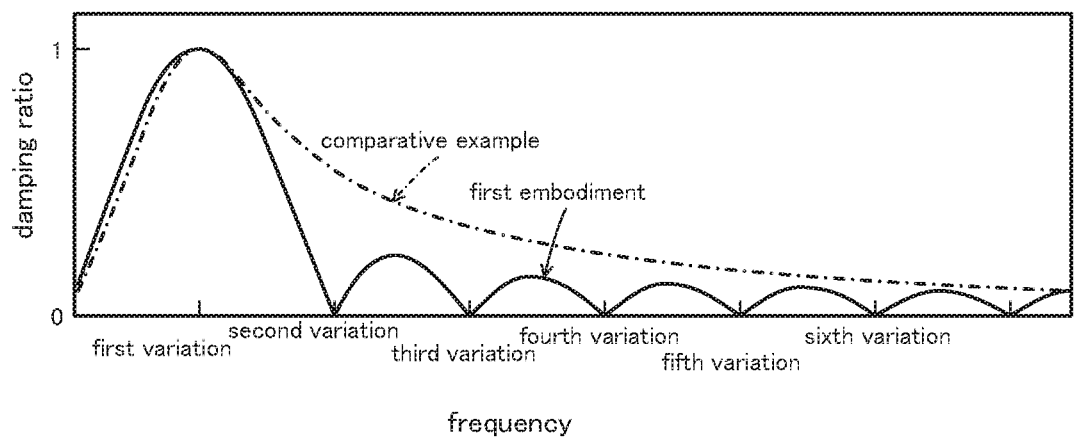
FIG. 5 is a diagram illustrating one example of relationships between a damping ratio and a frequency as results of execution of procedures of the first embodiment and a comparative example.

A technique employable to remove the components of the orders other than the electrical first order out of the variation components of the voltage $V_H$ of the smoothing capacitor 39 may use a band pass filter (BPF) as shown by Equation (1-13) given below. In this Equation (1-13), "$\omega_e$" denotes an electrical angular velocity of the motor 32, "s" represents the Laplacian operator, and "ξ" represents a constant designed to obtain a desired band width. FIG. 5 is a diagram illustrating one example of relationships between a damping ratio and a frequency as results of execution of procedures of the first embodiment and a comparative example. In FIG. 5, a solid line curve indicates the result of execution of the technique of the first embodiment using Fourier series expansion, and a one-dot chain line curve indicates the result of execution of the technique of the comparative example using the band pass filter. The results of FIG. 5 clearly show that the technique of the first embodiment more accurately removes the components of the orders other than the electrical first order out of the variation components of the voltage $V_H$ of the smoothing capacitor 39 and increases the detection accuracy of the electrical first variation component of the voltage $V_H$ of the smoothing capacitor 39, compared with the technique of the comparative example.

$$H(s) = \frac{2\xi\omega_e s}{s^2 + 2\xi\omega_e s + \omega_e^2} \quad (1-13)$$

Figure 6:
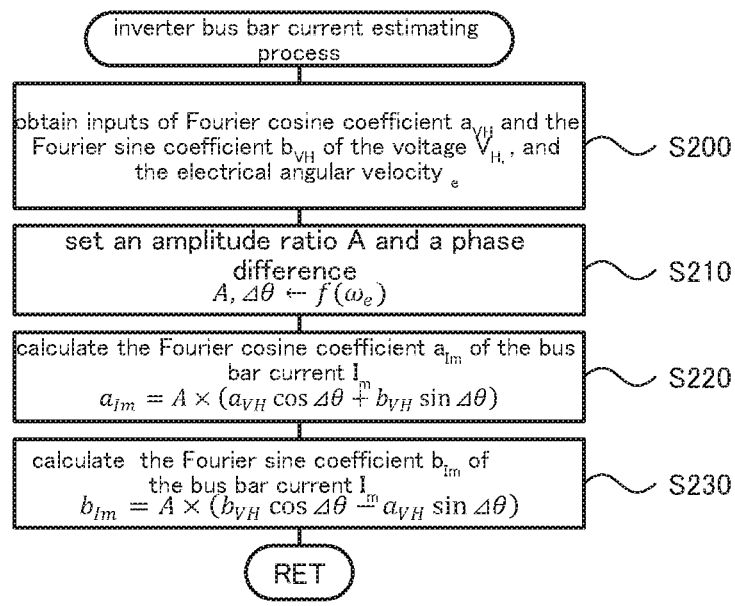
FIG. 6 is a flowchart showing one example of an inverter bus bar current estimating process performed by an inverter bus bar current estimator.

The following describes the inverter bus bar current estimator 72 in detail. FIG. 6 is a flowchart showing one example of an inverter bus bar current estimating process performed by an inverter bus bar current estimator. This processing routine is repeatedly performed at a period that is longer than the execution period of the electrical first variation component detecting process of FIG. 3 (for example, a period of about 2 msec when the execution period of the electrical first variation component detecting process is 1 msec).

When the inverter bus bar current estimating process of FIG. 6 is triggered, the inverter bus bar current estimator 72 first obtains the input data, for example, the Fourier cosine coefficient $a_{VH}$ and the Fourier sine coefficient $b_{VH}$ of the voltage $V_H$ of the smoothing capacitor 39 and the electrical angular velocity $\omega_e$ of the motor 32 (step S200). The Fourier cosine coefficient $a_{VH}$ and the Fourier sine coefficient $b_{VH}$ of the voltage $V_H$ of the smoothing capacitor 39 input here are values calculated by the electrical first variation component detector 71 (i.e., the electrical first variation component detecting process of FIG. 3). The electrical angular velocity $\omega_e$ of the motor 32 input here is a value calculated from the rotational position $\theta_m$ of the rotor of the motor 32 input from the rotational position detection sensor 32a.

Figure 7:
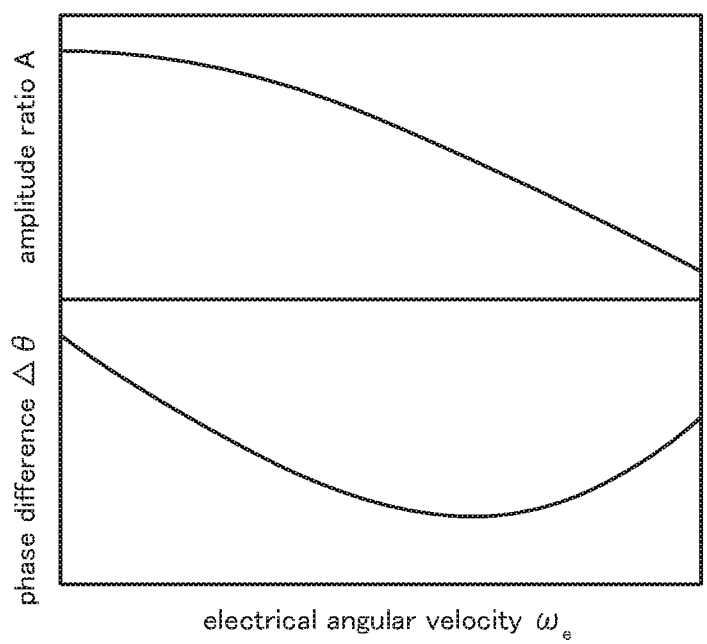
FIG. 7 is a diagram illustrating one example of a map that specifies relationships of an amplitude ratio A and a phase difference $\Delta\theta$ to an electrical angular velocity $\omega_e$ of the motor.

After obtaining the input data, the inverter bus bar current estimator 72 sets an amplitude ratio A and a phase difference Δθ between the bus bar electric current (electric current on the DC side as shown in FIG. 1) $I_m$ of the inverter 34 and the voltage $V_H$ of the smoothing capacitor 39, as frequency characteristics of a circuit from the battery 36 to the smoothing capacitor 39, based on the input electrical angular velocity $\omega_e$ of the motor 32 (step S210). A procedure employed to set the amplitude ratio A and the phase difference Δθ according to the embodiment specifies and stores in advance relationships of the amplitude ratio A and the phase difference Δθ to the electrical angular velocity $\omega_e$ of the motor 32 in the form of a map (Bode diagram) in the ROM 52. When a value of the electrical angular velocity $\omega_e$ of the motor 32 is given, the procedure reads to set values of the amplitude ratio A and the phase difference Δθ corresponding to the given value of the electrical angular velocity $\omega_e$ from this map. FIG. 7 is a diagram illustrating one example of a map that specifies relationships of an amplitude ratio A and a phase difference Δθ to an electrical angular velocity $\omega_e$ of the motor. A method of creating this map will be described later.

The inverter bus bar current estimator 72 subsequently calculates the Fourier cosine coefficient $a_{Im}$ and the Fourier sine coefficient $b_{Im}$ of the bus bar current $I_m$ of the inverter 34 according to Equation (2-1) and Equation (2-2) given below by using the amplitude A, the phase difference Δθ, and the Fourier cosine coefficient $a_{VH}$ and the Fourier sine coefficient $b_{VH}$ of the voltage $V_H$ (steps S220 and S230) and then terminates the inverter bus bar current estimating process of FIG. 6.

$$a_{Im} = A \times (a_{VH} \cos \Delta\theta + b_{VH} \sin \Delta\theta) \quad (2\text{-}1)$$

$$b_{Im} = A \times (b_{VH} \cos \Delta\theta - a_{VH} \sin \Delta\theta) \quad (2\text{-}2)$$

The Fourier cosine coefficient $a_{Im}$ and the Fourier sine coefficient $b_{Im}$ of the bus bar current $I_m$ of the inverter 34 are values relating to the electrical first variation component of the bus bar current $I_m$ of the inverter 34 (shown in FIG. 1). Generation of offsets in the electric currents $I_U$, $I_V$ and $I_W$ of the respective phases of the motor 32 varies the bus bar current $I_m$ of the inverter 34, accordingly varies an electric current $I_c$ of the smoothing capacitor 39 (shown in FIG. 1) that is a difference between an electric current $I_B$ of the battery 36 (shown in FIG. 1) and the bus bar current $I_m$ of the inverter 34, and thereby varies the voltage $V_H$ of the smoothing capacitor 39. In other words, the variation in the voltage $V_H$ of the smoothing capacitor 39 is affected by the electric current $I_B$ of the battery 36 from a direct current circuit, in addition to by offset amounts in the electric currents $I_U$, $I_V$ and $I_W$ of the respective phases of the motor 32. It is accordingly preferable to remove the effects of the direct current circuit, with a view to calculating the offset amounts in the electric currents $I_U$, $I_V$ and $I_W$ of the respective phases of the motor 32 with the higher accuracy. By taking into account the foregoing, the procedure of the first embodiment converts the Fourier cosine coefficient $a_{VH}$ and the Fourier sine coefficient $b_{VH}$ of the voltage $V_H$ as the values relating to the electrical first variation component of the voltage $V_H$ of the smoothing capacitor 39 into the Fourier sine coefficient $b_{Im}$ and the Fourier cosine coefficient $a_{Im}$ of the bus bar current $I_m$ of the inverter 34 as the values relating to the electrical first variation component of the bus bar current $I_m$ of the inverter 34 (shown in FIG. 1).

Figure 8:
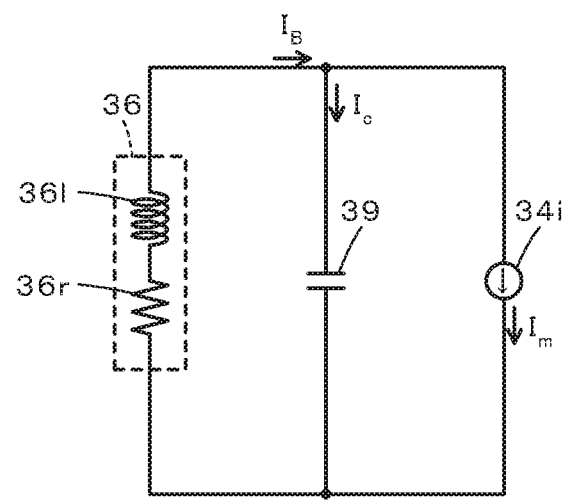
FIG. 8 is a circuit diagram illustrating a circuit obtained by regarding the inverter of the driving system as a current source and removing a direct current component from the circuit configuration of the driving system.

For this conversion, the procedure of the first embodiment calculates a transfer function $I_m/V_H$ with regard to a circuit shown in FIG. 8 and creates the map (Bode diagram) of FIG. 7. The circuit of FIG. 8 is equivalent to a circuit obtained by regarding the inverter 34 of the driving system 20 as a current source 34i and removing the direct current component from the circuit configuration of the driving system 20. With regard to the circuit of FIG. 8, the transfer function $I_m/V_H$ is expressed by Equation (2-3) given below. In Equation (2-3), "$C_H$" denotes a capacity value of the smoothing capacitor 39, "$R_B$" denotes a resistance value of the internal resistance 36r of the battery 36, "$L_B$" denotes an inductance value of the internal inductance 36l of the battery 36, and "s" represents the Laplacian operator. The map of FIG. 7 may be created as the result of experiments and analyses, instead of being created by calculating the transfer function $I_m/V_H$ with regard to the circuit of FIG. 8.

$$\frac{I_m}{V_H} = -\frac{1 + sC_H R_B + s^2 C_H L_B}{R_B + sL_B} \quad (2\text{-}3)$$

The following describes a method of deriving Equation (2-1) and Equation (2-2) given above. The electrical first variation component of the voltage $V_H$ of the smoothing capacitor 39 is expressed by Equation (1-8) given above. According to the frequency characteristics of the transfer function $I_m/V_H$ (expressed by Equation (2-3) given above), adding corrections of the amplitude ratio A and the phase difference Δθ to the variation in the voltage $V_H$ of the smoothing capacitor 39 provides a variation in the bus bar current $I_m$ of the inverter 34. Accordingly, an electrical first variation component $I_{m1}$ of the bus bar current $I_m$ of the inverter 34 is expressed by Equation (2-4) given below.

$$I_{m1} = A \times a_{VH} \cos(\theta + \Delta\theta) + A \times b_{VH} \sin(\theta + \Delta\theta) \quad (2\text{-}4)$$

Equation (2-5) given below is obtained by applying the addition theorem to Equation (2-4) given above and reorganizing Equation (2-4). A coefficient for cos θ in the first term on the right side of this Equation (2-5) is obtained as the Fourier cosine coefficient $a_{Im}$ of the bus bar current $I_m$ of the inverter 34 as shown by Equation (2-1) given above. A coefficient for sin θ, in the second term on the right side of Equation (2-5) is obtained as the Fourier sine coefficient $b_{Im}$ of the bus bar current $I_m$ of the inverter 34 as shown by Equation (2-2) given above. Accordingly, Equation (2-5) is rewritten as Equation (2-6) given below. By taking into account the foregoing, the inverter bus bar current estimator 72 (i.e., the inverter bus bar current estimating process of FIG. 6) calculates the Fourier cosine coefficient $a_{Im}$ and the Fourier sine coefficient $b_{Im}$ of the bus bar current $I_m$ of the inverter 34 according to Equation (2-1) and Equation (2-2) (steps S220 and S230).

$$I_{m1} = A \times (a_{VH} \cos \Delta\theta + b_{VH} \sin \Delta\theta) \cos \theta + A \times (b_{VH} \cos \Delta\theta - a_{VH} \sin \Delta\theta) \sin \theta \quad (2\text{-}5)$$

$$I_{m1} = a_{Im} \cos \theta + b_{Im} \sin \theta \quad (2\text{-}6)$$

Figure 9:
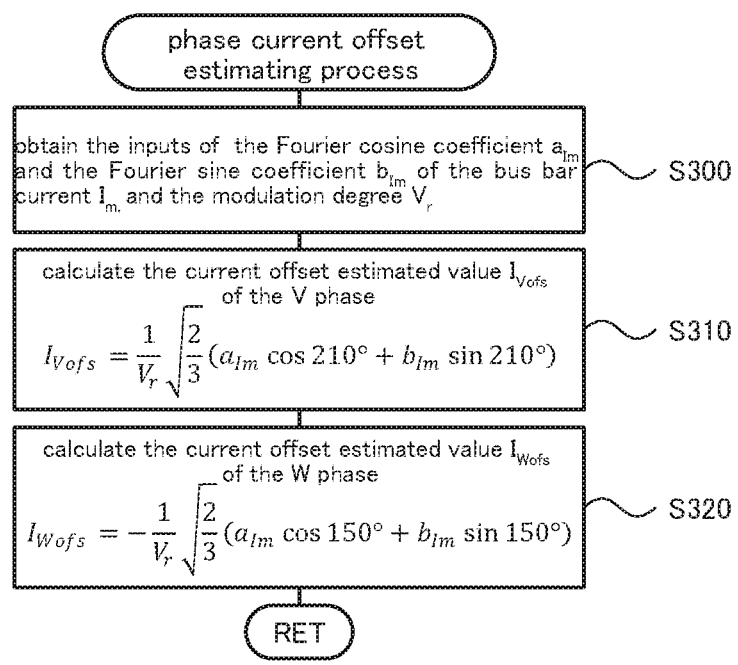
FIG. 9 is a flowchart showing one example of a phase current offset estimating process performed by a phase current offset estimator.

The following describes the phase current offset estimator 73 in detail. FIG. 9 is a flowchart showing one example of a phase current offset estimating process performed by a phase current offset estimator. This processing routine is performed repeatedly at an identical period with the execution period of the inverter bus bar current estimating process of FIG. 6.

When the phase current offset estimating process of FIG. 9 is triggered, the phase current offset estimator 73 first obtains the input data, for example, the Fourier cosine coefficient $a_{Im}$ and the Fourier sine coefficient $b_{Im}$ of the bus bar current $I_m$ of the inverter 34 and the modulation degree $V_r$ of the output voltage of the inverter 34 (step S300). The Fourier cosine coefficient $a_{Im}$ and the Fourier sine coefficient $b_{Im}$ of the bus bar current $I_m$ of the inverter 34 input here are values calculated by the inverter bus bar current estimator 72 (i.e., the inverter bus bar current estimating process of FIG. 6). The modulation degree $V_r$ of the output voltage of the inverter 34 input here is a value calculated by the current controller 77.

After obtaining the input data, the phase current offset estimator 73 calculates the current offset estimated values $I_{Vofs}$ and $I_{Wofs}$ of the V phase and the W phase according to Equation (3-1) and Equation (3-2) given below by using the input Fourier cosine coefficient $a_{Im}$ and the input Fourier sine coefficient $b_{Im}$ of the bus bar current $I_m$ of the inverter 34 and the input modulation degree $V_r$ of the output voltage of the inverter 34 (steps S310 and S320) and then terminates the phase current offset estimating process of FIG. 9.

$$I_{Vofs} = \frac{1}{V_r}\sqrt{\frac{2}{3}}(a_{Im}\cos 210° + b_{Im}\sin 210°) \quad (3\text{-}1)$$

$$I_{Wofs} = -\frac{1}{V_r}\sqrt{\frac{2}{3}}(a_{Im}\cos 150° + b_{Im}\sin 150°) \quad (3\text{-}2)$$

Equation (3-1) and Equation (3-2) given above are equations of converting the electrical first variation components of the bus bar current $I_m$ of the inverter 34 into the current offset estimated values $I_{Vofs}$ and $I_{Wofs}$ of the V phase and the W phase. The following describes a method of driving Equation (3-1) and Equation (3-2). First, the electric currents $I_U$, $I_V$ and $I_W$ of the respective phases are expressed by Equations (3-3) to (3-5) given below on the assumption of generation of offsets in the electric currents $I_U$, $I_V$ and $I_W$ of the respective phases. In Equations (3-3) to (3-5), "$I_1$" denotes a maximum value of a fundamental wave component of a three-phase AC current and is determined according to the specification of the motor 32, and "β" denotes a current phase on the basis of the U phase ($I_U$=0 when β=0).

$$I_U = I_{Uofs} + I_1 \sin(\theta_e + \beta) \quad (3\text{-}3)$$

$$I_V = I_{Vofs} + I_1 \sin(\theta_e + \beta - 120°) \quad (3\text{-}4)$$

$$I_W = I_{Wofs} + I_1 \sin(\theta_e + \beta + 120°) \quad (3\text{-}5)$$

Under the condition of balanced impedance of loads, the voltages applied to the loads differ due to the offset electric currents. Accordingly, offsets are generated in voltages $V_U$, $V_V$ and $V_W$ of the respective phases. The voltages $V_U$, $V_V$ and $V_W$ of the respective phases under this condition are expressed by Equations (3-6) to (3-8) given below. In Equations (3-6) to (3-8), "$V_1$" denotes a maximum value of a fundamental wave component of a three-phase AC voltage and is determined according to the specification of the motor 32, and "α" denotes a voltage phase on the basis of the U phase ($V_U$=0 when α=0).

$$V_U = V_{Uofs} \sin(\theta_e + \alpha) \quad (3\text{-}6)$$

$$V_V = V_{Vofs} + V_1 \sin(\theta_e + \alpha - 120°) \quad (3\text{-}7)$$

$$V_W = V_{Wofs} + \sin(\theta_e + \alpha + 120°) \quad (3\text{-}8)$$

The electric power is the product of the electric current and the voltage, so that a sum of electric powers $P_U$, $P_V$ and $P_W$ of the respective phases of the motor 32 (i.e., the electric power of the motor 32) is expressed by Equation (3-9) given below and thereby by Equation (3-10) given below. The second term and the third term of Equation (3-10) may be regarded as an electrical first variation component $P_1$ of the sum of the electric powers $P_U$, $P_V$ and $P_W$ of the respective phases of the motor 32.

$$P_U + P_V + P_W = V_U I_U + V_V I_V + V_W I_W \quad (3\text{-}9)$$

$$P_U+P_V+P_W=3/2 V_1 I_1 \cos(\alpha-\beta)+\{V_1 I_{Uofs}\sin(\theta_e+\alpha)+V_1 I_{Vofs}\sin(\theta_e+\alpha-120°)+V_1 I_{Wofs}\sin(\theta_e+\alpha+120°)\}+\{V_{Uofs}I_1\sin(\theta_e+\beta)+V_{Vofs}I_1\sin(\theta_e+\beta-120°)+V_{Wofs}I_1\sin(\theta_e+\beta+120°)\}+\{V_{Uofs}I_{Uofs}+V_{Vofs}I_{Vofs}+V_{Wofs}I_{Wofs}\} \quad (3\text{-}10)$$

When the electrical first variation component $P_1$ of the sum of the electric powers $P_U$, $P_V$ and $P_W$ of the respective phases of the motor 32 is divided into a component $P_{V1}$ that is in synchronism with the voltage phase and a component $P_{I1}$ that is in synchronism with the current phase as shown by Equation (3-11) given below (i.e., when the electrical first variation component $P_1$ is regarded as the sum of the component $P_{V1}$ and the component $P_{I1}$), the component $P_{V1}$ that is in synchronism with the voltage phase is expressed by Equation (3-12) given below and the component $P_{I1}$ that is in synchronism with the current phase is expressed by Equation (3-13) given below.

$$P_1 = P_{V1} + P_{I1} \quad (3\text{-}11)$$

$$P_{V1}=V_1 I_{Uofs}\sin(\theta_e+\alpha)+V_1 I_{Vofs}\sin(\theta_e+\alpha-120°)+V_1 I_{Wofs}\sin(\theta_e+\alpha+120°) \quad (3\text{-}12)$$

$$P_{I1}=V_{Uofs}I_1\sin(\theta_e+\beta)+V_{Vofs}I_1\sin(\theta_e+\beta-120°)+V_{Wofs}I_1\sin(\theta_e+\beta+120°) \quad (3\text{-}13)$$

A value $V_1 I_{Uofs}$ of the component $P_{V1}$ and a value $V_{Uofs} I_1$ of the component $P_{I1}$ are compared with each other, in order to specify whether the component $P_{V1}$ that is in synchronism with the voltage phase or the component $P_{I1}$ that is in synchronism with the current phase is dominant. Expression (3-14) given below is expected to hold as a condition that the component $P_{V1}$ that is in synchronism with the voltage phase becomes greater than the component $P_{I1}$ that is in synchronism with the current phase. Under the condition of balanced impedance of loads of the three phases, Equation (3-15) given below is expected to hold by using resistance values R of the respective phases of the motor 32. Accordingly, Expression (3-16) and thereby Expression (3-17) given below are obtained from Expression (3-14). A value $V_1$ is generally expressed by Equation (3-18) given below. Expression (3-19) given below is accordingly obtained from Expression (3-17) and Equation (3-18).

$$V_1 I_{Uofs} > V_{Uofs} I_1 \quad (3\text{-}14)$$

$$V_{Uofs} = R I_{Uofs} \quad (3\text{-}15)$$

$$V_1 I_{Uofs} > R I_{Uofs} I_1 \quad (3\text{-}16)$$

$$V_1 > R I_1 \quad (3\text{-}17)$$

$$V_1 = \frac{\sqrt{2} V_r V_H}{\sqrt{3}} \quad (3\text{-}18)$$

$$V_r > \sqrt{\frac{3}{2}} \frac{R I_1}{V_H} \quad (3\text{-}19)$$

Accordingly, when the modulation degree $V_r$ of the output voltage of the inverter 34 is equal to or greater than a certain value, the component $P_{V1}$ that is in synchronism with the voltage phase out of the electrical first variation component $P_1$ of the sum of the electric powers $P_U$, $P_V$ and $P_W$ of the respective phases of the motor 32 is dominant. On the assumption that the left side of Expression (3-19) is sufficiently larger than the right side of Expression (3-19), Expression (3-20) given below holds. Equation (3-21) given below is obtained by rewriting Expression (3-19) on the assumption of the sum of the electric currents of the respective phases is equal to 0 ($I_{Uofs} = -I_{Vofs} - I_{Wofs}$).

$$P_1 \approx P_{V1} = V_1 I_{Uofs} \sin(\theta_e+\alpha) + V_1 I_{Vofs} \sin(\theta_e+\alpha-120°) + V_1 I_{Wofs} \sin(\theta_e+\alpha+120°) \quad (3\text{-}20)$$

$$P_1 = \sqrt{3} V_1 I_{Vofs} \sin(\theta_e + \alpha - 150°) + \sqrt{3} V_1 I_{Wofs} \sin(\theta_e + \alpha - 210°) \quad (3\text{-}21)$$

The electrical first variation component $P_1$ of the sum of the electric powers $P_U$, $P_V$ and $P_W$ of the respective phases of the motor 32 is converted into an electrical first variation component $I_{m1}$ of the bus bar current $I_m$ of the inverter 34 according to Equation (3-22) given below by using the voltage $V_H$ of the smoothing capacitor 39. Equation (3-23) given below is obtained by substituting Equation (3-18) into Equation (3-22).

$$I_{m1} = \frac{P_1}{V_H} = \qquad (3\text{-}22)$$

$$\frac{\sqrt{3} V_1 I_{Vofs}}{V_H} \sin(\theta_e + \alpha - 150°) + \frac{\sqrt{3} V_1 I_{Wofs}}{V_H} \sin(\theta_e + \alpha - 210°)$$

$$I_{m1} = \sqrt{2} V_r I_{Vofs} \sin(\theta_e + \alpha - 150°) + \sqrt{2} V_r I_{Wofs} \sin(\theta_e + \alpha - 210°) \quad (3\text{-}23)$$

Under the condition of "$\theta_e + \alpha = 150°$", Equation (3-25) and Equation (3-26) given below are obtained from this Equation (3-23) and Equation (3-24) given below, which is obtained on the basis of Equation (2-6) given above, so that Equation (3-2) given above is obtained. Under the condition of "$\theta_e + \alpha = 210°$", on the other hand, Equation (3-27) and Equation (3-28) given below are obtained from Equation (3-23) and Equation (3-24), so that Equation (3-1) given above is obtained. By taking into account the foregoing, the phase current offset estimator 73 (i.e., the phase current offset estimating process of FIG. 9) calculates the current offset estimated values $I_{Vofs}$ and $I_{Wofs}$ of the V phase and the W phase by using Equation (3-1) and Equation (3-2) given above (steps S310 and S320).

$$I_{m1} = a_{Im} \cos(\theta_e + \alpha) + b_{Im} \sin(\theta_e + \alpha) \quad (3\text{-}24)$$

$$I_{m1}(150°) = \sqrt{2} V_r I_{Wofs} \sin(-60°) \quad (3\text{-}25)$$

$$I_{m1}(150°) = a_{Im} \cos(150°) + b_{Im} \sin(150°) \quad (3\text{-}26)$$

$$I_{m1}(210°) = \sqrt{2} V_r I_{Vofs} \sin(60°) \quad (3\text{-}27)$$

$$I_{m1}(210°) = a_{Im} \cos(210°) + b_{Im} \sin(210°) \quad (3\text{-}28)$$

The value "$\theta e + \alpha$" means the sum of the electrical angle of the motor 32 and the voltage phase that provides the voltage $V_U$ of the U phase equal to a value 0. The motor 32 is generally controlled by using the d axis and the q axis. An equation of "$\theta e + \alpha = \theta e + \phi q + 180°$" is given by conversion of this voltage phase into a voltage phase $\phi_q$ on the basis of the q axis. By taking into account the foregoing, according to the first embodiment, the electrical first variation component detector 71 (more specifically, the processing of steps S140 and S150 in the electrical first variation component detecting process of FIG. 3) performs Fourier series expansion by using "$\theta e + \phi q + 180°$".

Figure 10:
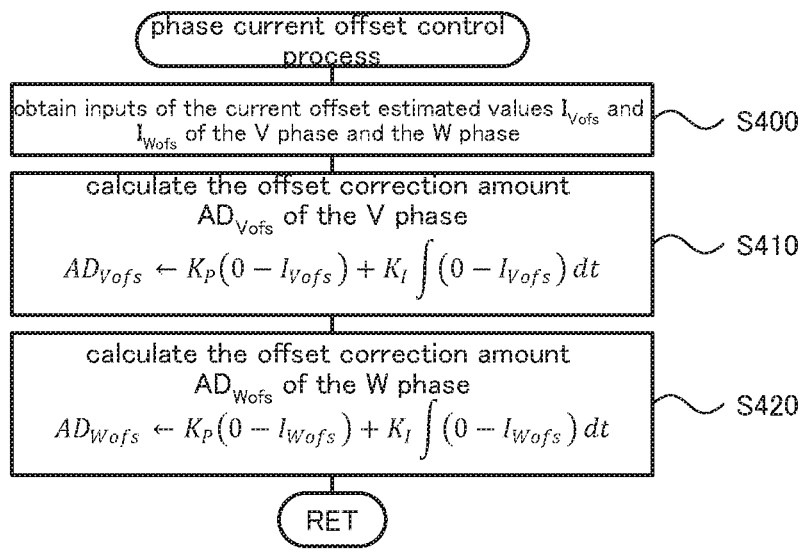
FIG. 10 is a flowchart showing one example of a phase current offset control process performed by a phase current offset controller.

The following describes the phase current offset controller 74 in detail. FIG. 10 is a flowchart showing one example of a phase current offset control process performed by a phase current offset controller. This processing routine is performed repeatedly at an identical period with the execution period of the inverter bus bar current estimating process of FIG. 6.

When the phase current offset control process of FIG. 10 is triggered, the phase current offset controller 74 first obtains the input data of the current offset estimated values $I_{Vofs}$ and $I_{Wofs}$ of the V phase and the W phase (step S400). The current offset estimated values $I_{Vofs}$ and $I_{Wofs}$ of the V phase and the W phase input here are values calculated by the phase current offset estimator 73 (i.e., the phase current offset estimating process of FIG. 9).

After obtaining the input data, the phase current offset controller 74 calculates the offset correction amount $AD_{Vofs}$ of the V phase according to Expression (4-1) by using the input current offset estimated value $I_{Vofs}$ of the V phase (step S410), calculates the offset correction amount $AD_{Wofs}$ of the W phase according to Expression (4-2) by using the input current offset estimated value $I_{Wofs}$ of the W phase (step S420) and then terminates the phase current offset control process of FIG. 10.

$$AD_{Vofs} \leftarrow K_P(0 - I_{Vofs}) + K_I \int(0 - I_{Vofs}) dt \quad (4\text{-}1)$$

$$AD_{Wofs} \leftarrow K_P(0 - I_{Wofs}) + K_I \int(0 - I_{Wofs}) dt \quad (4\text{-}2)$$

The offset correction amounts $AD_{Vofs}$ and $AD_{Wofs}$ of the V phase and the W phase denote correction amounts respectively used to convert the AD values $AD_{IV}$ and $AD_{IW}$ input from the current sensors 32v and 32w of the V phase and the W phase into the control currents $I_{Vcon}$ and $I_{Wcon}$ of the V phase and the W phase by the phase current physical value calculator 76. Expression (4-1) and Expression (4-2) are relational expressions of feedback control respectively used to calculate the offset correction amounts $AD_{Vofs}$ and $AD_{Wofs}$, such that the current offset estimated values $I_{Vofs}$ and $I_{Wofs}$ of the V phase and the W phase become equal to a value 0. In Expression (4-1) and Expression (4-2), "$K_P$" denotes a gain of a proportional, and "$K_I$" denotes a gain of an integral term.

Figure 11:
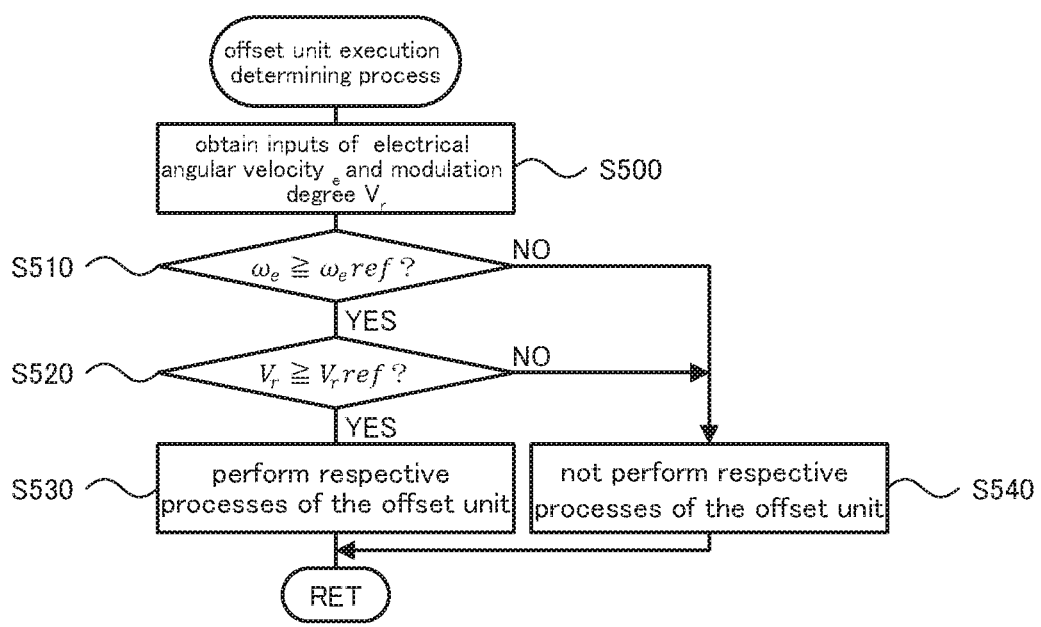
FIG. 11 is a flowchart showing one example of an offset unit execution determining process performed by an offset unit execution determiner.

The following describes the offset unit execution determiner 75 in detail. FIG. 11 is a flowchart showing one example of an offset unit execution determining process performed by an offset unit execution determiner. This processing routine is performed repeatedly at an identical period with the execution period of the inverter bus bar current estimating process of FIG. 6.

When the offset unit execution determining process of FIG. 11 is triggered, the offset unit execution determiner 75 first obtains the input data, for example, the electrical angular velocity $\omega_e$ of the motor 32 and the modulation degree $V_r$ of the output voltage of the inverter 34 (step S500). The electrical angular velocity $\omega_e$ of the motor 32 input here is a value calculated from the rotational position $\theta_m$ of the rotor of the motor 32 input from the rotational position detection sensor 32a. The modulation degree $V_r$ of the output voltage of the inverter 34 input here is a value calculated by the current controller 77.

After obtaining the input data, the offset unit execution determiner 75 compares the input electrical angular velocity $\omega_e$ of the motor 32 with a reference value $\omega_e$ref (step S510) and also compares the input modulation degree $V_r$ of the output voltage of the inverter 34 with a reference value $V_r$ref (step S520). The reference value $\omega_e$ref and the reference value $V_r$ref are threshold values used to determine whether the respective processes of the offset unit 70 (i.e., the processes of the electrical first variation component detector 71, the inverter bus bar current estimator 72, the phase current offset estimator 73 and the phase current offset controller 74) are to be performed.

The processing of step S510 is described in detail. In order to perform the respective processes of the offset unit 70, there is a need for detecting the electrical first variation component of the voltage $V_H$ of the smoothing capacitor 39 (as shown in FIG. 4). When the motor 32 is driven at a low rotation speed, there are both a variation in voltage $V_H$ of the smoothing capacitor 39 caused by a variation in the torque command $T_m^*$ of the motor 32 and a variation in voltage $V_H$ of the smoothing capacitor 39 caused by the offsets of the electric currents $I_U$, $I_V$ and $I_W$ of the respective phases of the motor 32. This makes it difficult to accurately set the offset correction amounts $AD_{Vofs}$ and $AD_{Wofs}$. This is thus likely to decrease the accuracy of conversion of the AD values $AD_{IV}$ and $AD_{IW}$ input from the current sensors 32v and 32w of the V phase and the W phase into the control currents $I_{Vcon}$ and $I_{Wcon}$ of the V phase and the W phase that is performed by the phase current physical value calculator 76 using the offset correction amounts $AD_{Vofs}$ and $AD_{Wofs}$. By taking into account the foregoing, the reference value $\omega_e$ref is determined as an electrical angular velocity that causes the frequency of the electrical first variation component of the voltage $V_H$ of the smoothing capacitor 39 caused by the offsets of the electric currents $I_U$, $I_V$ and $I_W$ of the respective phases of the motor 32 to be rather higher the frequency of the variation component of the voltage $V_H$ of the smoothing capacitor 39 caused by the variation in the torque command $Tm^*$ of the motor 32. For example, an electrical angular velocity corresponding to 80 Hz, 100 Hz or 120 Hz may be used as the reference value $\omega_e$ref.

The processing of step S520 is described in detail. The phase current offset estimator 73 derives Equations used for the processing of steps S310 and S320 (Equations (3-1) and (3-2)) in the phase current offset estimating process of FIG. 9, on the premise that the left side of Expression (3-19) is sufficiently larger than the right side of Expression (3-19). These Equations (3-1) and (3-2) accordingly fail to hold when the modulation degree $V_r$ of the output voltage of the inverter 34 decreases to or below a certain level. A lower limit of a range where these Equations (3-1) and (3-2) hold or a slightly larger value than this lower limit should thus be set to the reference value $V_r$ref.

When it is determined at step S510 that the electrical angular velocity $\omega_e$ of the motor 32 is equal to or larger than the reference value $\omega_e$ref and it is determined at step S520 that the modulation degree $V_r$ of the output voltage of the inverter 34 is equal to or larger than the reference value $V_r$ref, the offset unit execution determiner 75 determines that the respective processes of the offset unit 70 (i.e., the processes of the electrical first variation component detector 71, the inverter bus bar current estimator 72, the phase current offset estimator 73 and the phase current offset controller 74) are to be performed (step S530) and then terminates the offset unit execution determining process of FIG. 11.

When it is determined at step S510 that the electrical angular velocity $\omega_e$ of the motor 32 is smaller than the reference value $\omega_e$ref or when it is determined at step S520 that the modulation degree $V_r$ of the output voltage of the inverter 34 is smaller than the reference value $V_r$ref, on the other hand, the offset unit execution determiner 75 determines that the respective processes of the offset unit 70 are not to be preformed (step S540) and then terminates the offset unit execution determining process of FIG. 11.

Figure 12:
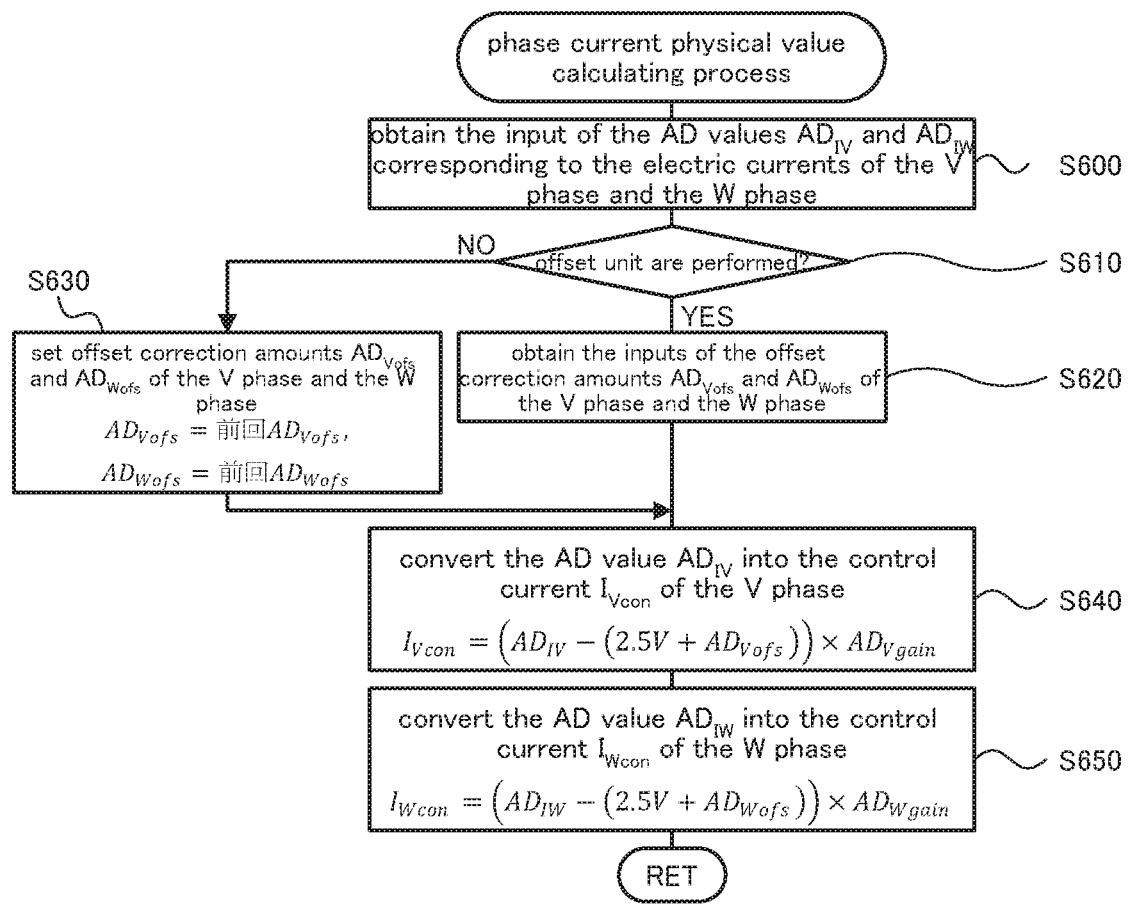
FIG. 12 is a flowchart showing one example of a phase current physical value calculating process performed by a phase current physical value calculator.

The following describes the phase current physical value calculator 76 in detail. FIG. 12 is a flowchart showing one example of a phase current physical value calculating process performed by a phase current physical value calculator. This processing routine is performed repeatedly at an identical period with the execution period of the inverter bus bar current estimating process of FIG. 6.

When the phase current physical value calculating process of FIG. 12 is triggered, the phase current physical value calculator 76 first obtains the input data of the AD values $AD_{IV}$ and $AD_{IW}$ corresponding to the electric currents $I_V$ and $I_W$ of the V phase and the W phase of the motor 32 input from current sensors 32v and 32w (step S600) and subsequently determines whether the respective processes of the offset unit 70 are being performed (step S610).

When it is determined that the respective processes of the offset unit 70 are being performed, the phase current physical value calculator 76 obtains the input data of the offset correction amounts $AD_{Vofs}$ and $AD_{Wofs}$ of the V phase and the W phase (step S620). The offset correction amounts $AD_{Vofs}$ and $AD_{Wofs}$ of the V phase and the W phase input here are values calculated by the phase current offset controller 74 (i.e., the phase current offset control process of FIG. 10).

The phase current physical value calculator 76 subsequently converts the AD value $AD_{IV}$ into the control current $I_{Vcon}$ of the V phase according to Equation (5-1) given below by using the offset correction amount $AD_{Vofs}$ of the V phase (step S640), converts the AD value $AD_{IW}$ into the control current $I_{Wcon}$ of the W phase according to Equation (5-2) given below by using the offset correction amount $AD_{Wofs}$ of the W phase (step S650) and then terminates the phase current physical value calculating process of FIG. 12. In Equation (5-1) and Equation (5-2), "$AD_{Vgain}$" and "$AD_{Wgain}$" denote gains.

$$I_{Vcon} = (AD_{IV} - (2.5V + AD_{Vofs})) \times AD_{Vgain} \quad (5\text{-}1)$$

$$I_{Wcon} = (AD_{IW} - (2.5V + AD_{Wofs})) \times AD_{Wgain} \quad (5\text{-}2)$$

Figure 13:
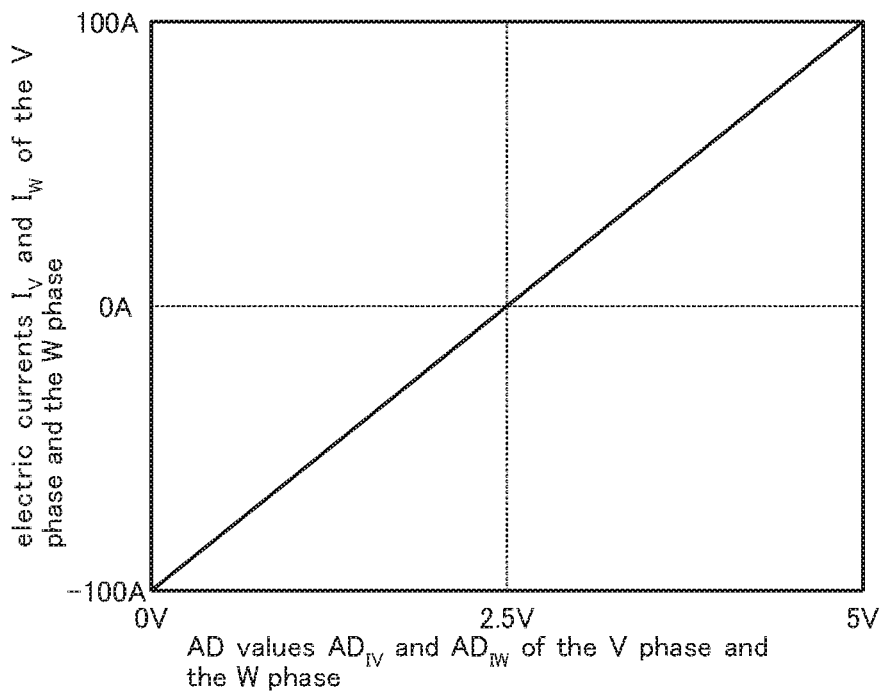
FIG. 13 is a diagram illustrating one example of characteristics of current sensors.

FIG. 13 is a diagram illustrating one example of the characteristics of the current sensors 32v and 32w. According to the first embodiment, the current sensors 32v and 32w are configured such that there are linear relationships between the electric currents $I_V$ and $I_W$ and the AD values $AD_{IV}$ and $AD_{IW}$ of the V phase and the W phase and that the AD values $AD_{IV}$ and $AD_{IW}$ are 0 V, 2.5 V, and 5V when the electric currents $I_V$ and $I_W$ of the V phase and the W phase are equal to −100 A, 0 A and +100 A. In this state, the gains $AD_{Vgain}$ and $AD_{Vgain}$ in Equation (5-1) and Equation (5-2) are both equal to 200/5=40 [A/V].

Figure 14:
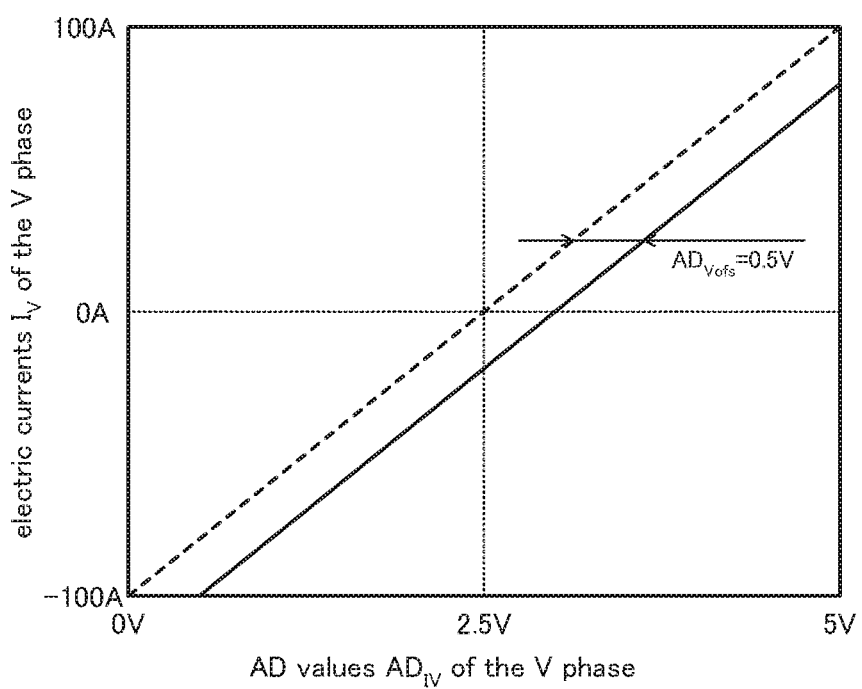
FIG. 14 is a diagram illustrating a relationship between an electric current $I_V$ and an AD value $AD_{IV}$ of a V phase when an offset correction amount $AD_{Vofs}$ of the V phase is equal to 0.5 V.

FIG. 14 is a diagram illustrating a relationship between the electric current $I_V$ and the AD value $AD_{IV}$ of the V phase when the offset correction amount $AD_{Vofs}$ of the V phase is equal to 0.5 V. A broken line curve in FIG. 14 shows the characteristics of the current sensor 32v. The control currents $I_{Vcon}$ and $I_{Wcon}$ of the V phase and the W phase obtained as described above (i.e., the electric currents of the V phase and the W phase recognized by the electronic control unit 50) are corrected values of the electric currents $I_V$ and $I_W$ (actual values) of the V phase and the W phase such that the current offset estimated values $I_{Vofs}$ and $I_{Wofs}$ of the V phase and the W phase become equal to a value 0.

Converting the AD values $AD_{IV}$ and $AD_{IW}$ into the control currents $I_{Vcon}$ and $I_{Wcon}$ of the V phase and the W phase by using the offset correction amounts $AD_{Vofs}$ and $AD_{Wofs}$ of the V phase and the W phase temporarily change the offset amounts of the control currents $I_{Vcon}$ and $I_{Wcon}$ of the V phase and the W phase. The current controller 77, however, performs control, such that the offset amounts of the control currents $I_{Vcon}$ and $I_{Wcon}$ of the V phase and the W phase become equal to a value 0 as described later. The offset amounts of the electric currents $I_V$ and $I_W$ of the V phase and the W phase (actual offset amounts) are thereby varied according to the offset correction amounts $AD_{Vofs}$ and $AD_{Wofs}$ of the V phase and the W phase.

When it is determined at step S610 that the respective processes of the offset unit 70 are not being performed, on the other hand, the phase current physical value calculator 76 sets previous offset correction amounts (previous $AD_{Vofs}$) and (previous $AD_{Wofs}$) of the V phase and the W phase respectively to the offset correction amounts $AD_{Vofs}$ and $AD_{Wofs}$ of the V phase and the W phase (step S630), converts the AD values $AD_{IV}$ and $AD_{IW}$ into the control currents $I_{Vcon}$ and $I_{Wcon}$ of the V phase and the W phase by using the offset correction amounts $AD_{Vofs}$ and $AD_{Wofs}$ of the V phase and the W phase (both equal to a value 0) by the processing of steps S640 and S650 described above and then terminates the phase current physical value calculating process of FIG. 12.

Figure 15:
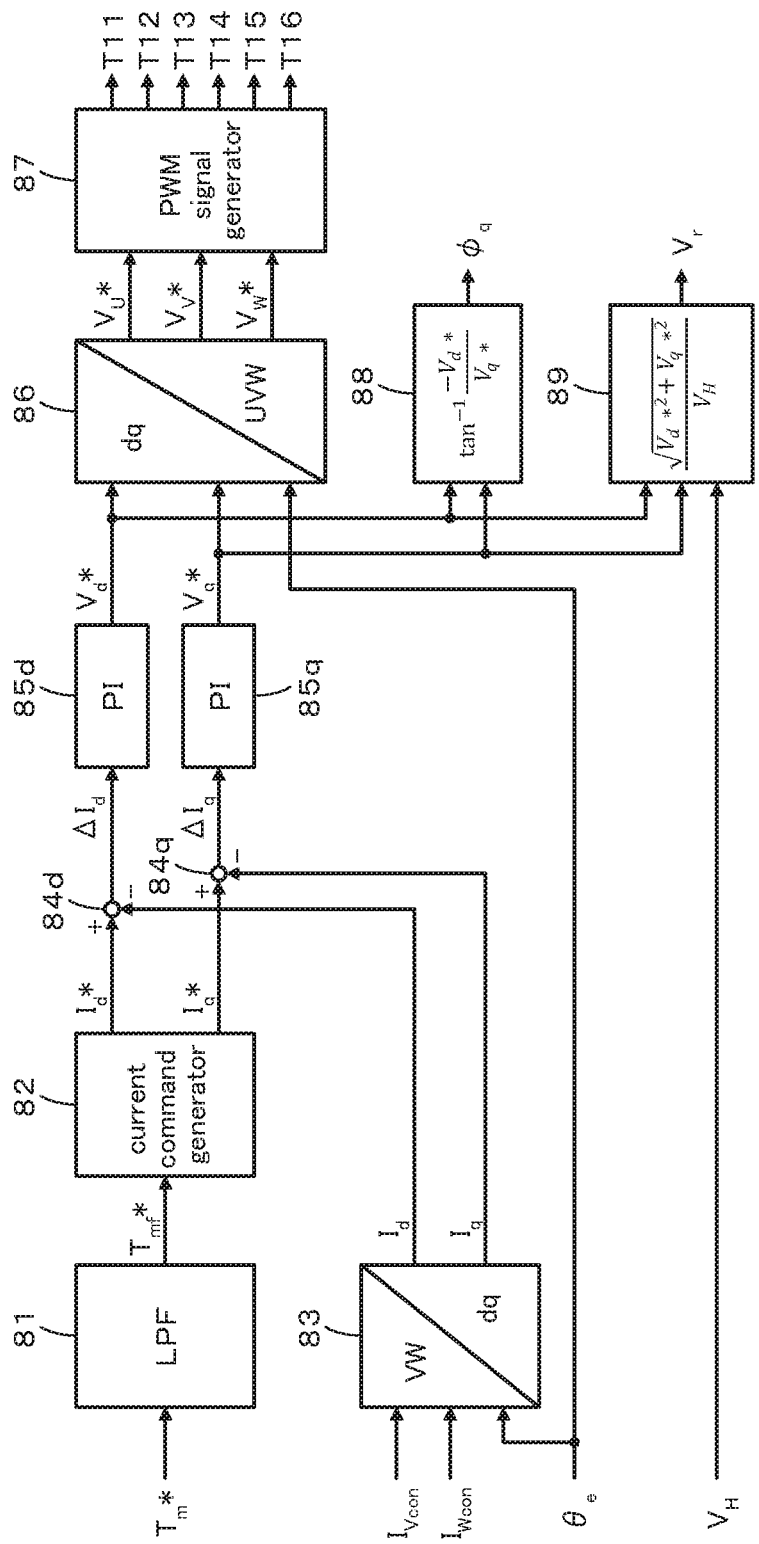
FIG. 15 is a control block diagram illustrating one example of control blocks for the purpose of describing respective processes performed by a current controller.

The following describes the current controller 77 in detail. FIG. 15 is a control block diagram illustrating one example of control blocks for the purpose of describing the respective processes performed by the current controller 77. As shown in FIG. 15, the current controller 77 includes a low pass filter (LPF) 81, a current command generator 82, a coordinate converter 83, subtractors 84d and 84q, feedback controllers (PI controllers) 85d and 85q, a coordinate converter 86, a PWM signal generator 87, a voltage phase calculator 88, and a modulation degree calculator 89.

The low pass filter 81 serves to generate a filtered torque command $T_{mf}^*$ by low pass filter processing of the torque command $T_m^*$ of the motor 32. The current command generator 82 serves to generate current commands $I_d^*$ and $I_q^*$ of the d axis and the q axis by applying the filtered torque command $T_{mf}^*$ to a map that specifies a relationship of the filtered torque command $T_{mf}^*$ to current commands $I_d^*$ and $I_q^*$ of the d axis and the q axis. The coordinate converter 83 serves to perform coordinate conversion (three phase to two phase conversion) of the control currents $I_{Vcon}$ and $I_{Wcon}$ of the V phase and the W phase of the motor 32 into electric currents $I_d$ and $I_q$ of the d axis and the q axis by using the electrical angle $\theta_e$ of the motor 32 on the assumption that the sum of the electric currents flowing through the respective phases is equal to 0.

The subtractors 84d and 84q serve to calculate differences $\Delta I_d$ and $\Delta I_q$ between the current commands $I_d^*$ and $I_q^*$ and the electric currents $I_d$ and $I_q$ of the d axis and the q axis. The feedback controllers (PI controllers) 85d and 85q serve to calculate voltage commands $V_d^*$ and $V_q^*$ of the d axis and the q axis by current feedback control such that the differences $\Delta I_d$ and $\Delta I_q$ become equal to a value 0.

The coordinate converter 86 serves to perform coordinate conversion (two phase to three phase conversion) of the voltage commands $V_d^*$ and $V_q^*$ of the d axis and the q axis into voltage commands $V_U^*$, $V_V^*$ and $V_W^*$ of the respective phases. The PWM signal generator 87 serves to generate a PWM signal of the transistors T11 to T16 by using a triangular wave and the voltage commands $V_U^*$, $V_V^*$ and $V_W^*$ of the respective phases and perform switching control of the transistors T11 to T16. Offset amounts of the control currents $I_{Vcon}$ and $I_{Wcon}$ of the V phase and the W phase (the electric currents of the V phase and the W phase recognized by the electronic control unit 50) are provided as electrical first variation components of the electric currents $I_d$ and $I_q$ of the d axis and the q axis by the coordinate conversion (three phase to two phase conversion). In the case where the motor 32 has sufficiently good responsibility in the current feedback control, the inverter 34 is controlled such that the electric currents $I_d$ and $I_q$ of the d axis and the q axis become equal to the current commands $I_d^*$ and $I_q^*$. This sufficiently decreases the electrical first variations of the electric currents $I_d$ and $I_q$ of the d axis and the q axis (ideally make the electrical first variations equal to zero).

The voltage phase calculator 88 serves to calculate the voltage phase $\phi_q$ with respect to the q axis of the output voltage of the inverter 34 according to Equation (6-1) given below by using the voltage commands $V_d^*$ and $V_q^*$ of the d axis and the q axis. The modulation degree calculator 89 serves to calculate the modulation degree $V_r$ of the output voltage of the inverter 34 according to Equation (6-2) given below by using the voltage commands $V_d^*$ and $V_q^*$ of the d axis and the q axis and the voltage $V_H$ of the smoothing capacitor 39.

$$\varphi_q = \tan^{-1} \frac{-V_d *}{V_q *} \tag{6-1}$$

$$V_r = \frac{\sqrt{V_d *^2 + V_q *^2}}{V_H} \tag{6-2}$$

As described above, the driving system 20 of the first embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$, as the values relating to the electrical first variation component of the voltage $V_H$ of the smoothing capacitor 39. The driving system 20 of the first embodiment subsequently calculates the Fourier cosine coefficient $a_{Im}$ and the Fourier sine coefficient $b_{Im}$, as the values relating to the electrical first variation component of the bus bar current (input current) $I_m$ of the inverter 34, based on the Fourier cosine coefficient $a_{VH}$ and the Fourier sine coefficient $b_{VH}$ of the voltage $V_H$ of the smoothing capacitor 39. The driving system 20 of the first embodiment subsequently calculates the current offset estimated values $I_{Vofs}$ and $I_{Wofs}$ of the V phase and the W phase, based on the Fourier cosine coefficient $a_{Im}$ and the Fourier sine coefficient $b_{Im}$ of the bus bar current $I_m$ of the inverter 34, and calculates the offset correction amounts $AD_{Vofs}$ and $AD_{Wofs}$ of the V phase and the W phase, such that the current offset estimated values $I_{Vofs}$ and $I_{Wofs}$ of the V phase and the W phase become equal to the value 0. The driving system 20 of the first embodiment also converts the AD values $AD_{IV}$ and $AD_{IW}$ corresponding to the electric currents $I_V$ and $I_W$ of the V phase and the W phase of the motor 32 input from the current sensors 32v and 32w into the control currents $I_{Vcon}$ and $I_{Wcon}$ of the V phase and the W phase accompanied with correction using the offset correction amounts $AD_{Vofs}$ and $AD_{Wofs}$ of the V phase and the W phase. The driving system 20 of the first embodiment then performs switching control of the transistors T11 to T16 included in the inverter 34, such that the motor 32 is driven with the torque command $T_m^*$, based on the control currents $I_{Vcon}$ and $I_{Wcon}$ of the V phase and the W phase obtained by the conversion. The configuration of the first embodiment accordingly performs Fourier series expansion of the voltage $V_H$ of the smoothing capacitor 39 to extract the electrical first variation component of the voltage $V_H$ of the smoothing capacitor 39. This configuration thus sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Second Embodiment

Figure 16:
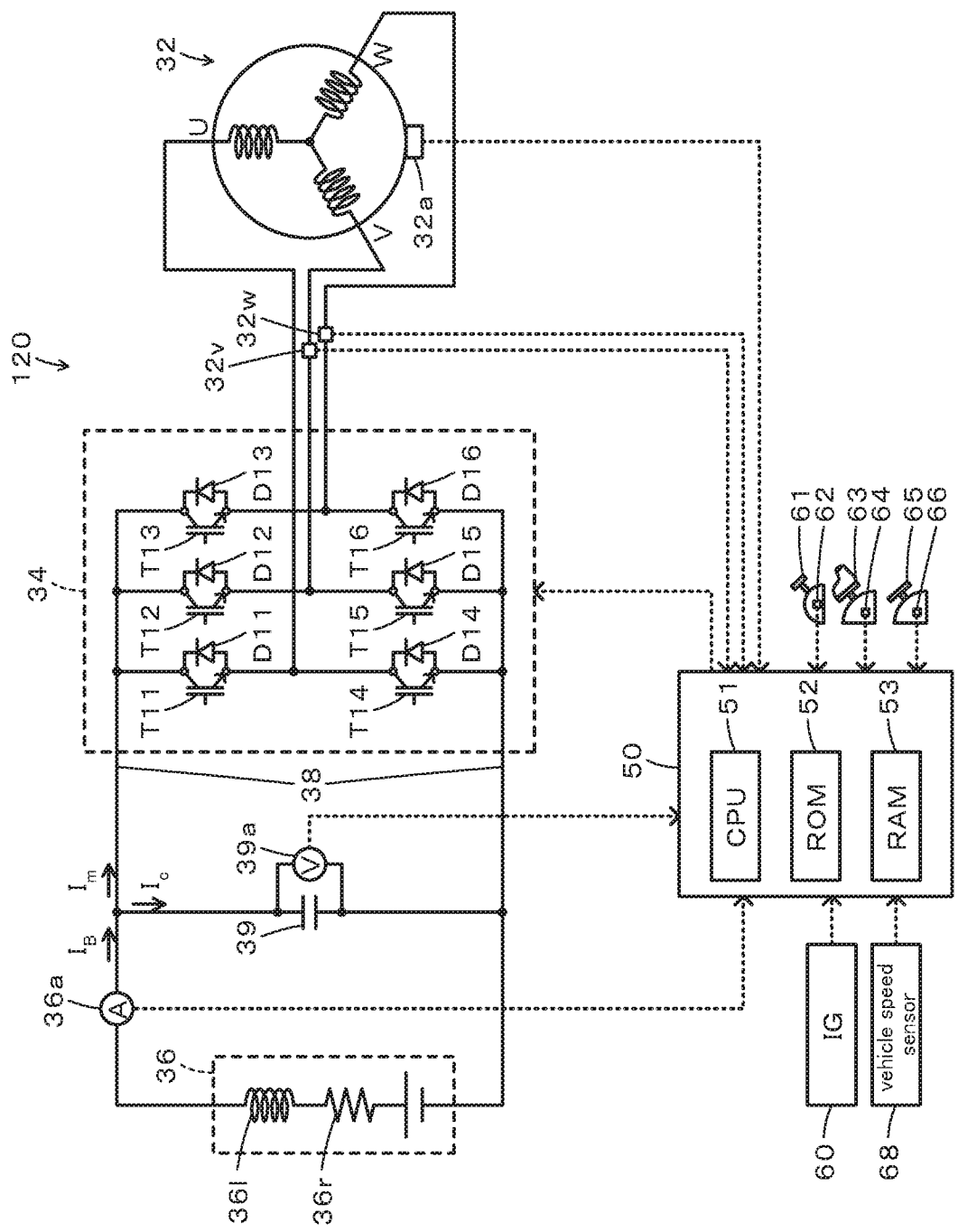
FIG. 16 is a configuration diagram illustrating the schematic configuration of a driving system according to a second embodiment.

The following describes a driving system 120 according to a second embodiment. FIG. 16 is a configuration diagram illustrating the schematic configuration of a driving system according to a second embodiment. The driving system 120 of the second embodiment has a similar hardware configuration to the hardware configuration of the driving system 20 of the first embodiment shown in FIG. 1, except addition of a current sensor 36a mounted to an output terminal of the battery 36. The like components in the hardware configuration of the driving system 120 of the second embodiment to those of the driving system 20 of the first embodiment are expressed by the like reference signs, and their detailed description is omitted. The electric current $I_B$ of the battery 36 detected by the current sensor 36a is also input into the electronic control unit 50 via the input port.

Figure 17:
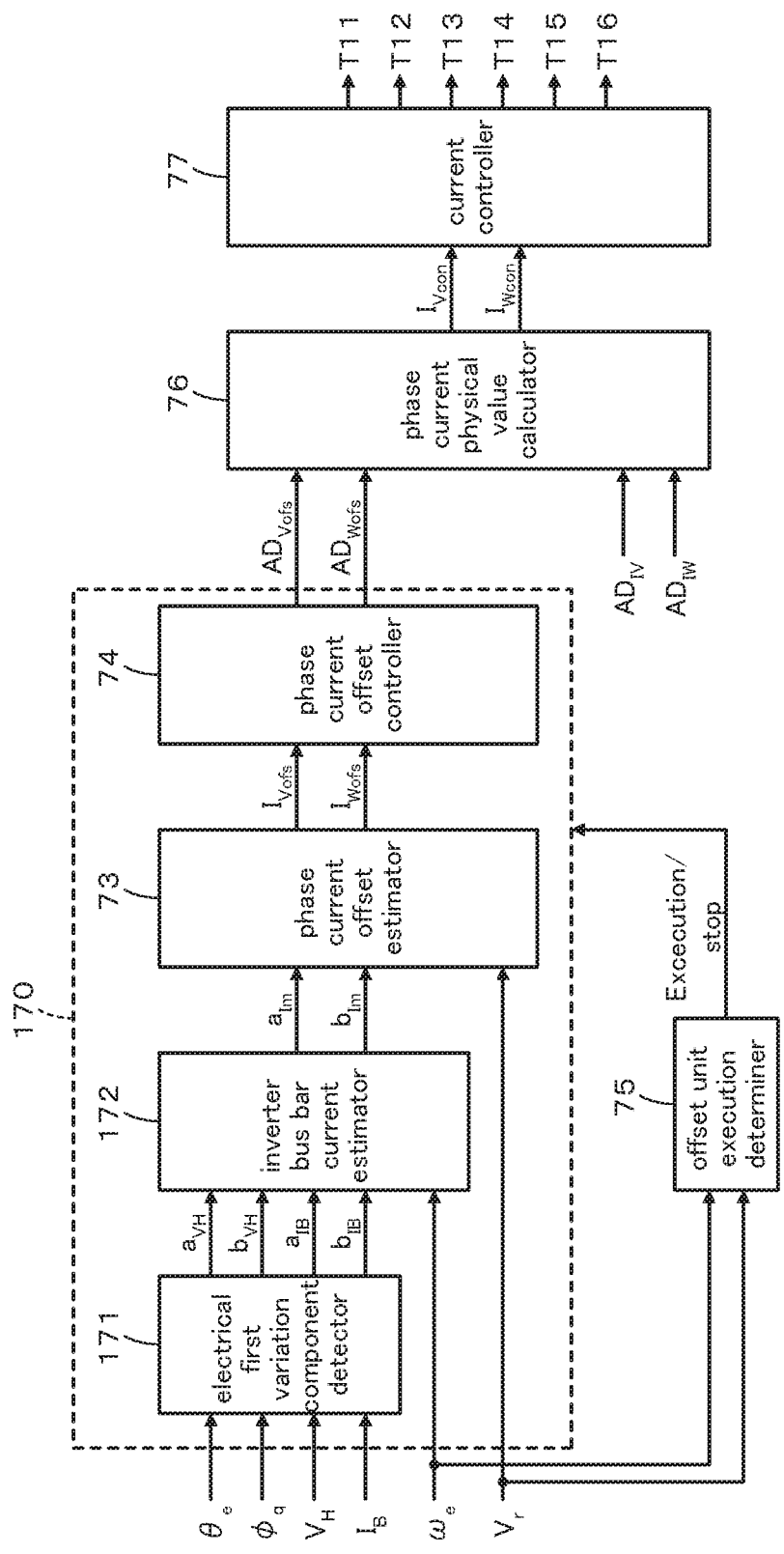
FIG. 17 is a control block diagram illustrating one example of control blocks for controlling the inverter in the PWM control mode by the electronic control unit in the driving system of the second embodiment.

The following describes a series of control of the inverter 34 performed by the electronic control unit 50 in the driving system 120 of the second embodiment. FIG. 17 is a control block diagram illustrating one example of control blocks for controlling the inverter 34 in a PWM control mode by the electronic control unit 50 of the driving system 120 according to the second embodiment. The control block diagram of FIG. 17 is similar to the control block diagram of FIG. 2, except replacement of the electrical first variation component detector 71 and the inverter bus bar current estimator 72 of the offset unit 70 with an electrical first variation component detector 171 and an inverter bus bar current estimator 172 of an offset unit 170 (including differences of input data and output data). The electrical first variation component detector 171 and the inverter bus bar current estimator 172 are accordingly described in detail.

Figure 18:
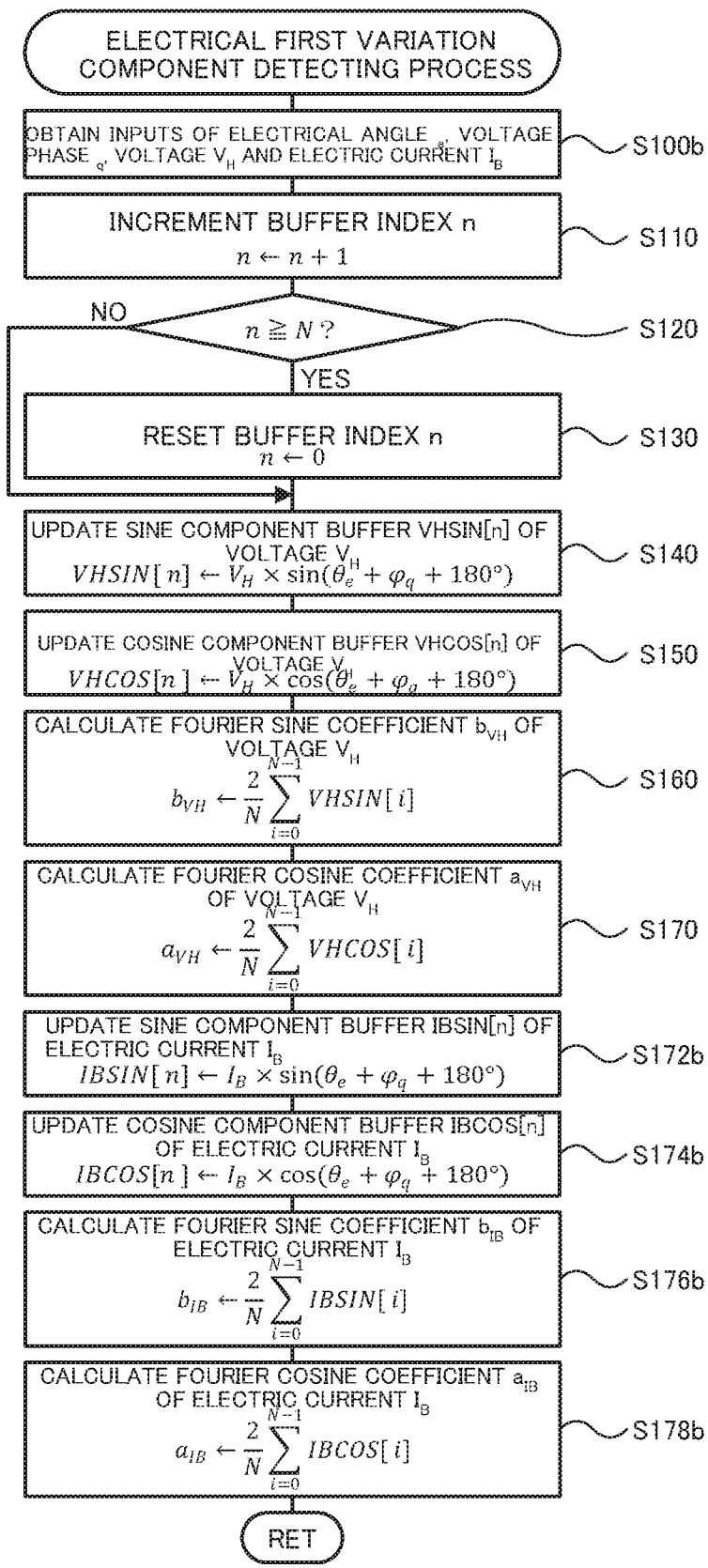
FIG. 18 is a flowchart showing one example of an electrical first variation component detecting process performed by an electrical first variation component detector according to the second embodiment.

The electrical first variation component detector 171 is described first. FIG. 18 is a flowchart showing one example of an electrical first variation component detecting process performed by an electrical first variation component detector according to the second embodiment. The electrical first variation component detecting process of FIG. 18 is similar to the electrical first variation component detecting process of FIG. 3, except replacement of the processing of step S100 with the processing of step S100b and addition of the processing of steps S172b to S178b. The like processing steps are expressed by the like step numbers, and their detailed description is omitted.

When the electrical first variation component detecting process of FIG. 18 is triggered, the electrical first variation component detector 171 first obtains the input data, for example, the electrical angle $\theta_e$ of the motor 32, the voltage phase $\phi_q$ with respect to the q axis of the output voltage of the inverter 34, the voltage $V_H$ of the smoothing capacitor 39, and the electric current $I_B$ of the battery 36 (step S100b). The data other than the electric current $I_B$ of the battery 36 are input by the methods described above with regard to the first embodiment. The electric current $I_B$ of the battery 36 input here is a value detected by the current sensor 36a.

After calculating the Fourier cosine coefficient $a_{VH}$ and the Fourier sine coefficient $b_{VH}$ of the voltage $V_H$ of the smoothing capacitor 39 (steps S160 and S170), the electrical first variation component detector 171 updates a sine component buffer IBSIN[n] and a cosine component buffer IBCOS[n] of the electric current $I_B$ of the battery 36 according to Expression (7-1) and Expression (7-2) given below by using the electric current $I_B$ of the battery 36, the electrical angle $\theta_e$ of the motor 32 and the voltage phase $\phi_q$ of the output voltage of the inverter 34 (steps S172b and S174b).

$$IB\ SIN[n] \leftarrow I_B \times \sin(\theta_e + \phi_q + 180°) \quad (7\text{-}1)$$

$$IB\ COS[n] \leftarrow I_B \times \cos(\theta_e + \phi_q + 180°) \quad (7\text{-}2)$$

The electrical first variation component detector 171 subsequently calculates a Fourier sine coefficient $b_{IB}$ of the electric current $I_B$ of the battery 36 according to Expression (7-3) given below by using the sine component buffer IBSIN[i] (where i=0, ..., N−1) of the electric current $I_B$ of the battery 36 (step S176b), calculates a Fourier cosine coefficient $a_{IB}$ of the electric current $I_B$ of the battery 36 according to Expression (7-4) given below by using the cosine component buffer IBCON[i] of the electric current $I_B$ of the battery 36 (step S178b) and then terminates the electrical first variation component detecting process of FIG. 18. The sine component buffer IBSIN[n], the cosine component buffer IBCOS[n], the Fourier sine coefficient $b_{IB}$ and the Fourier cosine coefficient $a_{IB}$ of the electric current $I_B$ of the battery 36 are values relating to the electrical first variation component of the electric current $I_B$ of the battery 36. The method of deriving Expressions (7-1) to (7-4) are similar to the method of deriving Expressions (1-1) to (1-4) described above.

$$b_{IB} \leftarrow \frac{2}{N} \sum_{i=0}^{N-1} IBSIN[i] \quad (7\text{-}3)$$

$$a_{IB} \leftarrow \frac{2}{N} \sum_{i=0}^{N-1} IBCOS[i] \quad (7\text{-}4)$$

Figure 19:
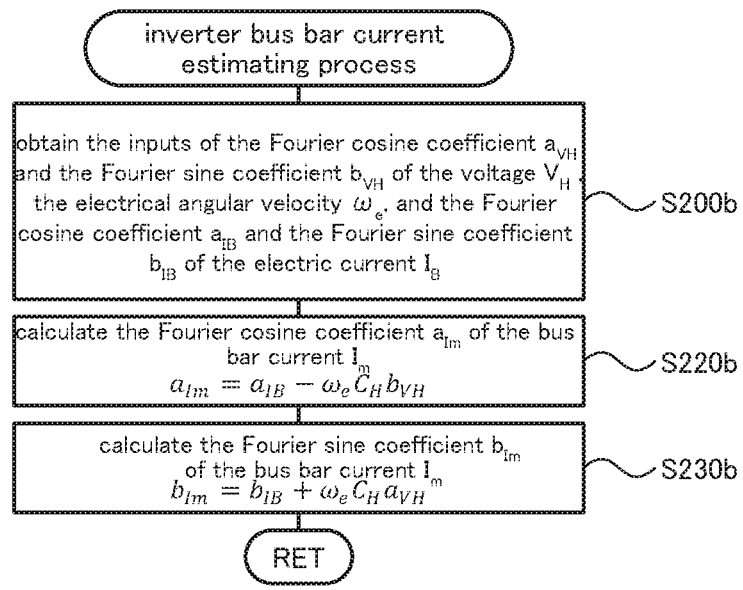
FIG. 19 is a flowchart showing one example of an inverter bus bar current estimating process performed by an inverter bus bar current estimator according to the second embodiment.

The inverter bus bar current estimator 172 is described next. FIG. 19 is a flowchart showing one example of an inverter bus bar current estimating process performed by the inverter bus bar current estimator 172. When the inverter bus bar current estimating process of FIG. 19 is triggered, the inverter bus bar current estimator 172 first obtains the input data, for example, the Fourier cosine coefficient $a_{VH}$ and the Fourier sine coefficient $b_{VH}$ of the voltage $V_H$ of the smoothing capacitor 39, the electrical angular velocity $\omega_e$ of the motor 32 and the Fourier cosine coefficient $a_{IB}$ and the Fourier sine coefficient $b_{IB}$ of the electric current $I_B$ of the battery 36 (step S200b). The Fourier cosine coefficient $a_{VH}$ and the Fourier sine coefficient $b_{VH}$ of the voltage $V_H$ of the smoothing capacitor 39 and the electrical angular velocity $\omega_e$ of the motor 32 are input by the methods described above with regard to the first embodiment. The Fourier cosine coefficient $a_{IB}$ and the Fourier sine coefficient $b_{IB}$ of the electric current $I_B$ of the battery 36 input here are values calculated by the electrical first variation component detector 171 (i.e., the electrical first variation component detecting process of FIG. 18).

After obtaining the input data, the inverter bus bar current estimator 172 subsequently calculates the Fourier cosine coefficient $a_{Im}$ of the bus bar current $I_m$ of the inverter 34 according to Equation (7-5) given below by using the input Fourier cosine coefficient $a_{IB}$ of the electric current $I_B$ of the battery 36, the input electrical angular velocity $\omega_e$ of the motor 32 and the input Fourier sine coefficient $b_{VH}$ of the voltage $V_H$ of the smoothing capacitor 39 (step S220b). The inverter bus bar current estimator 172 also calculates the Fourier sine coefficient $b_{Im}$ of the bus bar current $I_m$ of the inverter 34 according to Equation (7-6) given below by using the input Fourier sine coefficient $b_{IB}$ of the electric current $I_B$ of the battery 36, the input electrical angular velocity $\omega_e$ of the motor 32 and the input Fourier cosine coefficient $a_{VH}$ of the voltage $V_H$ of the smoothing capacitor 39 (step S230b) and then terminates the inverter bus bar current estimating process of FIG. 19. In Equation (7-5) and Equation (7-6), "$C_H$" denotes a capacity value of the smoothing capacitor 39.

$$a_{Im} = a_{IB} - \omega_e C_H b_{VH} \tag{7-5}$$

$$b_{Im} = b_{IB} + \omega_e C_H a_{VH} \tag{7-6}$$

The following describes a method of deriving Equation (7-5) and Equation (7-6) given above. Equation (7-7) given below holds between the electric current $I_B$ of the battery 36, the electric current $I_c$ of the smoothing capacitor 39 and the bus bar current $I_m$ of the inverter 34 on the periphery of the smoothing capacitor 39. Equation (7-8) given below also holds between the electric current $I_c$ and the voltage $V_H$ of the smoothing capacitor 39 by using the capacity value $C_H$ of the smoothing capacitor 39.

$$I_m = I_B - I_C \tag{7-7}$$

$$I_C = \frac{d}{dt} C_H V_H \tag{7-8}$$

An electrical first variation component $V_{H1}$ of the voltage $V_H$ of the smoothing capacitor 39 is expressed by Equation (7-9) given below. Accordingly, when the attention is focused on only the electrical first variation component $V_{H1}$ with regard to the voltage $V_H$ of the smoothing capacitor 39, an electrical first variation component $I_{c1}$ of the electric current $I_c$ of the smoothing capacitor 39 is expressed by Equation (7-10) given below, based on Equations (7-8) and (7-9). On definition of Equation (7-11) given below, Equation (7-12) given below is derived from Equation (7-10).

$$V_{H1} = a_{VH} \cos\theta + b_{VH} \sin\theta \tag{7-9}$$

$$I_{C1} = \frac{d}{dt} C_H (a_{VH} \cos\theta + b_{VH} \sin\theta) \tag{7-10}$$

$$\frac{d}{dt} \theta = \omega_e \tag{7-11}$$

$$I_{C1} = \omega_e C_H (b_{VH} \cos\theta - a_{VH} \sin\theta) \tag{7-12}$$

An electrical first variation component $I_{B1}$ of the electric current Is of the battery 36 is expressed by Equation (7-13) given below. Accordingly, when the attention is focused on only the electrical first variation components $I_{B1}$ and $V_{H1}$ with regard to the electric current $I_B$ of the battery 36 and the voltage $V_H$ of the smoothing capacitor 39, the electrical first variation component $I_{m1}$ of the bus bar current $I_m$ of the inverter 34 is expressed by Equation (7-14) given below, based on Equations (7-12) and (7-13).

$$I_{B1} = a_{IB} \cos\theta + b_{IB} \sin\theta \tag{7-13}$$

$$I_{m1} = a_{IB} \cos\theta + b_{IB} \sin\theta - \omega_e C_H (b_{VH} \cos\theta - a_{VH} \sin\theta) \tag{7-14}$$

Equation (7-15) given below is derived by rewriting Equation (7-14). A coefficient for cos θ in the first term on the right side of this Equation (7-15) is obtained as the Fourier cosine coefficient $a_{Im}$ of the bus bar current $I_m$ of the inverter 34 as shown by Equation (7-5) given above. A coefficient for sinθ in the second term on the right side of Equation (7-15) is obtained as the Fourier sine coefficient $b_{Im}$ of the bus bar current $I_m$ of the inverter 34 as shown by Equation (7-6) given above. Accordingly, Equation (7-15) is rewritten as Equation (7-16) given below. By taking into account the foregoing, the inverter bus bar current estimator 172 (i.e., the inverter bus bar current estimating process of FIG. 19) calculates the Fourier cosine coefficient $a_{Im}$ and the Fourier sine coefficient $b_{Im}$ of the bus bar current $I_m$ of the inverter 34 according to Equation (7-5) and Equation (7-6) (steps S220b and S230b).

$$I_{m1} = (a_{IB} - \omega_e C_H b_{VH}) \cos\theta + (b_{IB} + \omega_e C_H a_{VH}) \sin\theta \tag{7-15}$$

$$I_{m1} = a_{Im} \cos\theta + b_{Im} \sin\theta \tag{7-16}$$

Calculating the Fourier cosine coefficient $a_{Im}$ and the Fourier sine coefficient $b_{Im}$ of the bus bar current $I_m$ of the inverter 34 by using the electric current $I_B$ of the battery 36 (more specifically, the Fourier cosine coefficient $a_{IB}$ and the Fourier sine coefficient $b_{IB}$ of the electric current $I_B$ of the battery 36) as described above enables the Fourier cosine coefficient $a_{Im}$ and the Fourier sine coefficient $b_{Im}$ of the bus bar current $I_m$ of the inverter 34 to be calculated without using the resistance value $R_B$ of the internal resistance 36r and the inductance value $L_B$ of the internal inductance 36l of the battery 36, i.e., without being affected by variations in the resistance value $R_B$ and the inductance value $L_B$.

As described above, like the driving system 20 of the first embodiment, the driving system 120 of the second embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 120 of the second embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Furthermore, the driving system 120 of the second embodiment calculates the Fourier cosine coefficient $a_{Im}$ and the Fourier sine coefficient $b_{Im}$ of the bus bar current $I_m$ of the inverter 34, based on the Fourier cosine coefficient $a_{IB}$ and the Fourier sine coefficient $b_{IB}$ of the electric current $I_B$ of the battery 36. This configuration enables the Fourier cosine coefficient $a_{Im}$ and the Fourier sine coefficient $b_{Im}$ of the bus bar current $I_m$ of the inverter 34 to be calculated without using the resistance value $R_B$ of the internal resistance 36r and the inductance value $L_B$ of the internal inductance 36l of the battery 36, i.e., without being affected by variations in the resistance value $R_B$ and the inductance value $L_B$.

Third Embodiments

Figure 20:
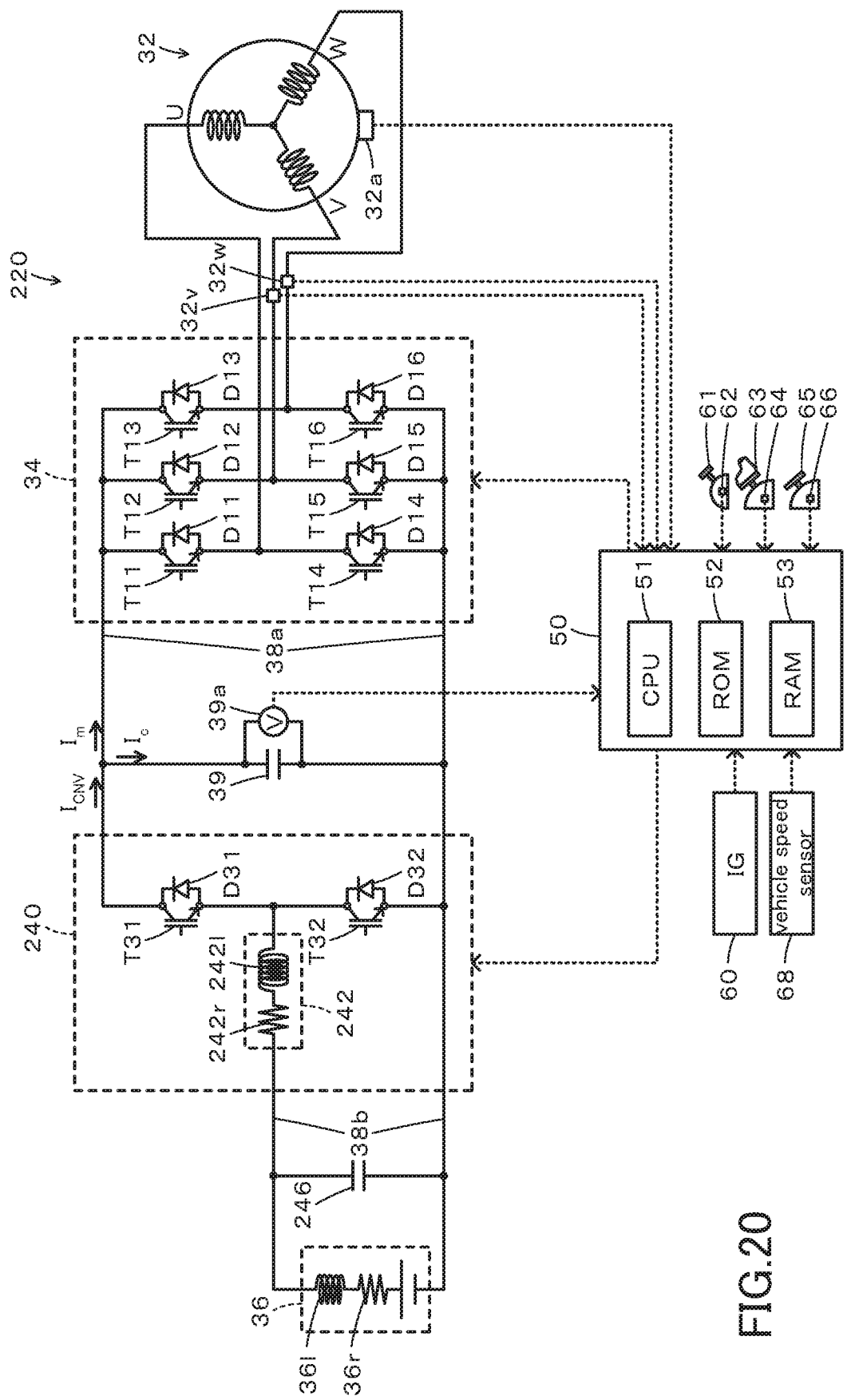
FIG. 20 is a configuration diagram illustrating the schematic configuration of a driving system according to a third embodiment.

The following describes a driving system 220 according to a third embodiment. FIG. 20 is a configuration diagram illustrating the schematic configuration of a driving system according to a third embodiment. The driving system 220 of the third embodiment has a similar hardware configuration to the hardware configuration of the driving system 20 of the first embodiment shown in FIG. 1, except that a boost converter 240 and a smoothing capacitor 246 are added and that high voltage-side power lines 38a and low voltage-side power lines 38b are provided on the inverter 34-side of the boost converter 240 and on the battery 36-side of the boost converter 240 as the power lines 38. The like components in the hardware configuration of the driving system 220 of the third embodiment to those of the driving system 20 of the first embodiment are expressed by the like reference signs, and their detailed description is omitted.

The boost converter 240 is connected with the inverter 34 via the high voltage-side power lines 38a and is also connected with the battery 36 via the low voltage-side power lines 38b. This boost converter 240 includes two transistors T31 and T32 that serve as switching elements, two diodes D31 and D32 that are respectively connected in parallel with the two transistors T31 and T32, and a reactor 242. The transistor T31 is connected with a positive electrode line of the high voltage-side power lines 38a. The transistor T32 is connected with the transistor T31 and with negative electrode lines of the high voltage-side power lines 38a and of the low voltage-side power lines 38b. The reactor 242 is connected with a connection point between the transistors T31 and T32 and with a positive electrode line of the low voltage-side power lines 38b. This reactor 242 has a resistance component 242r and an inductance component 242l. In response to regulation of a ratio of ON times of the transistors T31 and T32 by the electronic control unit 50, the boost converter 240 serves to step up the voltage of electric power of the low voltage-side power lines 38b and supply the electric power of the stepped-up voltage to the high voltage-side power lines 38a and to step down the voltage of electric power of the high voltage-side power lines 38a and supply the electric power of the stepped-down voltage to the low voltage-side power lines 38b. The smoothing capacitor 246 is mounted to a positive bus bar and a negative bus bar of the low voltage-side power lines 38b.

Like in the driving system 20 of the first embodiment described above, in the driving system 220 of this embodiment, the electronic control unit 50 sets the required torque $T_d^*$ that is required for the driveshaft, based on the accelerator position Acc and the vehicle speed V, sets the torque command $T_m^*$ of the motor 32, such that the set required torque $T_d^*$ is output to the driveshaft, and performs switching control of the transistors T11 to T16 included in the inverter 34, such that the motor 32 is driven with the torque command $T_m^*$. The electronic control unit 50 also sets a target voltage $V_H^*$ of the smoothing capacitor 39 (high voltage-side power lines 38a), such that the motor 32 is driven with the torque command $T_m^*$, sets a duty command D such that the voltage $V_H$ of the smoothing capacitor 39 becomes equal to a target voltage $V_H^*$, and performs switching control of the transistors T31 and T32 included in the boost converter 240 by using the set duty command D. The duty command D is defined as a product of a rate of the ON time of the transistor T31 to the sum of the ON time of the transistor T31 and the ON time of the transistor T32, and a value 100.

Figure 21:
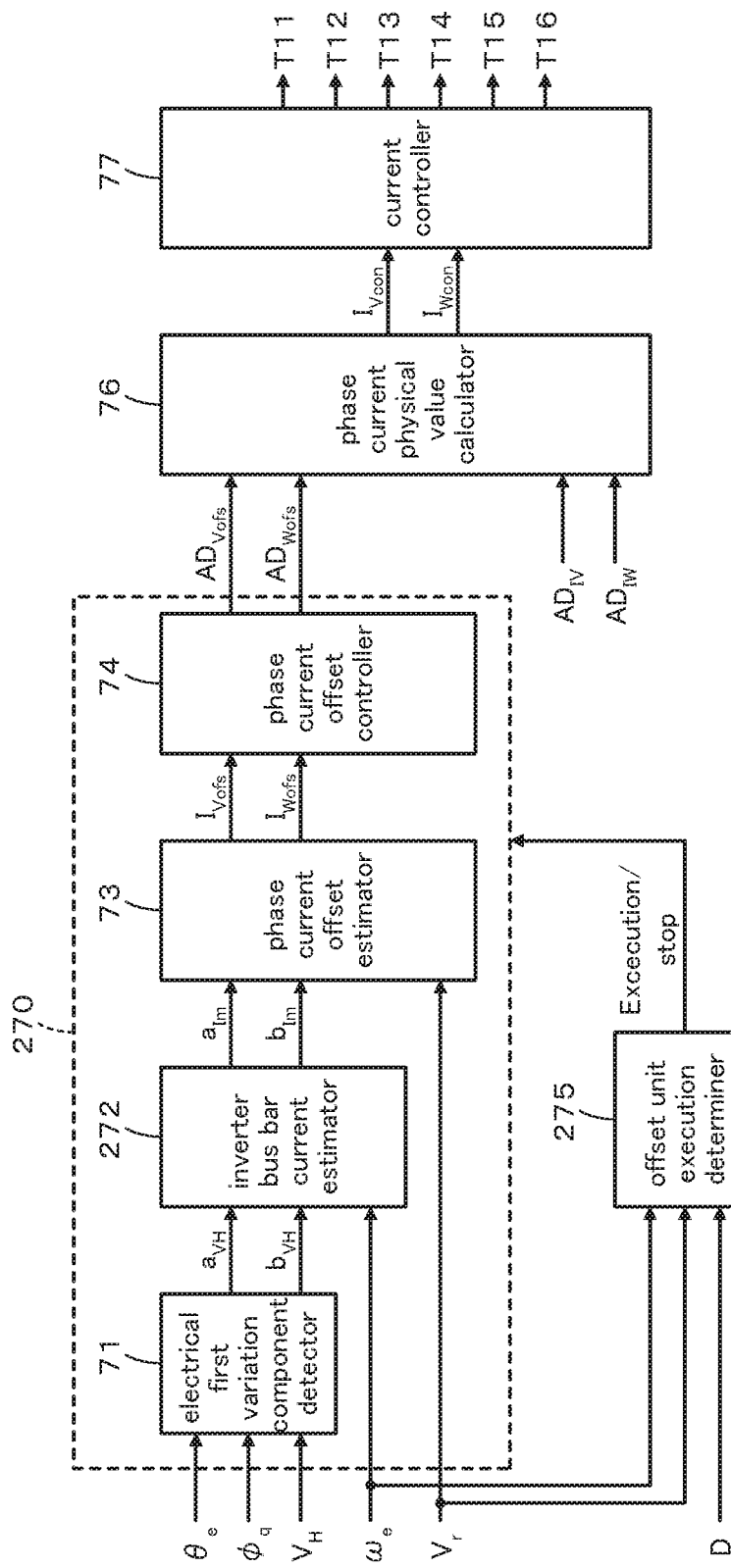
FIG. 21 is a control block diagram illustrating one example of control blocks for controlling the inverter in the PWM control mode by the electronic control unit in the driving system of the third embodiment.

The following describes a series of control of the inverter 34 performed by the electronic control unit 50 in the driving system 220 of the third embodiment. FIG. 21 is a control block diagram illustrating one example of control blocks for controlling the inverter in the PWM control mode by the electronic control unit in the driving system of the third embodiment. The control block diagram of FIG. 21 is similar to the control block diagram of FIG. 2, except replacement of the inverter bus bar current estimator 72 and the offset unit execution determiner 75 of the offset unit 70 with an inverter bus bar current estimator 272 and an offset unit execution determiner 275 of an offset unit 270 (including differences of input data). The inverter bus bar current estimator 272 and the offset unit execution determiner 275 are accordingly described in detail.

Figure 22:
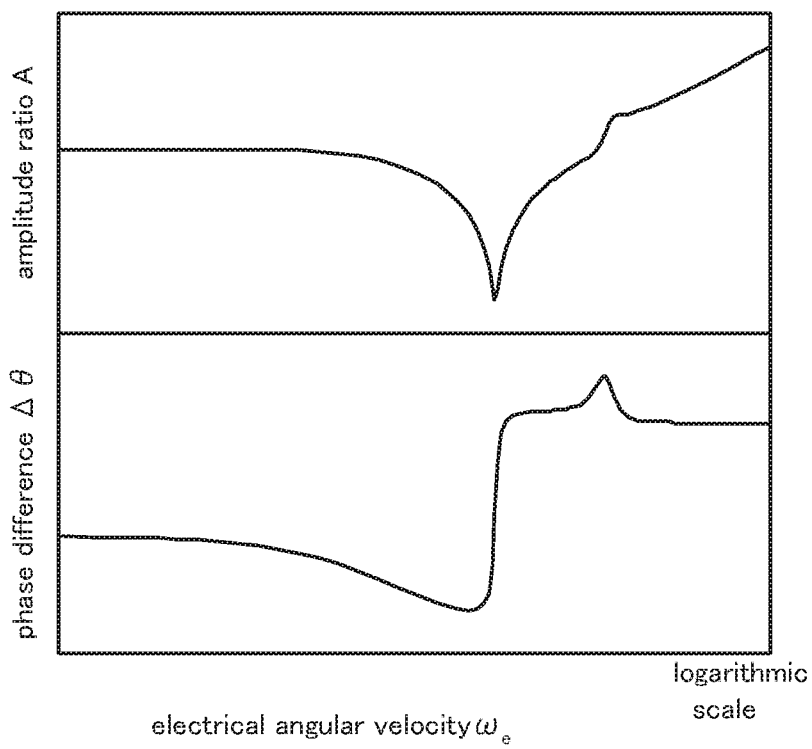
FIG. 22 is a diagram illustrating one example of a map that specifies relationships of the amplitude ratio A and the phase difference $\Delta\theta$ to the electrical angular velocity $\omega_e$ of the motor according to the third embodiment.
Figure 23:
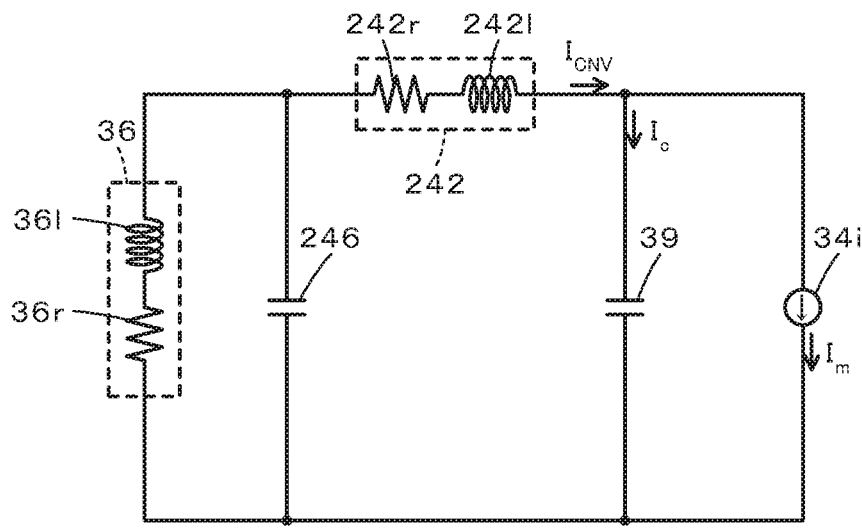
FIG. 23 is a circuit diagram illustrating a circuit obtained by regarding the inverter of the driving system as the current source and removing a direct current component from the circuit configuration of the driving system of the third embodiment when a stepping-up operation of a boost converter is stopped (i.e., when a duty command D is equal to 100%)

The inverter bus bar current estimator 272 is described first. Like the inverter bus bar current estimator 72, the inverter bus bar current estimator 272 performs the inverter bus bar current estimating process of FIG. 6. The inverter bus bar current estimator 272, however, has different frequency characteristics of the circuit from the battery 36 to the smoothing capacitor 39 or more specifically uses a different map (Bode diagram) used for the processing of step S210 from that of the inverter bus bar current estimator 72. FIG. 22 is a diagram illustrating one example of a map that specifies relationships of the amplitude ratio A and the phase difference $\Delta\theta$ to the electrical angular velocity $\omega_e$ of the motor 32. The map of FIG. 22 is created by calculating the transfer function $I_m/V_H$ with regard to a circuit shown in FIG. 23. The circuit of FIG. 23 is equivalent to a circuit obtained by regarding the inverter 34 of the driving system 220 as a current source 34i and removing the direct current component from the circuit configuration of the driving system 220 when a stepping-up operation of the boost converter 240 is stopped (i.e., when the duty command D is equal to 100%). With regard to the circuit of FIG. 23, the transfer function $I_m/V_H$ is expressed by Equation (8-1) given below. In Equation (8-1), "$C_H$" and "$C_F$" respectively denote capacity values of the smoothing capacitor 39 and of the smoothing capacitor 246, "$R_B$" denotes a resistance value of the internal resistance 36r of the battery 36, "$L_B$" denotes an inductance value of the internal inductance 36l of the battery 36, "$R_R$" denotes a resistance value of the resistance component 242r of the reactor 242, "$L_R$" denotes an inductance value of the inductance component 242l of the reactor 242, and "s" represents the Laplacian operator. The map of FIG. 22 may be created as the result of experiments and analyses, instead of being created by calculating the transfer function $I_m/V_H$ with regard to the circuit of FIG. 23.

$$\frac{I_m}{V_H} = \frac{1 + s(R_B C_F + R_R C_H) + s^2(R_R R_B C_F C_H + L_B C_F + L_R C_H) + s^3(R_R L_B C_F C_H + R_B L_R C_F C_H) + s^4(L_B L_R C_F C_H)}{(R_B + R_R) + s(R_B R_R C_F + L_B + L_R) + s^2(R_R L_B C_F + R_B L_R C_F) + s^3(L_B L_R C_F)} \quad (8\text{-}1)$$

Figure 24:
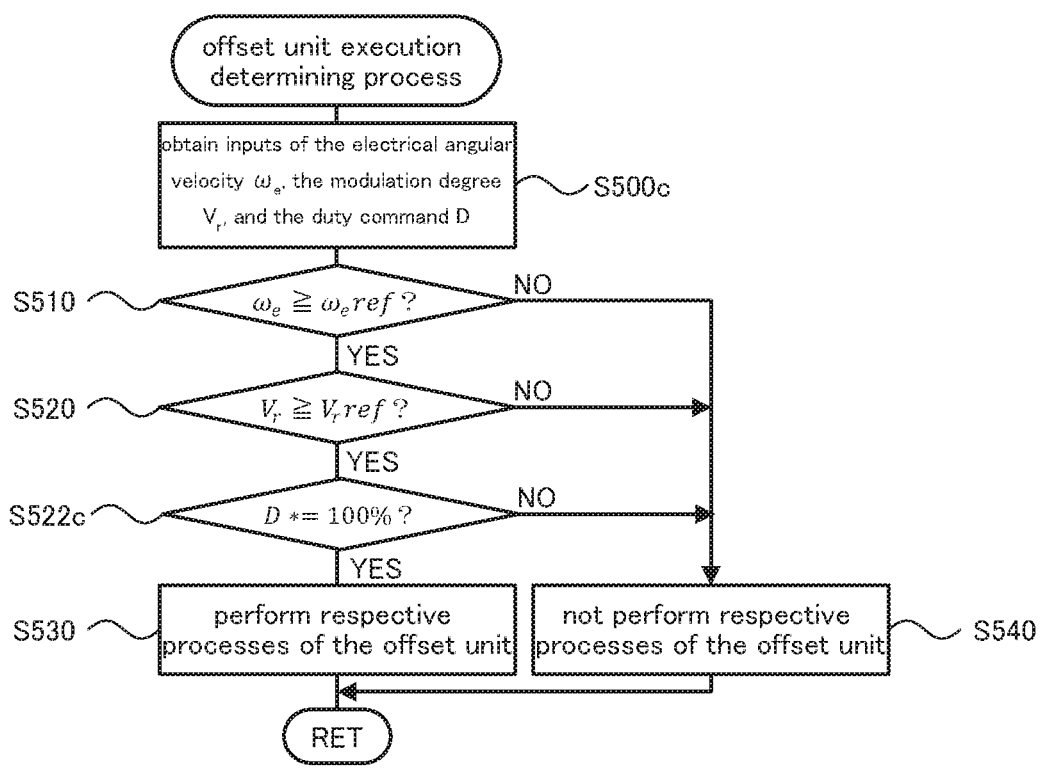
FIG. 24 is a flowchart showing one example of an offset unit execution determining process performed by an offset unit execution determiner according to the third embodiment.

The offset unit execution determiner 275 is described next. FIG. 24 is a flowchart showing one example of an offset unit execution determining process performed by an offset unit execution determiner according to the third embodiment. The offset unit execution determining process of FIG. 24 is similar to the offset unit execution determining process of FIG. 11, except replacement of the processing of step S500 with the processing of step S500c and addition of the processing of step S522c. The like processing steps are expressed by the like step numbers, and their detailed description is omitted.

When the offset unit execution determining process of FIG. 24 is triggered, the offset unit execution determiner 275 first obtains the input data, for example, the electrical angular velocity $\omega_e$ of the motor 32, the modulation degree $V_r$ of the output voltage of the inverter 34 and the duty command D of the boost converter 240 (step S500c). The electrical angular velocity $\omega_e$ of the motor 32, the modulation degree $V_r$ of the output voltage of the inverter 34 are input by the methods described above with regard to the first embodiment. The duty command D of the boost converter 240 input here is a value set as described above.

After obtaining the input data, the offset unit execution determiner 275 compares the input electrical angular velocity $\omega_e$ of the motor 32 with the reference value $\omega_e$ref (step S510), compares the input modulation degree $V_r$ of the output voltage of the inverter 34 with the reference value $V_r$ref (step S520), and subsequently determines whether the duty command D is equal to 100% (step S522c).

When it is determined at step S510 that the electrical angular velocity $\omega_e$ of the motor 32 is equal to or larger than the reference value $\omega_e$ref, it is determined at step S520 that the modulation degree $V_r$ of the output voltage of the inverter 34 is equal to or larger than the reference value $V_r$ref, and it is determined at step S522c that the duty command D is equal to 100%, the offset unit execution determiner 275 determines that the respective processes of the offset unit 270 (i.e., the processes of the electrical first variation component detector 71, the inverter bus bar current estimator 272, the phase current offset estimator 73 and the phase current offset controller 74) are to be performed (step S530) and then terminates the offset unit execution determining process of FIG. 24.

When it is determined at step S510 that the electrical angular velocity $\omega_e$ of the motor 32 is smaller than the reference value $\omega_e$ref, when it is determined at step S520 that the modulation degree $V_r$ of the output voltage of the inverter 34 is smaller than the reference value $V_r$ref or when it is determined at step S522c that the duty command D is not equal to 100%, on the other hand, the offset unit execution determiner 275 determines that the respective processes of the offset unit 270 are not to be preformed (step S540) and then terminates the offset unit execution determining process of FIG. 24.

The processing of step S522c is performed, since the inverter bus bar current estimator 272 can appropriately set the amplitude ratio A and the phase difference $\Delta\theta$ by using the map of FIG. 22 based on the circuit of FIG. 23 and can appropriately calculate the Fourier cosine coefficient $a_{Im}$ and the Fourier sine coefficient $b_{Im}$ of the bus bar current $I_m$ of the inverter 34 by using the amplitude ratio A and the phase difference $\Delta\theta$ only when the stepping-up operation of the boost converter 240 is stopped (i.e., when the duty command D is equal to 100%).

As described above, like the driving system 20 of the first embodiment, the driving system 220 of the third embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 220 of the third embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Fourth Embodiments

Figure 25:
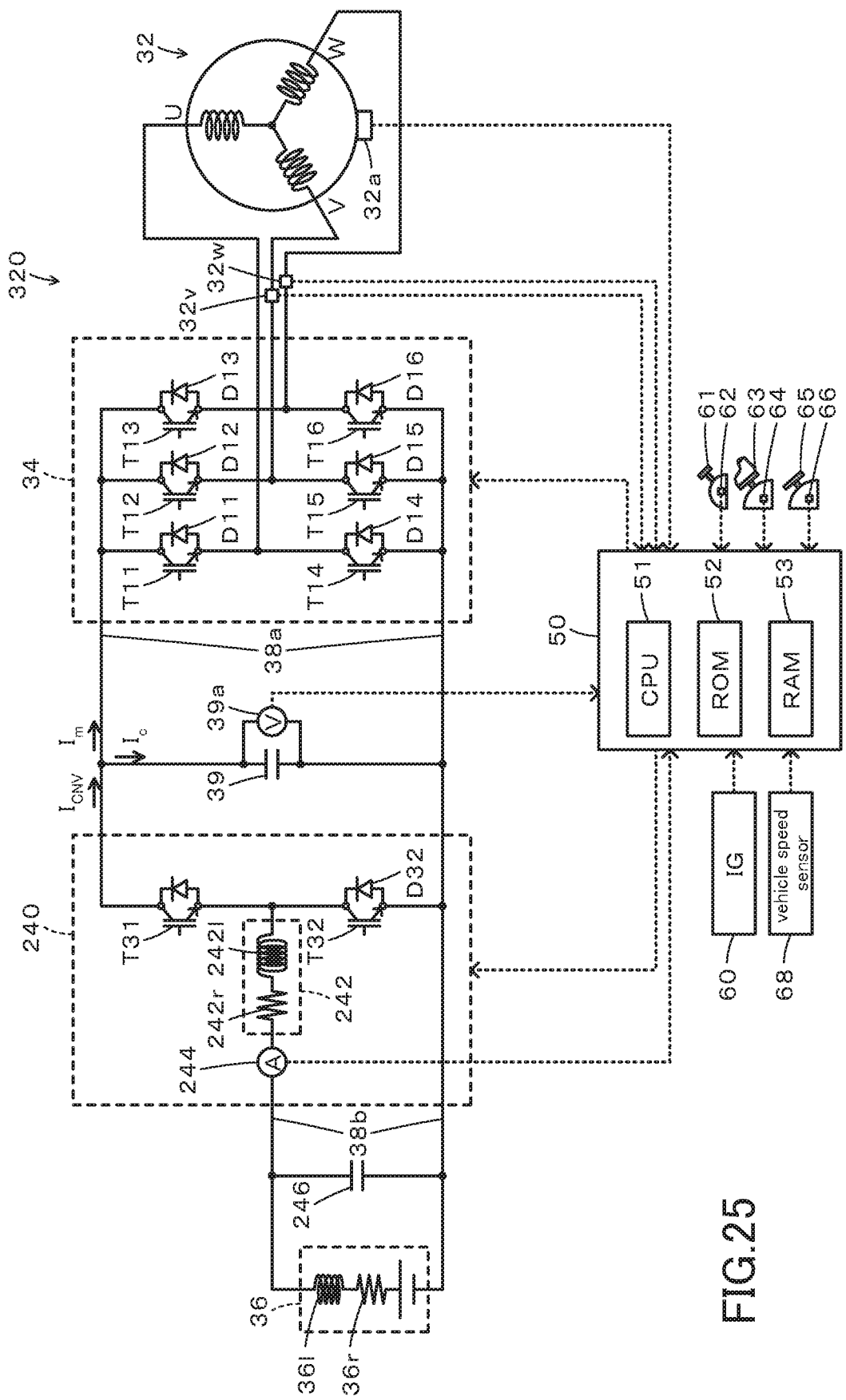
FIG. 25 is a configuration diagram illustrating the schematic configuration of a driving system according to a fourth embodiment.

The following describes a driving system 320 according to a fourth embodiment. FIG. 25 is a configuration diagram illustrating the schematic configuration of a driving system according to a fourth embodiment. The driving system 320 of the fourth embodiment has a similar hardware configuration to the hardware configuration of the driving system 220 of the third embodiment shown in FIG. 20, except addition of a current sensor 244 that is mounted in series with the reactor 242 of the boost converter 240. The like components in the hardware configuration of the driving system 320 of the fourth embodiment to those of the driving system 220 of the third embodiment are expressed by the like reference signs, and their detailed description is omitted. An electric current $I_L$ of the reactor 242 from the current sensor 244 is also input into the electronic control unit 50 via the input port.

Figure 26:
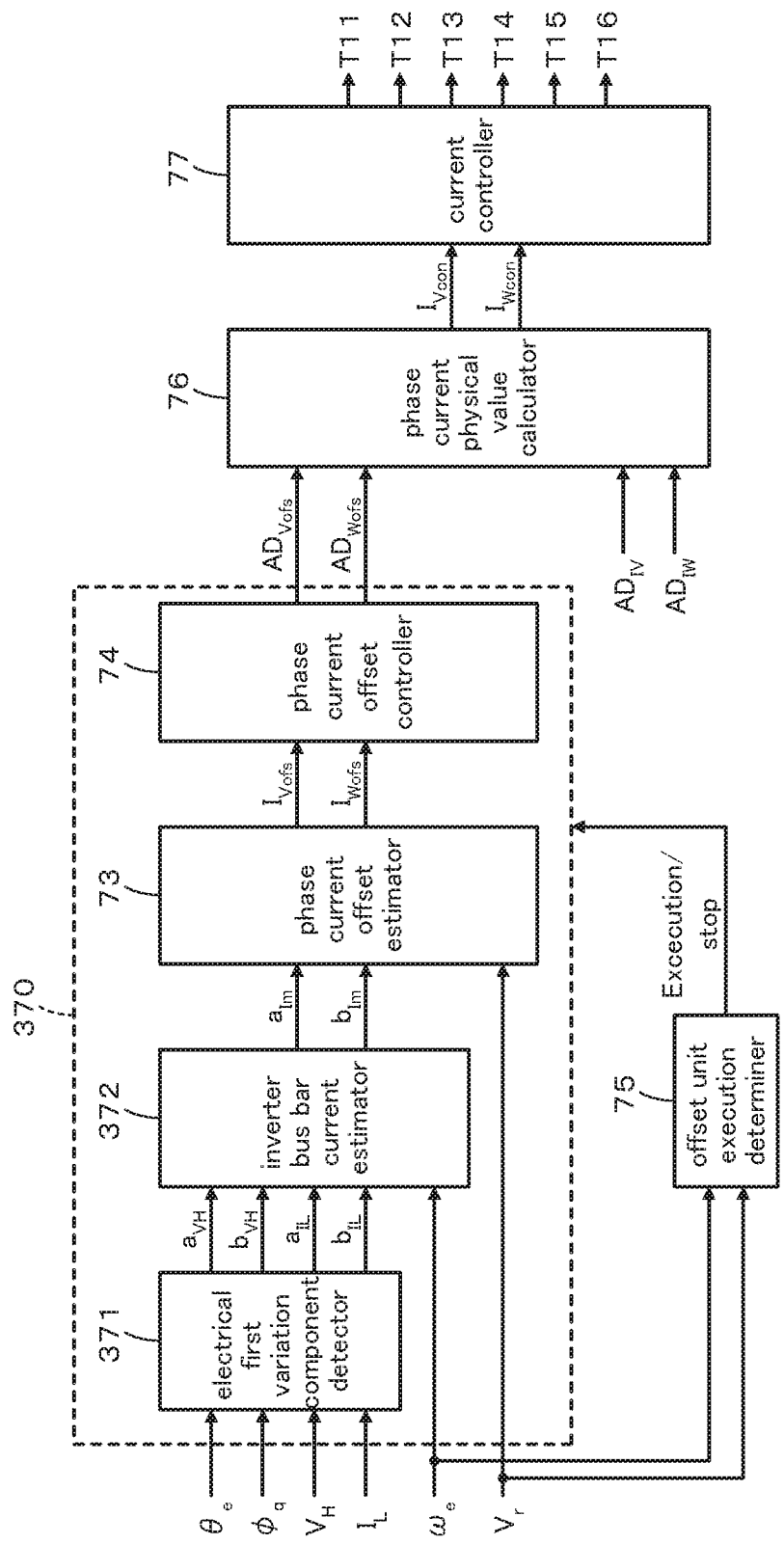
FIG. 26 is a control block diagram illustrating one example of control blocks for controlling the inverter in the PWM control mode by the electronic control unit in the driving system of the fourth embodiment.

The following describes a series of control of the inverter 34 performed by the electronic control unit 50 in the driving system 320 of the fourth embodiment. FIG. 26 is a control block diagram illustrating one example of control blocks for controlling the inverter in the PWM control mode by the electronic control unit in the driving system of the fourth embodiment. The control block diagram of FIG. 26 is similar to the control block diagram of FIG. 2, except replacement of the electrical first variation component detector 71 and the inverter bus bar current estimator 72 of the offset unit 70 with an electrical first variation component detector 371 and an inverter bus bar current estimator 372 of an offset unit 370 (including differences of input data and output data). The electrical first variation component detector 371 and the inverter bus bar current estimator 372 are accordingly described in detail.

Figure 27:
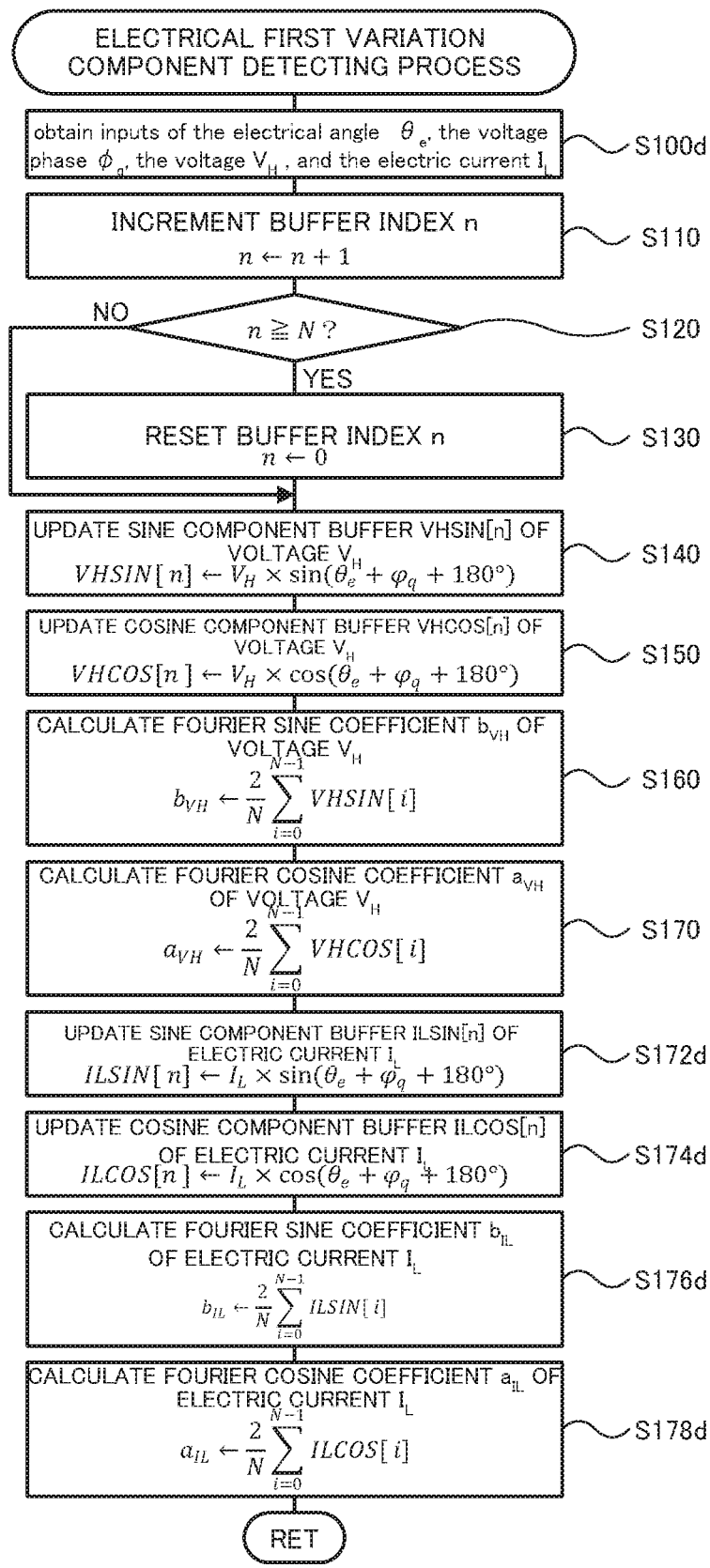
FIG. 27 is a flowchart showing one example of an electrical first variation component detecting process performed by an electrical first variation component detector according to the fourth embodiment.

The electrical first variation component detector 371 is described first. FIG. 27 is a flowchart showing one example of an electrical first variation component detecting process performed by the electrical first variation component detector 371. The electrical first variation component detecting process of FIG. 27 is similar to the electrical first variation component detecting process of FIG. 3, except replacement of the processing of step S100 with the processing of step S100d and addition of the processing of steps S172d to S178d. The like processing steps are expressed by the like step numbers, and their detailed description is omitted.

When the electrical first variation component detecting process of FIG. 27 is triggered, the electrical first variation component detector 371 first obtains the input data, for example, the electrical angle $\theta_e$ of the motor 32, the voltage phase $\phi_q$ with respect to the q axis of the output voltage of the inverter 34, the voltage $V_H$ of the smoothing capacitor 39, and the electric current $I_L$ of the reactor 242 (step S100d). The data other than the electric current $I_L$ of the reactor 242 are input by the methods described above with regard to the first embodiment. The electric current $I_L$ of the reactor 242 input here is a value detected by the current sensor 244.

After calculating the Fourier cosine coefficient $a_{VH}$ and the Fourier sine coefficient $b_{VH}$ of the voltage $V_H$ of the smoothing capacitor 39 (steps S160 and S170), the electrical first variation component detector 371 updates a sine component buffer ILSIN[n] and a cosine component buffer ILCOS[n] of the electric current $I_L$ of the reactor 242 according to Expression (9-1) and Expression (9-2) given below by using the electric current $I_L$ of the reactor 242, the electrical angle $\theta_e$ of the motor 32 and the voltage phase $\phi_q$ of the output voltage of the inverter 34 (steps S172d and S174d).

$$IL\ SIN[n] \leftarrow I_L \times \sin(\theta_e + \phi_q + 180°) \qquad (9\text{-}1)$$

$$IL\ COS[n] \leftarrow I_L \times \cos(\theta_e + \phi_q + 180°) \qquad (9\text{-}2)$$

The electrical first variation component detector 371 subsequently calculates a Fourier sine coefficient $b_{IL}$ of the electric current $I_L$ of the reactor 242 according to Expression (9-3) given below by using the sine component buffer ILSIN[i] (where i=0, ..., N−1) of the electric current $I_L$ of the reactor 242 (step S176d), calculates a Fourier cosine coefficient $a_{IL}$ of the electric current $I_L$ of the reactor 242 according to Expression (9-4) given below by using the cosine component buffer ILCOS[n] of the electric current $I_L$ of the reactor 242 (step S178d) and then terminates the electrical first variation component detecting process of FIG. 27. The sine component buffer ILSIN[n], the cosine component buffer ILCOS[n], the Fourier sine coefficient $b_{IL}$ and the Fourier cosine coefficient $a_{IL}$ of the electric current $I_L$ of the reactor 242 are values relating to the electrical first variation component of the electric current $I_L$ of the reactor 242. The method of deriving Expressions (9-1) to (9-4) are similar to the method of deriving Expressions (1-1) to (1-4) described above.

$$b_{IL} \leftarrow \frac{2}{N} \sum_{i=0}^{N-1} ILSIN[i] \quad (9\text{-}3)$$

$$a_{IL} \leftarrow \frac{2}{N} \sum_{i=0}^{N-1} ILCOS[i] \quad (9\text{-}4)$$

Figure 28:
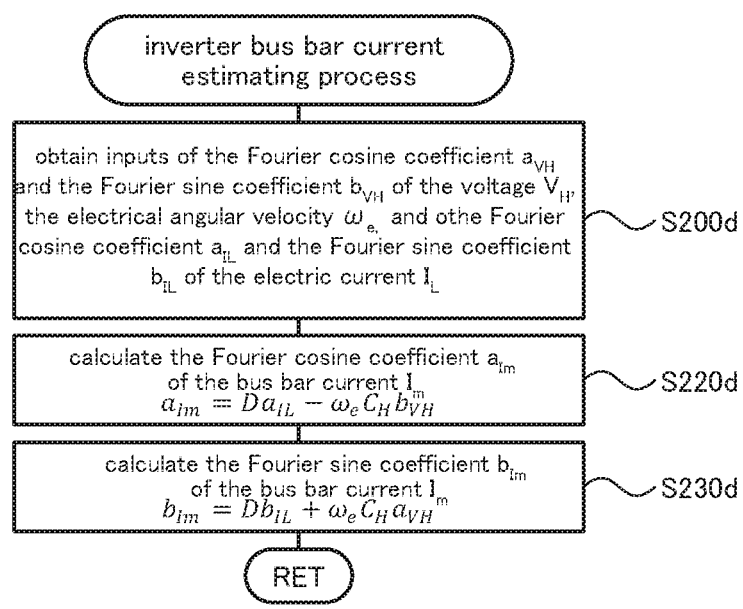
FIG. 28 is a flowchart showing one example of an inverter bus bar current estimating process performed by an inverter bus bar current estimator according to the fourth embodiment.

The inverter bus bar current estimator 372 is described next. FIG. 28 is a flowchart showing one example of an inverter bus bar current estimating process performed by an inverter bus bar current estimator 372 according to the fourth embodiment. When the inverter bus bar current estimating process of FIG. 28 is triggered, the inverter bus bar current estimator 372 first obtains the input data, for example, the Fourier cosine coefficient $a_{VH}$ and the Fourier sine coefficient $b_{VH}$ of the voltage $V_H$ of the smoothing capacitor 39, the electrical angular velocity $\omega_e$ of the motor 32 and the Fourier cosine coefficient $a_{IL}$ and the Fourier sine coefficient $b_{IL}$ of the electric current $I_L$ of the reactor 242 (step S200d). The Fourier cosine coefficient $a_{VH}$ and the Fourier sine coefficient $b_{VH}$ of the voltage $V_H$ of the smoothing capacitor 39 and the electrical angular velocity $\omega_e$ of the motor 32 are input by the methods described above with regard to the first embodiment. The Fourier cosine coefficient $a_{IL}$ and the Fourier sine coefficient $b_{IL}$ of the electric current $I_L$ of the reactor 242 input here are values calculated by the electrical first variation component detector 371 (i.e., the electrical first variation component detecting process of FIG. 27).

After obtaining the input data, the inverter bus bar current estimator 372 subsequently calculates the Fourier cosine coefficient $a_{Im}$ of the bus bar current $I_m$ of the inverter 34 according to Equation (9-5) given below by using the input Fourier cosine coefficient $a_{IL}$ of the electric current $I_L$ of the reactor 242, the input electrical angular velocity $\omega_e$ of the motor 32 and the input Fourier sine coefficient $b_{VH}$ of the voltage $V_H$ of the smoothing capacitor 39 (step S220d). The inverter bus bar current estimator 372 also calculates the Fourier sine coefficient $b_{Im}$ of the bus bar current $I_m$ of the inverter 34 according to Equation (9-6) given below by using the input Fourier sine coefficient $b_{IL}$ of the electric current $I_L$ of the reactor 242, the input electrical angular velocity $\omega_e$ of the motor 32 and the input Fourier cosine coefficient $a_{VH}$ of the voltage $V_H$ of the smoothing capacitor 39 (step S230d) and then terminates the inverter bus bar current estimating process of FIG. 28. In Equation (9-5) and Equation (9-6), "$C_H$" denotes a capacity value of the smoothing capacitor 39.

$$a_{Im} = Da_{IL} - \omega_e C_H b_{VH} \quad (9\text{-}5)$$

$$b_{Im} = Db_{IL} + \omega_e C_H a_{VH} \quad (9\text{-}6)$$

The following describes a method of deriving Equation (9-5) and Equation (9-6) given above. Equation (9-7) given below holds between supplied electric current $I_{CNV}$ of the boost converter 240, the electric current $I_c$ of the smoothing capacitor 39 and the bus bar current $I_m$ of the inverter 34 on the periphery of the smoothing capacitor 39. Equation (9-8) given below also holds between the electric current $I_c$ and the voltage $V_H$ of the smoothing capacitor 39 by using the capacity value $C_H$ of the smoothing capacitor 39.

$$I_m = I_{CNV} - I_C \quad (9\text{-}7)$$

$$I_C = \frac{d}{dt} C_H V_H \quad (9\text{-}8)$$

The electrical first variation component $V_{H1}$ of the voltage $V_H$ of the smoothing capacitor 39 is expressed by Equation (9-9) given below. Accordingly, when the attention is focused on only the electrical first variation component $V_{H1}$ with regard to the voltage $V_H$ of the smoothing capacitor 39, the electrical first variation component $I_{c1}$ of the electric current $I_c$ of the smoothing capacitor 39 is expressed by Equation (9-10) given below, based on Equations (9-8) and (9-9). On definition of Equation (9-11) given below, Equation (9-12) given below is derived from Equation (9-10).

$$V_{H1} = a_{VH} \cos\theta + b_{VH} \sin\theta \quad (9\text{-}9)$$

$$I_{C1} = \frac{d}{dt} C_H(a_{VH} \cos\theta + b_{VH} \sin\theta) \quad (9\text{-}10)$$

$$\frac{d}{dt}\theta = \omega_e \quad (9\text{-}11)$$

$$I_{C1} = \omega_e C_H(b_{VH} \cos\theta - a_{VH} \sin\theta) \quad (9\text{-}12)$$

The supplied electric current $I_{CNV}$ of the boost converter 240 is approximated by Equation (9-13) given below by using the electric current $I_L$ of the reactor 242 and the duty command D. An electrical first variation component $I_{L1}$ of the electric current $I_L$ of the reactor 242 is expressed by Equation (9-14) given below. Accordingly, when the attention is focused on only electrical first variation components $I_{CNV1}$ and $V_{H1}$ with regard to the supplied electric current $I_{CNV}$ of the boost converter 240 (i.e., the electric current $I_L$ of the reactor 242) and the voltage $V_H$ of the smoothing capacitor 39, the electrical first variation component $I_{m1}$ of the bus bar current $I_m$ of the inverter 34 is expressed by Equation (9-15) given below, based on Equation (9-7) and Equations (9-12) to (9-14).

$$I_{CNV} = DI_L \quad (9\text{-}13)$$

$$I_{L1} = a_{IL} \cos\theta + b_{IL} \sin\theta \quad (9\text{-}14)$$

$$I_{m1} = Da_{IL} \cos\theta + Db_{IL} \sin\theta - \omega_e C_H(b_{VH} \cos\theta - a_{VH} \sin\theta) \quad (9\text{-}15)$$

Equation (9-16) given below is derived by rewriting Equation (9-15). A coefficient for cos θ in the first term on the right side of this Equation (9-16) is obtained as the Fourier cosine coefficient $a_{Im}$ of the bus bar current $I_m$ of the inverter 34 as shown by Equation (9-5) given above. A coefficient for $\sin\theta$ in the second term on the right side of Equation (9-16) is obtained as the Fourier sine coefficient $b_{Im}$ of the bus bar current $I_m$ of the inverter 34 as shown by Equation (9-6) given above. Accordingly, Equation (9-16) is rewritten as Equation (9-17) given below. By taking into account the foregoing, the inverter bus bar current estimator 372 (i.e., the inverter bus bar current estimating process of FIG. 28) calculates the Fourier cosine coefficient $a_{Im}$ and the Fourier sine coefficient $b_{Im}$ of the bus bar current $I_m$ of the inverter 34 according to Equation (9-5) and Equation (9-6) (steps S220d and S230d).

$$I_{m1} = (Da_{IL} - \omega_e C_H b_{VH})\cos\theta + (Db_{IL} + \omega_e C_H a_{VH})\sin\theta \quad (9\text{-}16)$$

$$I_{m1} = a_{Im}\cos\theta + b_{Im}\sin\theta \quad (9\text{-}17)$$

Calculating the Fourier cosine coefficient $a_{Im}$ and the Fourier sine coefficient $b_{Im}$ of the bus bar current $I_m$ of the inverter 34 by using the electric current $I_L$ of the reactor 242 (more specifically, the Fourier cosine coefficient $a_{IL}$ and the Fourier sine coefficient $b_{IL}$ of the electric current $I_L$ of the reactor 242) as described above enables the Fourier cosine coefficient $a_{Im}$ and the Fourier sine coefficient $b_{Im}$ of the bus bar current $I_m$ of the inverter 34 to be calculated without using the resistance value $R_B$ of the internal resistance 36r and the inductance value $L_B$ of the internal inductance 36l of the battery 36 and the resistance value $R_R$ of the resistance component 242r and the inductance value $L_R$ of the inductance component 242l of the reactor 242, i.e., without being affected by variations in the resistance value $R_B$, the inductance value $L_B$, the resistance value $R_R$ and the inductance value $L_R$.

As described above, like the driving system 20 of the first embodiment, the driving system 320 of the fourth embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 320 of the fourth embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Furthermore, the driving system 320 of the fourth embodiment calculates the Fourier cosine coefficient $a_{Im}$ and the Fourier sine coefficient $b_{Im}$ of the bus bar current $I_m$ of the inverter 34 by using the electric current $I_L$ of the reactor 242 (more specifically, the Fourier cosine coefficient $a_{IL}$ and the Fourier sine coefficient $b_{IL}$ of the electric current $I_L$ of the reactor 242). This configuration enables the Fourier cosine coefficient $a_{Im}$ and the Fourier sine coefficient $b_{Im}$ of the bus bar current $I_m$ of the inverter 34 to be calculated without using the resistance value $R_B$ of the internal resistance 36r and the inductance value $L_B$ of the internal inductance 36l of the battery 36 and the resistance value $R_R$ of the resistance component 242r and the inductance value $L_R$ of the inductance component 242l of the reactor 242, i.e., without being affected by variations in the resistance value $R_B$, the inductance value $L_B$, the resistance value $R_R$ and the inductance value $L_R$.

Fifth Embodiments

The following describes a driving system 420 according to a fifth embodiment. The driving system 420 of the fifth embodiment has an identical hardware configuration with the hardware configuration of the driving system 120 of the second embodiment shown in FIG. 16. Accordingly, the detailed description is omitted with regard to the hardware configuration of the driving system 420 of the fifth embodiment.

Figure 29:
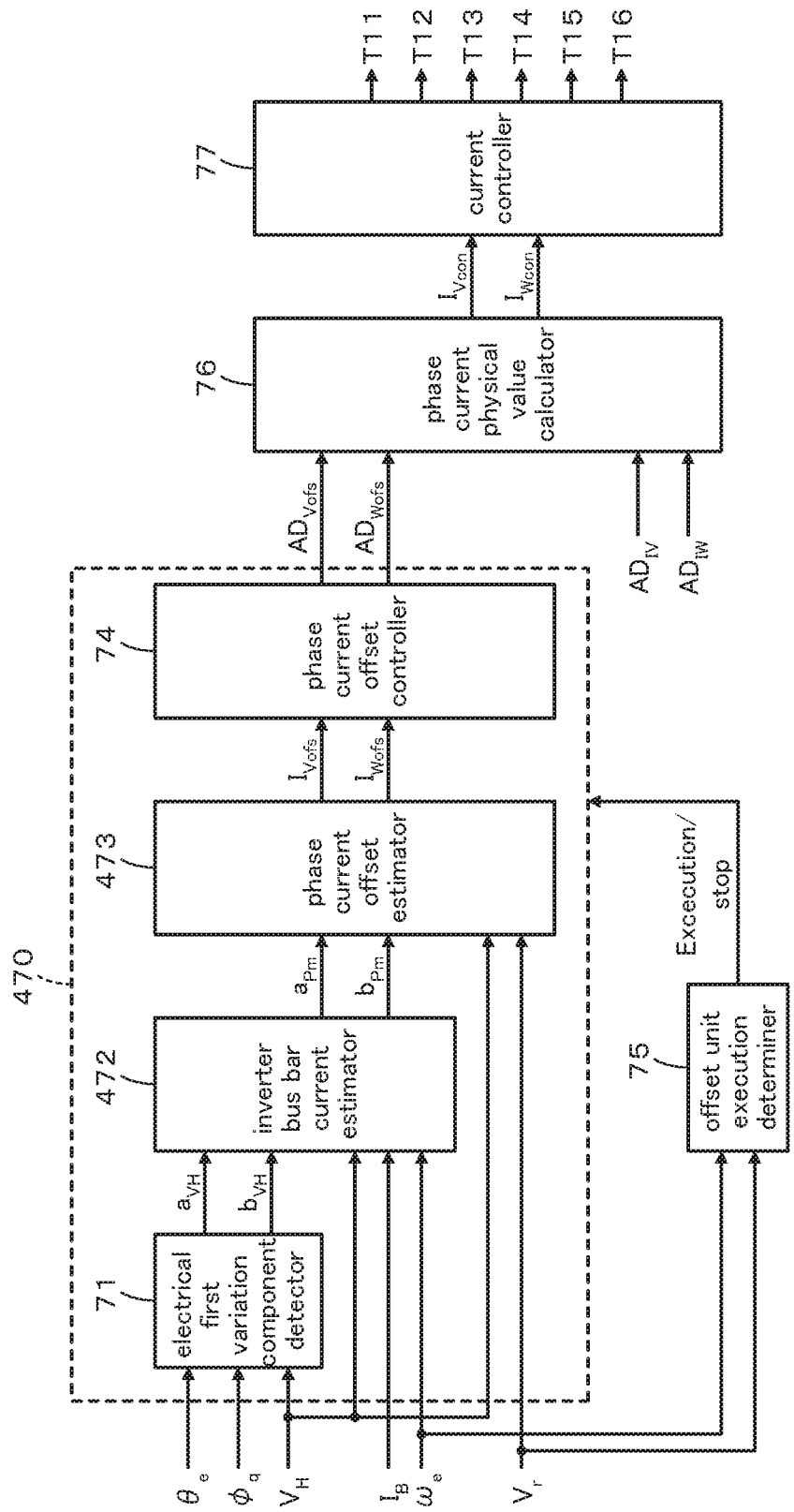
FIG. 29 is a control block diagram illustrating one example of control blocks for controlling the inverter in the PWM control mode by the electronic control unit in a driving system according to a fifth embodiment.

The following describes a series of control of the inverter 34 performed by the electronic control unit 50 in the driving system 420 of the fifth embodiment. FIG. 29 is a control block diagram illustrating one example of control blocks for controlling the inverter 34 in the PWM control mode by the electronic control unit 50 of the driving system 420 according to the fifth embodiment. The control block diagram of FIG. 29 is similar to the control block diagram of FIG. 2, except replacement of the inverter bus bar current estimator 72 and the phase current offset estimator 73 of the offset unit 70 with an inverter bus bar power estimator 472 and a phase current offset estimator 473 of an offset unit 470 (including differences of input data and output data). The inverter bus bar power estimator 472 and the phase current offset estimator 473 are accordingly described in detail.

Figure 30:
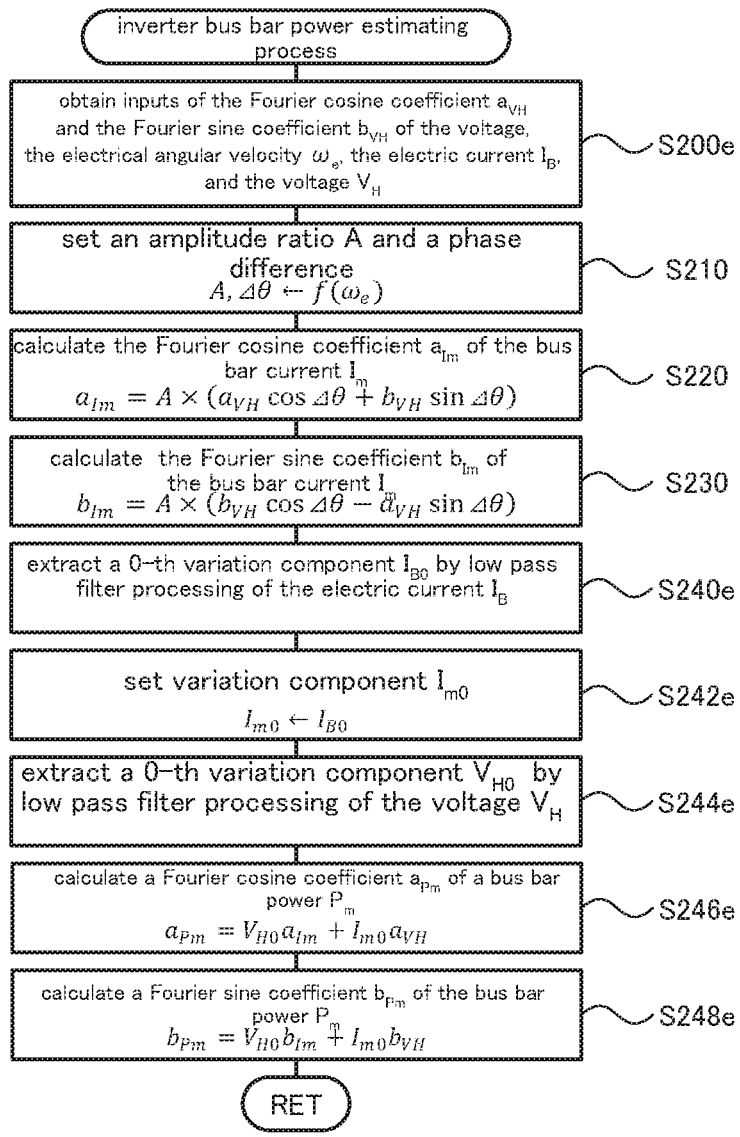
FIG. 30 is a flowchart showing one example of an inverter bus bar power estimating process performed by an inverter bus bar power estimator according to the fifth embodiment.

The inverter bus bar power estimator 472 is described first. FIG. 30 is a flowchart showing one example of an inverter bus bar power estimating process performed by an inverter bus bar power estimator 472 according to the fifth embodiment. The inverter bus bar power estimating process of FIG. 30 is similar to the inverter bus bar current estimating process of FIG. 6, except replacement of the processing step S200 with the processing of step S200e and addition of the processing of steps S240e to S248e. The like processing steps are expressed by the like step numbers, and their detailed description is omitted.

When the inverter bus bar power estimating process of FIG. 30 is triggered, the inverter busbar power estimator 472 first obtains the input data, for example, the Fourier cosine coefficient $a_{VH}$ and the Fourier sine coefficient $b_{VH}$ of the voltage $V_H$ of the smoothing capacitor 39, the electrical angular velocity $\omega_e$ of the motor 32, the electric current $I_B$ of the battery 36 and the voltage $V_H$ of the smoothing capacitor 39 (step S200e). The respective data are input by the methods described above.

After calculating the Fourier cosine coefficient $a_{Im}$ and the Fourier sine coefficient $b_{Im}$ of the bus bar current $I_m$ of the inverter 34 (steps S220 and S230), the inverter bus bar power estimator 472 extracts a 0-th variation component $I_{B0}$ of the electric current $I_B$ of the battery 36 by low pass filter processing of the electric current $I_B$ of the battery 36 (step S240e) and sets the extracted 0-th variation component $I_{B0}$ of the electric current $I_B$ of the battery 36 to a 0-th variation component $I_{m0}$ of the bus bar current $I_m$ of the inverter 34 (step S242e). The smoothing capacitor 39 does not allow the DC current to flow, so that the processing of step S242e is performed on the basis of "$I_B = I_m$" in a limited ultralow frequency domain.

The inverter bus bar power estimator 472 subsequently extracts a 0-th variation component $V_{H0}$ of the voltage $V_H$ of the smoothing capacitor 39 by low pass filter processing of the voltage $V_H$ of the smoothing capacitor 39 (step S244e). The inverter bus bar power estimator 472 calculates a Fourier cosine coefficient $a_{Pm}$ of a bus bar power $P_m$ of the inverter 34 according to Equation (10-1) given below by using the Fourier cosine coefficient $a_{Im}$ of the bus bar current $I_m$ of the inverter 34, the Fourier cosine coefficient $a_{VH}$ and the 0-th variation component $V_{H0}$ of the voltage $V_H$ of the smoothing capacitor 39 and the 0-th variation component $I_{m0}$ of the bus bar current $I_m$ of the inverter 34 (step S246e). The inverter bus bar power estimator 472 also calculates a Fourier sine coefficient $b_{Pm}$ of the bus bar power $P_m$ of the inverter 34 according to Equation (10-2) given below by using the Fourier sine coefficient $b_{Im}$ of the bus bar current $I_m$ of the inverter 34, the Fourier sine coefficient $b_{VH}$ and the 0-th variation component $V_{H0}$ of the voltage $V_H$ of the smoothing capacitor 39 and the 0-th variation component $I_{m0}$ of the bus bar current $I_m$ of the inverter 34 (step S248e) and then terminates the inverter bus bar power estimating process of FIG. 30. Equation (10-1) and Equation (10-2) are equations used to convert the Fourier cosine coefficient $a_{Im}$ and the Fourier sine coefficient $b_{Im}$ of the bus bar current $I_m$ of the inverter 34 into the Fourier cosine coefficient $a_{Pm}$ and the Fourier sine coefficient $b_{Pm}$ of the bus bar power $P_m$ of the inverter 34.

$$a_{Pm} = V_{H0}a_{Im} + I_{m0}a_{VH} \tag{10-1}$$

$$b_{Pm} = V_{H0}b_{Im} + I_{m0}b_{VH} \tag{10-2}$$

The following describes a method of deriving Equation (10-1) and Equation (10-2) given above. An electrical first variation component $P_1$ of the bus bar power $P_m$ of the inverter 34 is expressed by Equation (3-21) given above in the case of generation of the offsets in the electric currents $I_U$, $I_V$ and $I_W$ of the respective phases of the motor 32. When each of the voltage $V_H$ of the smoothing capacitor 39 and the bus bar current $I_m$ of the inverter 34 is divided into an electrical 0-th component and an electrical first component, the voltage $V_H$ of the smoothing capacitor 39 and the bus bar current $I_m$ of the inverter 34 are respectively expressed by Equation (10-3) and by Equation (10-4). The Fourier cosine coefficient $a_{VH}$ and the Fourier sine coefficient $b_{VH}$ of the voltage $V_H$ of the smoothing capacitor 39 in Equation (10-3) are expressed by Expressions (1-1) to (1-4) given above. The Fourier cosine coefficient $a_{Im}$ and the Fourier sine coefficient $b_{Im}$ of the bus bar current $I_m$ of the inverter 34 in Equation (10-4) are expressed by Equations (2-1) and (2-2) given above.

$$V_H = V_{H0} + a_{VH}\sin(\theta_e + \alpha) + b_{VH}\cos(\theta_e + \alpha) \tag{10-3}$$

$$I_m = I_{m0} + a_{Im}\cos(\theta_e + \alpha) + b_{Im}\sin(\theta_e + \alpha) \tag{10-4}$$

The electrical first variation component $P_1$ of the product of the voltage $V_H$ of the smoothing capacitor 39 and the bus bar current $I_m$ of the inverter 34 is the sum of the products of the 0-th variation components and the first variation components of Equation (10-3) and Equation (10-4). This gives Equation (10-5) and thereby Equation (10-6).

$$P_1 = V_{H0}(a_{Im}\cos(\theta_e+\alpha) + b_{Im}\sin(\theta_e+\alpha)) + I_{m0}(a_{VH}\cos(\theta_e+\alpha) + b_{VH}\sin(\theta_e+\alpha)) \tag{10-5}$$

$$P_1 = (V_{H0}a_{Im} + I_{m0}a_{VH})\cos(\theta_e+\alpha) + (V_{H0}b_{Im} + I_{m0}b_{VH})\sin(\theta_e+\alpha) \tag{10-6}$$

A coefficient for cos $(\theta_e+\alpha)$ in the first term on the right side of this Equation (10-6) is obtained as the Fourier cosine coefficient $a_{Pm}$ of the bus bar power $P_m$ of the inverter 34 as shown by Equation (10-1) given above. A coefficient for sin$(\theta_e+\alpha)$ in the second term on the right side of Equation (10-6) is obtained as the Fourier sine coefficient $b_{Pm}$ of the bus bar power $P_m$ of the inverter 34 as shown by Equation (10-2) given above. Accordingly, Equation (10-6) is rewritten as Equation (10-7) given below. By taking into account the foregoing, the inverter bus bar power estimator 472 (i.e., the inverter bus bar power estimating process of FIG. 30) calculates the Fourier cosine coefficient $a_{Pm}$ and the Fourier sine coefficient $b_{Pm}$ of the bus bar power $P_m$ of the inverter 34 according to Equation (10-1) and Equation (10-2) (steps S246e and S248e).

$$P_1 = a_{Pm}\cos(\theta_e+\alpha) + b_{Pm}\sin(\theta_e+\alpha) \tag{10-7}$$

Figure 31:
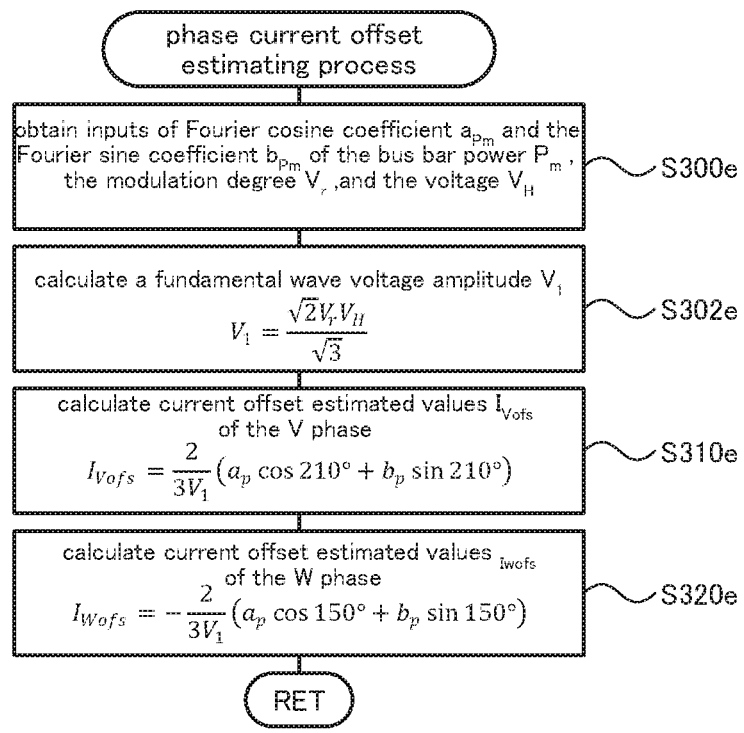
FIG. 31 is a flowchart showing one example of a phase current offset estimating process performed by a phase current offset estimator according to the fifth embodiment.

The phase current offset estimator 473 is described next. FIG. 31 is a flowchart showing one example of a phase current offset estimating process performed by the phase current offset estimator 473. When the phase current offset estimating process of FIG. 31 is triggered, the phase current offset estimator 473 first obtains the input data, for example, the Fourier cosine coefficient $a_{Pm}$ and the Fourier sine coefficient $b_{Pm}$ of the bus bar power $P_m$ of the inverter 34, the modulation degree $V_r$ of the output voltage of the inverter 34 and the voltage $V_H$ of the smoothing capacitor 39 (step S300e). The modulation degree $V_r$ of the output voltage of the inverter 34 and the voltage $V_H$ of the smoothing capacitor 39 are input by the methods described above. The Fourier cosine coefficient $a_{Pm}$ and the Fourier sine coefficient $b_{Pm}$ of the bus bar power $P_m$ of the inverter 34 input here are values calculated by the inverter bus bar power estimator 472 (i.e., the inverter bus bar power estimating process of FIG. 30).

After obtaining the input data, the phase current offset estimator 473 calculates a fundamental wave voltage amplitude $V_1$ that is a maximum value of a fundamental wave component of a three-phase AC voltage according to Equation (10-8) given below by using the modulation degree $V_r$ of the output voltage of the inverter 34 and the voltage $V_H$ of the smoothing capacitor 39 (step S302e). The phase current offset estimator 473 subsequently calculates current offset estimated values $I_{Vofs}$ and $I_{Wofs}$ of the V phase and the W phase according to Equation (10-9) and Equation (10-10) given below by using the Fourier cosine coefficient $a_{Pm}$ and the Fourier sine coefficient $b_{Pm}$ of the bus bar power $P_m$ of the inverter 34 and the fundamental wave voltage amplitude $V_1$ (steps S310e and S320e) and then terminates the phase current offset estimating process of FIG. 31.

$$V_1 = \frac{\sqrt{2}\, V_r V_H}{\sqrt{3}} \tag{10-8}$$

$$I_{Vofs} = \frac{2}{3V_1}(a_p\cos 210° + b_p\sin 210°) \tag{10-9}$$

$$I_{Wofs} = -\frac{2}{3V_1}(a_p\cos 150° + b_p\sin 150°) \tag{10-10}$$

The following describes a method of deriving Equation (10-9) and Equation (10-10) given above. Under the condition of "$\theta_e+\alpha=150°$", Equation (10-11) and Equation (10-12) given below are obtained from Equation (3-21) and Equation (10-7) given above, so that Equation (10-10) given above is obtained. Under the condition of "$\theta_e+\alpha=210°$", on the other hand, Equation (10-13) and Equation (10-14) given below are obtained from Equation (3-21) and Equation (10-7), so that Equation (10-9) given above is obtained. By taking into account the foregoing, the phase current offset estimator 473 (i.e., the phase current offset estimating process of FIG. 31) calculates the current offset estimated values $I_{Vofs}$ and $I_{Wofs}$ of the V phase and the W phase by using Equation (10-9) and Equation (10-10) given above (steps S310e and S320e). This procedure calculates the current offset estimated values $I_{Vofs}$ and $I_{Wofs}$ of the V phase and the W phase by taking into account both a variation in the bus bar current $I_m$ of the inverter 34 and a variation in the voltage $V_H$ of the smoothing capacitor 39. This accordingly increases the accuracies of the current offset estimated values $I_{Vofs}$ and $I_{Wofs}$ of the V phase and the W phase.

$$P_1(150°) = \sqrt{3} V_1 I_{Wofs} \sin(-60°) \tag{10-11}$$

$$P_1(150°) = a_P \cos(150°) + b_P \sin(150°) \tag{10-12}$$

$$P_1(210°) = \sqrt{3} V_1 I_{Vofs} \sin(60°) \tag{10-13}$$

$$P_1(210°) = a_P \cos(210°) + b_P \sin(210°) \tag{10-14}$$

As described above, like the driving system 20 of the first embodiment, the driving system 420 of the fifth embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 420 of the fifth embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Furthermore, the driving system 420 of the fifth embodiment calculates the Fourier cosine coefficient $a_{Pm}$ and the Fourier sine coefficient $b_{Pm}$ of the bus bar power $P_m$ of the inverter 34 and calculates the current offset estimated values $I_{Vofs}$ and $I_{Wofs}$ of the V phase and the W phase based on the calculated Fourier cosine coefficient $a_{Pm}$ and the calculated Fourier sine coefficient $b_{Pm}$ of the bus bar power $P_m$ of the inverter 34. This procedure performs the calculation by taking into account both a variation in the bus bar current $I_m$ of the inverter 34 and a variation in the voltage $V_H$ of the smoothing capacitor 39. This accordingly increases the accuracies of the current offset estimated values $I_{Vofs}$ and $I_{Wofs}$ of the V phase and the W phase.

The driving system 420 of the fifth embodiment has the similar hardware configuration to the hardware configuration of the driving system 120 of the second embodiment shown in FIG. 16. The inverter bus bar power estimating process of FIG. 30 performed by the inverter bus bar power estimator 472 extracts the 0-th variation component $I_{B0}$ of the electric current $I_B$ of the battery 36 by low pass filter processing of the electric current $I_B$ of the battery 36 and sets the extracted 0-th variation component $I_{B0}$ of the electric current $I_B$ of the battery 36 to the 0-th variation component $I_{m0}$ of the bus bar current $I_m$ of the inverter 34 at steps S240e and S242e. According to one modification, the driving system 420 of the fifth embodiment may have a similar hardware configuration to the hardware configuration of the driving system 320 of the fourth embodiment shown in FIG. 25. In this modification, the inverter bus bar power estimator 472 may extract a 0-th variation component $I_{CNV0}$ of the supplied electric current $I_{CNV}$ of the boost converter 240, which is obtained as the product of the electric current $I_L$ of the reactor 242 and the duty command D, by low pass filter processing of the supplied electric current $I_{CNV}$ of the boost converter 240 and may set the extracted 0-th variation component $I_{CNV0}$ of the supplied electric current $I_{CNV}$ of the boost converter 240 to the 0-th variation component $I_{m0}$ of the bus bar current $I_m$ of the inverter 34. According to another modification, the driving system 420 of the fifth embodiment may have a similar hardware configuration to the hardware configuration of the driving system 20 of the first embodiment shown in FIG. 1 or a similar hardware configuration to the hardware configuration of the driving system 220 of the third embodiment shown in FIG. 20 (without the current sensor 36a and the current sensor 244). In this modification, the inverter bus bar power estimator 472 may calculate the 0-th variation component $I_{m0}$ of the bus bar current $I_m$ of the inverter 34 according to Equation (10-15) given below by using the torque command $T_m^*$ and a mechanical angular velocity $\omega_m$ of the motor 32 and the 0-th variation component $V_{H0}$ of the voltage $V_H$ of the smoothing capacitor 39. Accordingly, when the driving system 420 of the fifth embodiment has the hardware configuration similar to the hardware configuration of the driving system 20 of the first embodiment shown in FIG. 1, the hardware configuration similar to the hardware configuration of the driving system 220 of the third embodiment shown in FIG. 20, or the hardware configuration similar to the hardware configuration of the driving system 320 of the fourth embodiment shown in FIG. 25, the driving system 420 of the fifth embodiment may calculate the Fourier cosine coefficient $a_{Pm}$ and the Fourier sine coefficient $b_{Pm}$ of the bus bar power $P_m$ of the inverter 34 and calculate the current offset estimated values $I_{Vofs}$ and $I_{Wofs}$ of the V phase and the W phase by using the Fourier cosine coefficient $a_{Pm}$ and the Fourier sine coefficient $b_{Pm}$ of the bus bar power $P_m$ of the inverter 34.

$$I_{m0} = \frac{\omega_m \times T_m^*}{V_{H0}} \tag{10-15}$$

Sixth Embodiments

Figure 32:
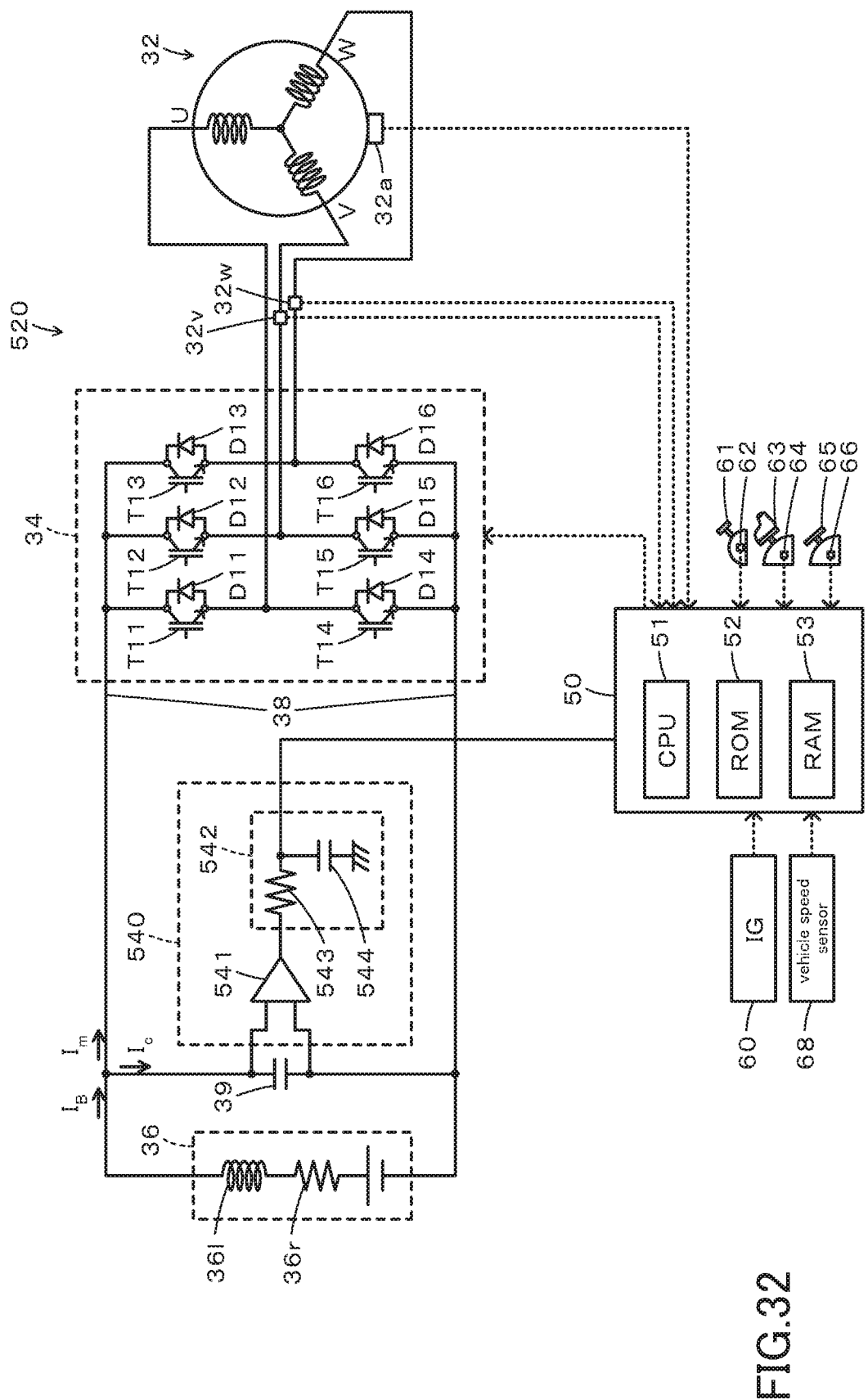
FIG. 32 is a configuration diagram illustrating the schematic configuration of a driving system according to a sixth embodiment.

The following describes a driving system 520 according to a sixth embodiment. FIG. 32 is a configuration diagram illustrating the schematic configuration of the driving system 520 of the sixth embodiment. The driving system 520 of the sixth embodiment has a similar hardware configuration to the hardware configuration of the driving system 20 of the first embodiment shown in FIG. 1, except replacement of the voltage sensor 39a with a voltage sensor 540. The like components in the hardware configuration of the driving system 520 of the sixth embodiment to those of the driving system 20 of the first embodiment are expressed by the like reference signs, and their detailed description is omitted.

The voltage sensor 540 includes an amplifier 541 and a low pass filter 542. The amplifier 541 serves to amplify the voltage between terminals of the smoothing capacitor 39 and output the amplified voltage. The low pass filter 542 includes a resistance element 543 and a capacitor 544. The resistance element 543 has one terminal that is connected with an output side of the amplifier 541 and the other terminal that is connected with the electronic control unit 50. The capacitor 544 has one terminal that is connected with the other terminal of the resistance element 543 and the other terminal that is grounded. The low pass filter 542 processes the output of the amplifier 541 by low pass filter processing and outputs the processed output as a voltage $V_H$ of the smoothing capacitor 39 to the electronic control unit 50.

Figure 33:
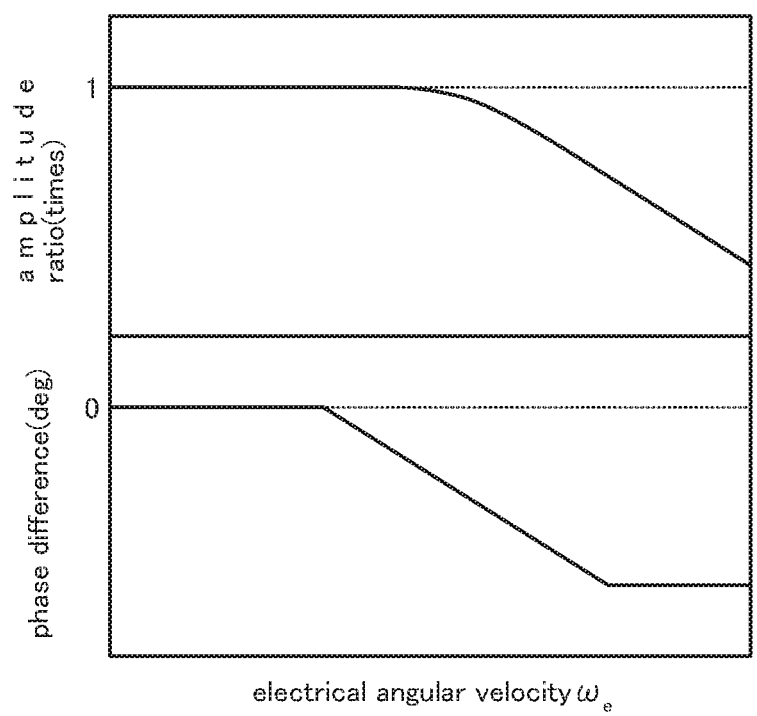
FIG. 33 is a diagram illustrating one example of relationships of an amplitude ratio and a phase difference between input and output of a low pass filter to the electrical angular velocity $\omega_e$ of the motor according to the sixth embodiment.

FIG. 33 is a diagram illustrating one example of relationships of an amplitude ratio and a phase difference between the input and the output of the low pass filter 542 to the electrical angular velocity $\omega_e$ of the motor 32. FIG. 33 clearly shows that an increase in the electrical angular velocity $\omega_e$ (electrical first order) of the motor 32 increases differences (more specifically, differences of the amplitude and the phase of the variation component) between an observed value (actual voltage $V_{Hact}$) of the voltage of the smoothing capacitor 39 and a detected value (voltage $V_H$) of the voltage sensor 540.

Figure 34:
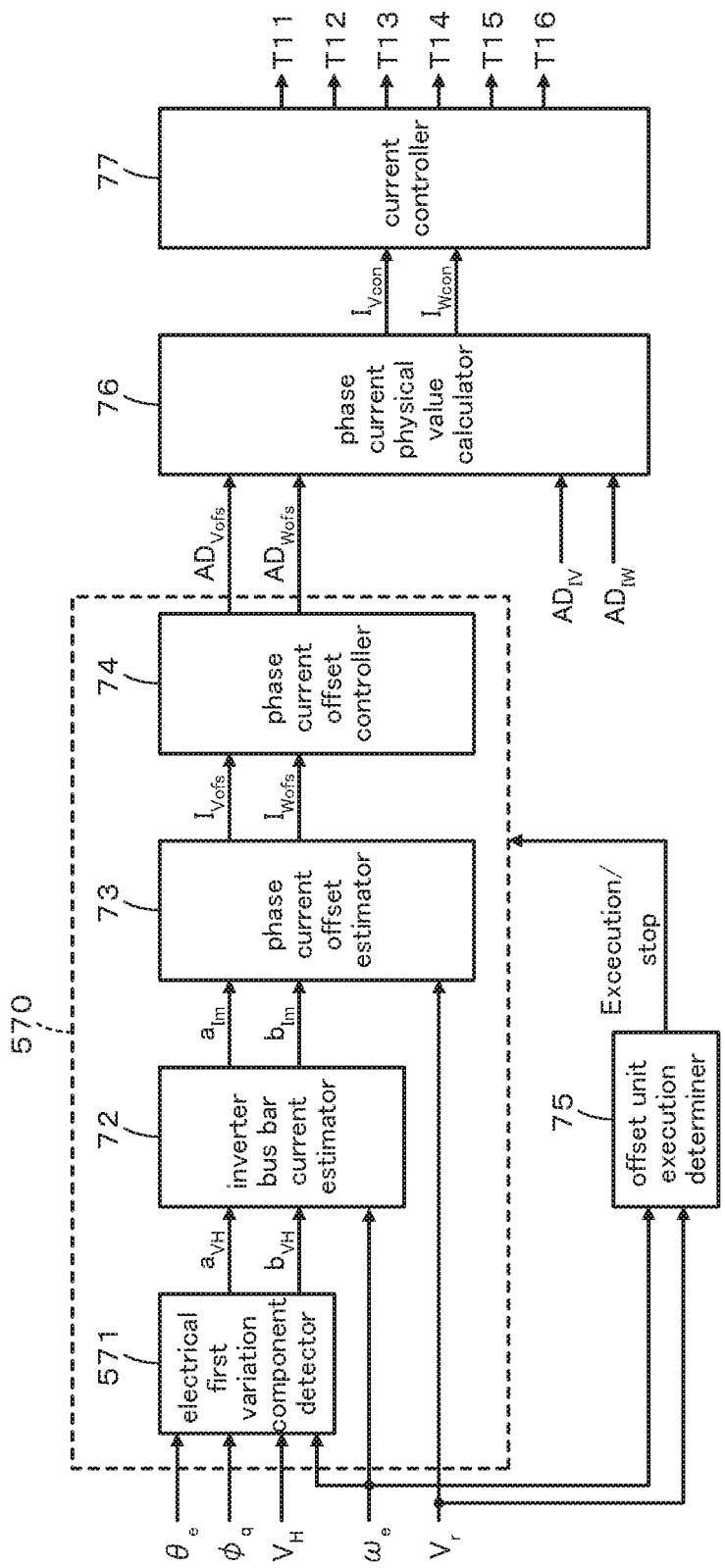
FIG. 34 is a control block diagram illustrating one example of control blocks for controlling the inverter in the PWM control mode by the electronic control unit in the driving system of the sixth embodiment.

The following describes a series of control of the inverter 34 performed by the electronic control unit 50 in the driving system 520 of the sixth embodiment. FIG. 34 is a control block diagram illustrating one example of control blocks for controlling the inverter 34 in the PWM control mode by the electronic control unit 50 of the driving system 520 according to the sixth embodiment. The control block diagram of FIG. 34 is similar to the control block diagram of FIG. 2, except replacement of the electrical first variation component detector 71 of the offset unit 70 with an electrical first variation component detector 571 of an offset unit 570 (including differences of input data). The electrical first variation component detector 571 is accordingly described in detail.

Figure 35:
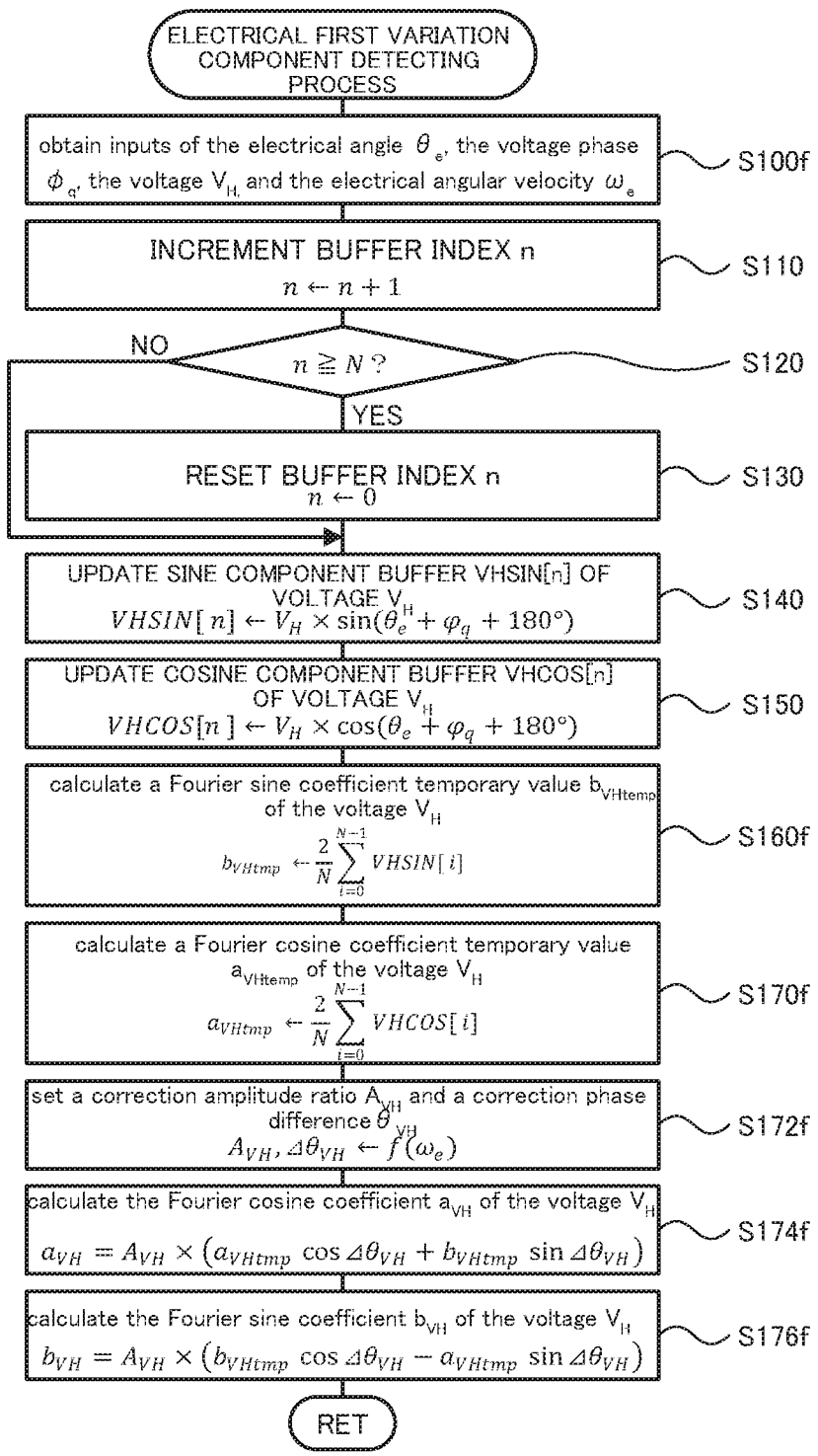
FIG. 35 is a flowchart showing one example of an electrical first variation component detecting process performed by the electrical first variation component detector according to the sixth embodiment.

FIG. 35 is a flowchart showing one example of an electrical first variation component detecting process performed by the electrical first variation component detector 571. The electrical first variation component detecting process of FIG. 35 is similar to the electrical first variation component detecting process of FIG. 3, except replacement of the processing of step S100 with the processing of step S100f and replacement of the processing of steps S160 and S170 with the processing of steps S160f to 176f. The like processing steps are expressed by the like step numbers, and their detailed description is omitted.

When the electrical first variation component detecting process of FIG. 35 is triggered, the electrical first variation component detector 571 first obtains the input data, for example, the electrical angle $\theta_e$ of the motor 32, the voltage phase $\phi_q$ with respect to the q axis of the output voltage of the inverter 34, the voltage $V_H$ of the smoothing capacitor 39 and the electrical angular velocity $\omega_e$ of the motor 32 (step S100f). The respective data are input by the methods described above.

The electrical first variation component detector 571 updates the sine component buffer VHSIN[n] and the cosine component buffer VHCOS[n] of the voltage $V_H$ of the smoothing capacitor 39 (steps S140 and S150) and subsequently calculates a Fourier sine coefficient temporary value $b_{VHtemp}$ that is a temporary value (tentative value) of the Fourier sine coefficient $b_{VH}$ of the voltage $V_H$ of the smoothing capacitor 39 according to Expression (11-1) given below by using the sine component buffer VHSIN[i] (where i=0, ..., N−1) of the voltage $V_H$ of the smoothing capacitor 39 (step S160f). The electrical first variation component detector 571 also calculates a Fourier cosine coefficient temporary value $a_{VHtemp}$ that is a temporary value of the Fourier cosine coefficient $a_{VH}$ of the voltage $V_H$ of the smoothing capacitor 39 according to Expression (11-2) given below by using the cosine component buffer VHCOS[i] of the voltage $V_H$ of the smoothing capacitor 39 (step S170f).

$$b_{VHtmp} \leftarrow \frac{2}{N}\sum_{i=0}^{N-1} VHSIN[i] \quad (11\text{-}1)$$

$$a_{VHtmp} \leftarrow \frac{2}{N}\sum_{i=0}^{N-1} VHCOS[i] \quad (11\text{-}2)$$

Figure 36:
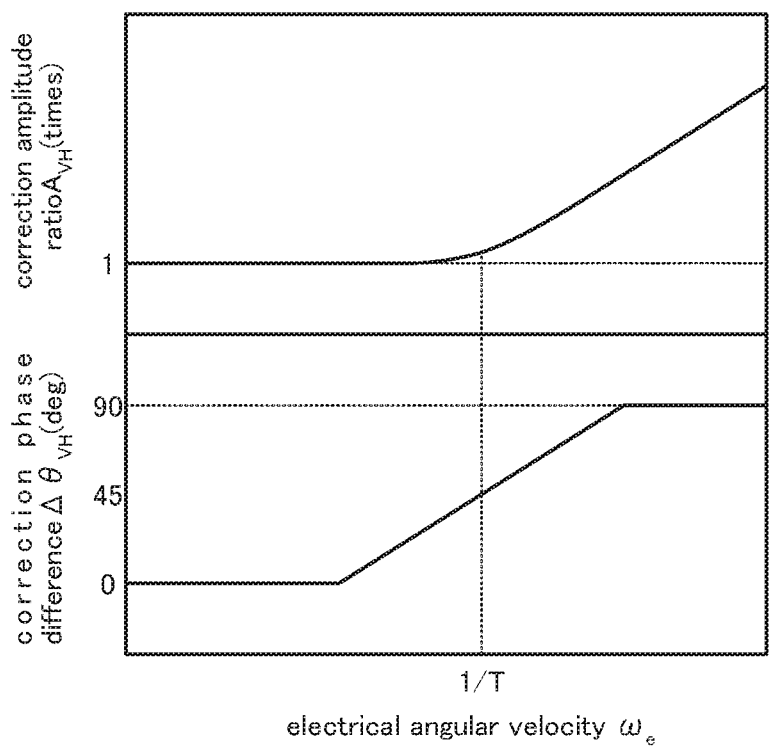
FIG. 36 is a diagram illustrating one example of a map that specifies relationships of a correction amplitude ratio $A_{VH}$ and a correction phase difference $\Delta\theta_{VH}$ to the electrical angular velocity $\omega_e$ of the motor according to the sixth embodiment.

The electrical first variation component detector 571 subsequently sets a correction amplitude ratio $A_{VH}$ and a correction phase difference $\Delta\theta_{VH}$, which are used to correct a deviation of the voltage $V_H$ of the smoothing capacitor 39 input from the voltage sensor 540 relative to the actual voltage $V_{Hact}$ of the smoothing capacitor 39, based on the electrical angular velocity $\omega_e$ of the motor 32 (step S172f). A procedure employed to set the correction amplitude ratio $A_{VH}$ and the correction phase difference $\Delta\theta_{VH}$ according to the embodiment specifies and stores in advance relationships of the correction amplitude ratio $A_{VH}$ and the correction phase difference $\Delta\theta_{VH}$ to the electrical angular velocity $\omega_e$ of the motor 32 in the form of a map in the ROM 52. When a value of the electrical angular velocity $\omega_e$ of the motor 32 is given, the procedure reads to set values of the correction amplitude ratio $A_{VH}$ and the correction phase difference $\Delta\theta_{VH}$ corresponding to the given value of the electrical angular velocity $\omega_e$ from this map. FIG. 36 is a diagram illustrating one example of the map that specifies the relationships of the correction amplitude ratio $A_{VH}$ and the correction phase difference $\Delta\theta_{VH}$ to the electrical angular velocity $\omega_e$ of the motor 32. More specifically, FIG. 36 shows the relationships of the correction amplitude ratio $A_{VH}$ and the correction phase difference $\Delta\theta_{VH}$ to the electrical angular velocity $\omega_e$ of the motor 32 when the low pass filter 542 of the voltage sensor 540 is designed in a first order lag system of a time constant T, i.e., when a relationship between an input $V_{Hfi}$ and an output $V_{Hfo}$ (voltage $V_H$) of the low pass filter 542 is expressible by Equation (11-3) given below.

$$V_{Hfo} = \frac{1}{1+Ts} V_{Hfi} \quad (11\text{-}3)$$

The electrical first variation component detector 571 subsequently calculates the Fourier cosine coefficient $a_{VH}$ and the Fourier sine coefficient $b_{VH}$ of the voltage $V_H$ of the smoothing capacitor 39 according to Equation (11-4) and Equation (11-5) given below by using the Fourier cosine coefficient temporary value $a_{VHtemp}$ and the Fourier sine coefficient temporary value $b_{VHtemp}$ of the voltage $V_H$ of the smoothing capacitor 39, the correction amplitude ratio $A_{VH}$ and the correction phase difference $\Delta\theta_{VH}$ (steps S174f and S176f) and then terminates the electrical first variation component detecting process of FIG. 35.

$$a_{VH} = A_{VH} \times (a_{VHtmp} \cos \Delta\theta_{VH} + b_{VHtmp} \sin \Delta\theta_{VH}) \quad (11\text{-}4)$$

$$b_{VH} = A_{VH} \times (b_{VHtmp} \cos \Delta\theta_{VH} - a_{VHtmp} \sin \Delta\theta_{VH}) \quad (11\text{-}5)$$

The processing of step S172f to S176f described above converts the voltage $V_H$ input from the voltage sensor 540 into a value closer to the actual voltage $V_{Hact}$ by taking into account the characteristics of the low pass filter 542 to calculate the Fourier cosine coefficient $a_{VH}$ and the Fourier sine coefficient $b_{VH}$ of the voltage $V_H$ of the smoothing capacitor 39.

As described above, like the driving system 20 of the first embodiment, the driving system 520 of the sixth embodiment performs Fourier series expansion of the voltage $V_H$ of the smoothing capacitor 39 input from the voltage sensor 540 to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 520 of the sixth embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Furthermore, the driving system 520 of the sixth embodiment calculates the Fourier cosine coefficient $a_{VH}$ and the Fourier sine coefficient $b_{VH}$ of the voltage $V_H$ of the smoothing capacitor 39 by taking into account the frequency characteristics of the voltage sensor 540. This configuration enables the Fourier cosine coefficient $a_{VH}$ and the Fourier sine coefficient $b_{VH}$ of the voltage $V_H$ of the smoothing capacitor 39 to be calculated with the higher accuracy.

The driving system 520 of the sixth embodiment having the configuration shown in FIG. 32 calculates the Fourier cosine coefficient $a_{VH}$ and the Fourier sine coefficient $b_{VH}$ of the voltage $V_H$ of the smoothing capacitor 39 by taking into account the characteristics of the voltage sensor 540. Similarly, the driving system 120 of the second embodiment having the configuration shown in FIG. 16 may calculate the Fourier cosine coefficient $a_{IB}$ and the Fourier sine coefficient $b_{IB}$ of the electric current $I_B$ of the battery 36 by taking into account the characteristics of the current sensor 36a. The driving system 320 of the fourth embodiment having the configuration shown in FIG. 25 may also calculate the Fourier cosine coefficient $a_{IL}$ and the Fourier sine coefficient $b_{IL}$ of the electric current $I_L$ of the reactor 242 by taking into account the characteristics of the current sensor 244.

Seventh Embodiments

The following describes a driving system 620 according to a seventh embodiment. The driving system 620 of the seventh embodiment has an identical hardware configuration with the hardware configuration of the driving system 20 of the first embodiment shown in FIG. 1. Accordingly, the detailed description is omitted with regard to the hardware configuration of the driving system 620 of the seventh embodiment.

Figure 37:
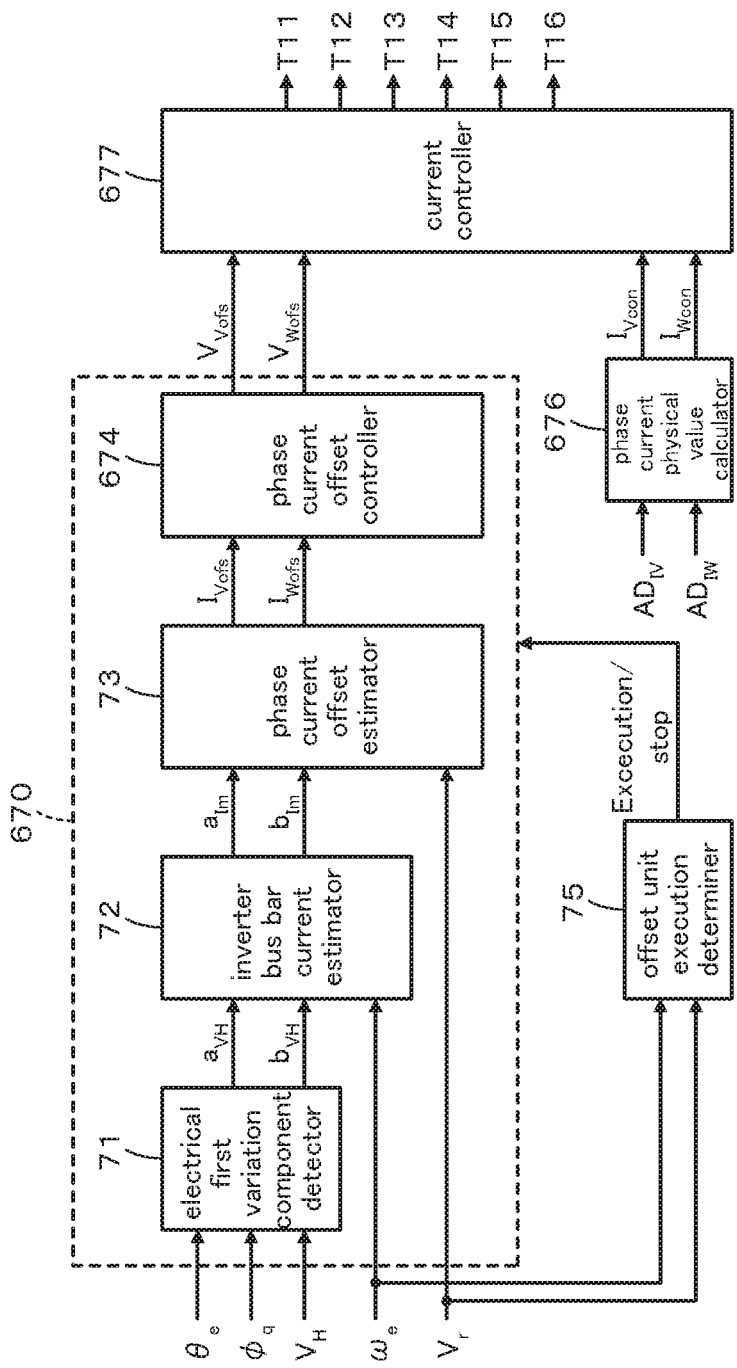
FIG. 37 is a control block diagram illustrating one example of control blocks for controlling the inverter in the PWM control mode by the electronic control unit in a driving system according to a seventh embodiment.

The following describes a series of control of the inverter 34 performed by the electronic control unit 50 in the driving system 620 of the seventh embodiment. FIG. 37 is a control block diagram illustrating one example of control blocks for controlling the inverter 34 in the PWM control mode by the electronic control unit 50 of the driving system 620 according to the seventh embodiment. The control block diagram of FIG. 37 is similar to the control block diagram of FIG. 2, except replacement of the phase current offset controller 74, the phase current physical value calculator 76 and the current controller 77 of the offset unit 70 with a phase current offset controller 674, a phase current physical value calculator 676 and a current controller 677 of an offset unit 670. The phase current offset controller 674, the phase current physical value calculator 676 and the current controller 677 are accordingly described in detail.

Figure 38:
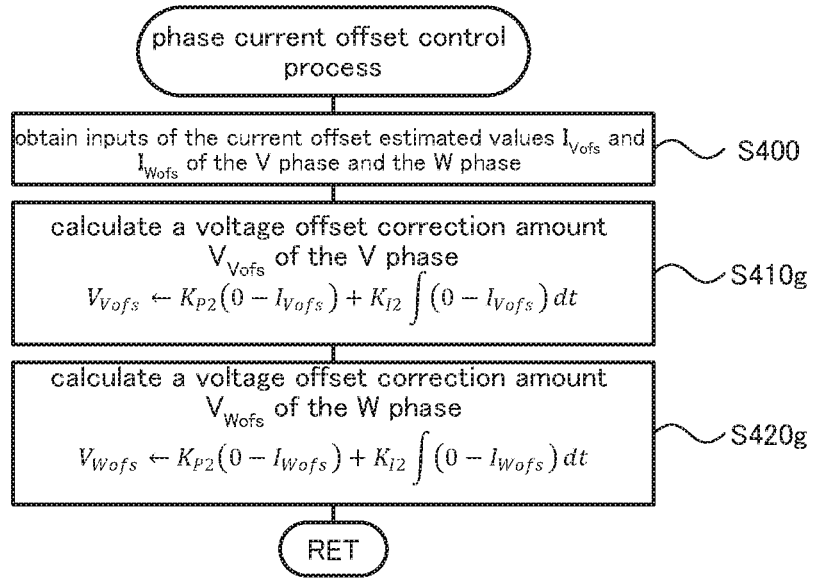
FIG. 38 is a flowchart showing one example of a phase current offset control process performed by a phase current offset controller according to the seventh embodiment.

The phase current offset controller 674 is described first. FIG. 38 is a flowchart showing one example of a phase current offset control process performed by a phase current offset controller 674 according to the seventh embodiment. When the phase current offset control process of FIG. 38 is triggered, the phase current offset controller 674 first obtains the input data of the current offset estimated values $I_{Vofs}$ and $I_{Wofs}$ of the V phase and the W phase (step S400).

After obtaining the input data, the phase current offset controller 674 calculates a voltage offset correction amount $V_{Vofs}$ of the V phase according to Expression (12-1) given below by using the input current offset estimated value $I_{Vofs}$ of the V phase (step S410g), calculates a voltage offset correction amount $V_{Wofs}$ of the W phase according to Expression (12-2) given below by using the input current offset estimated value $I_{Wofs}$ of the W phase (step S420g), and then terminates the phase current offset control process of FIG. 38.

$$V_{Vofs} \leftarrow K_{P2}(0-I_{Vofs})+K_{I2}\int(0-I_{Vofs})dt \quad (12\text{-}1)$$

$$V_{Wofs} \leftarrow K_{P2}(0-I_{Wofs})+K_{I2}\int(0-I_{Wofs})dt \quad (12\text{-}2)$$

The voltage offset correction amounts $V_{Vofs}$ and $V_{Wofs}$ of the V phase and the W phase respectively denote correction amounts used by the current controller 677 for correction of voltage commands $V_V^*$ and $V_W^*$ of the V phase and the W phase. Expression (12-1) and Expression (12-2) are relational expressions of feedback control respectively used to calculate the voltage offset correction amounts $V_{Vofs}$ and $V_{Wofs}$, such that the current offset estimated values $I_{Vofs}$ and $I_{Wofs}$ of the V phase and the W phase become equal to a value 0. In Expression (12-1) and Expression (12-2), "$K_{P2}$" denotes a gain of a proportional, and "$K_{I2}$" denotes a gain of an integral term.

Figure 39:
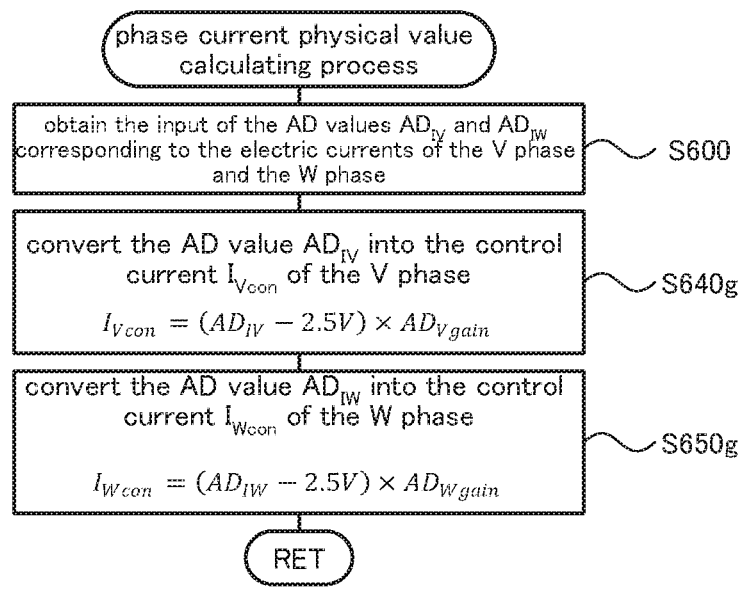
FIG. 39 is a flowchart showing one example of a phase current physical value calculating process performed by a phase current physical value calculator according to the seventh embodiment.

The phase current physical value calculator 676 is described next. FIG. 39 is a flowchart showing one example of a phase current physical value calculating process performed by the phase current physical value calculator 676. The phase current physical value calculating process of FIG. 39 is similar to the phase current physical value calculating process of FIG. 12, except replacing of the processing of steps S610 to S650 with the processing of steps S640g and 650g.

When the phase current physical value calculating process of FIG. 39 is triggered, the phase current physical value calculator 676 first obtains the input data of the AD values $AD_{IV}$ and $AD_{IW}$ corresponding to the electric currents $I_V$ and $I_W$ of the V phase and the W phase of the motor 32 input from current sensors 32v and 32w (step S600). The phase current physical value calculator 676 subsequently converts the AD value $AD_{IV}$ into the control current $I_{Vcon}$ of the V phase according to Equation (12-3) given below (step S640g), converts the AD value $AD_{IW}$ into the control current $I_{Wcon}$ of the W phase according to Equation (12-4) given below (step S650g) and then terminates the phase current physical value calculating process of FIG. 39.

$$I_{Vcon}=(AD_{IV}-2.5V)\times AD_{Vgain} \quad (12\text{-}3)$$

$$I_{Wcon}=(AD_{IW}-2.5V)\times AD_{Wgain} \quad (12\text{-}4)$$

Equation (12-3) given above is equivalent to Equation (5-1) with setting the offset correction amount $AD_{Vofs}$ of the V phase to a value 0. Equation (12-4) is equivalent to Equation (5-2) with setting the offset correction amount $AD_{Wofs}$ of the W phase to a value 0. Accordingly, when offsets are generated in the electric currents $I_U$, $I_V$ and $I_W$ of the respective phases, the offset amounts (actual offset amounts) included in the electric currents $I_V$ and $I_W$ of the V phase and the W phase are reflected on the AD values $AD_{IV}$ and $AD_{IW}$ from the current sensors 32v and 32w and thereby on the control currents $I_{Vcon}$ and $V_{Wcon}$ of the V phase and the W phase (i.e., the electric currents of the V phase and the W phase recognized by the electronic control unit 50).

Figure 40:
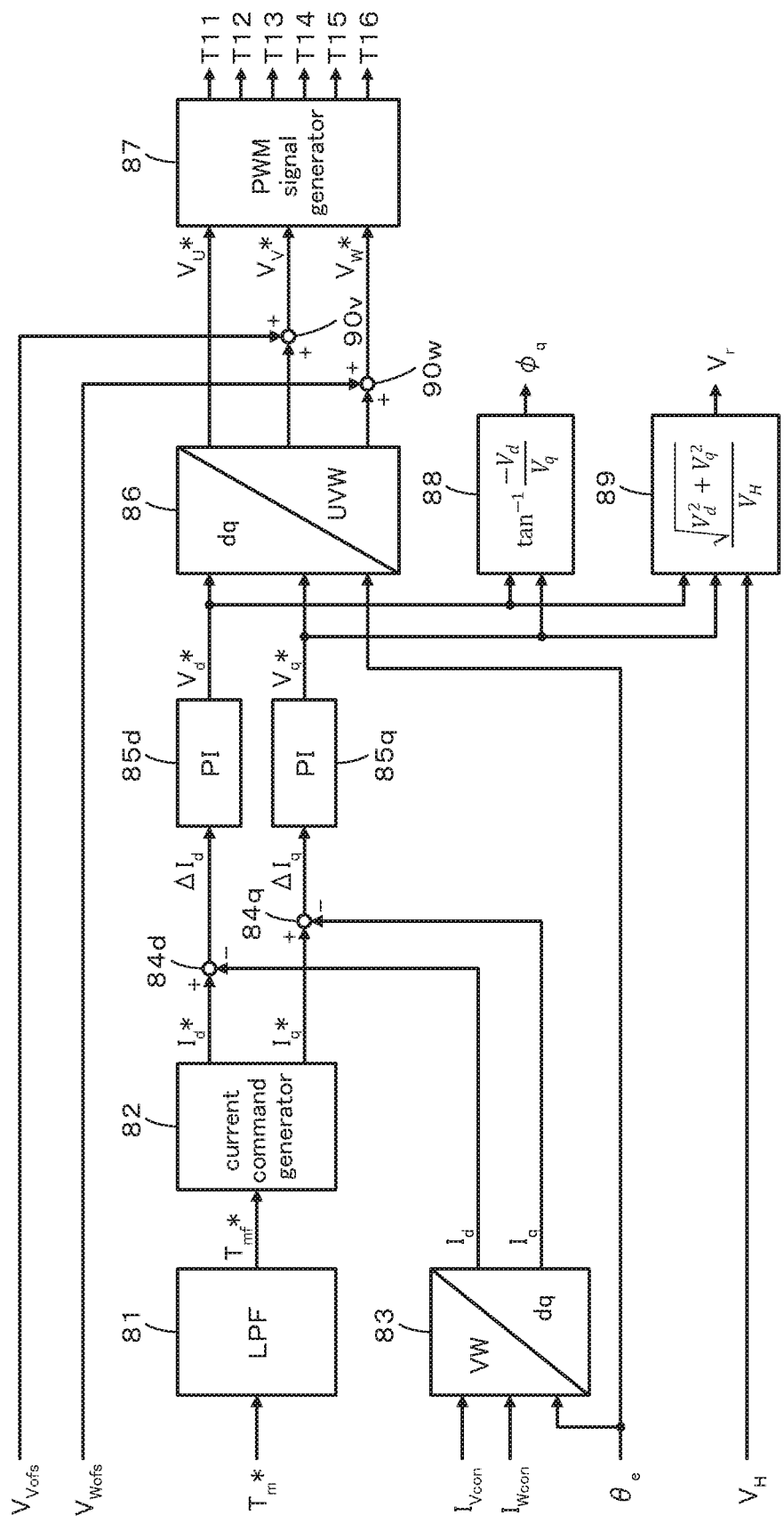
FIG. 40 is a control block diagram illustrating one example of control blocks for the purpose of describing respective processes performed by a current controller according to the seventh embodiment.

The current controller 677 is described below. FIG. 40 is a control black diagram illustrating one example of control blocks s for the purpose of describing the respective processes performed by the current controller 677. The control block diagram of FIG. 40 is similar to the control block diagram of FIG. 15, except addition of adders 90v and 90w. The adders 90v and 90w are accordingly described in detail.

The adders 90v and 90w serve to correct the voltage commands $V_V{}^*$ and $V_W{}^*$ of the V phase and the W phase from the coordinate converter 86 by adding the voltage offset correction amounts $V_{Vofs}$ and $V_{Wofs}$ to the voltage commands $V_V{}^*$ and $V_W{}^*$ of the V phase and the W phase and output the corrected voltage commands $V_V{}^*$ and $V_W{}^*$ of the V phase and the W phase to the PWM signal generator 87.

As described above, like the driving system 20 of the first embodiment, the driving system 620 of the seventh embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 620 of the seventh embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Eighth Embodiments

The following describes a driving system 720 according to an eighth embodiment. The driving system 720 of the eighth embodiment has an identical hardware configuration with the hardware configuration of the driving system 20 of the first embodiment shown in FIG. 1. Accordingly, the detailed description is omitted with regard to the hardware configuration of the driving system 720 of the eighth embodiment.

Figure 41:
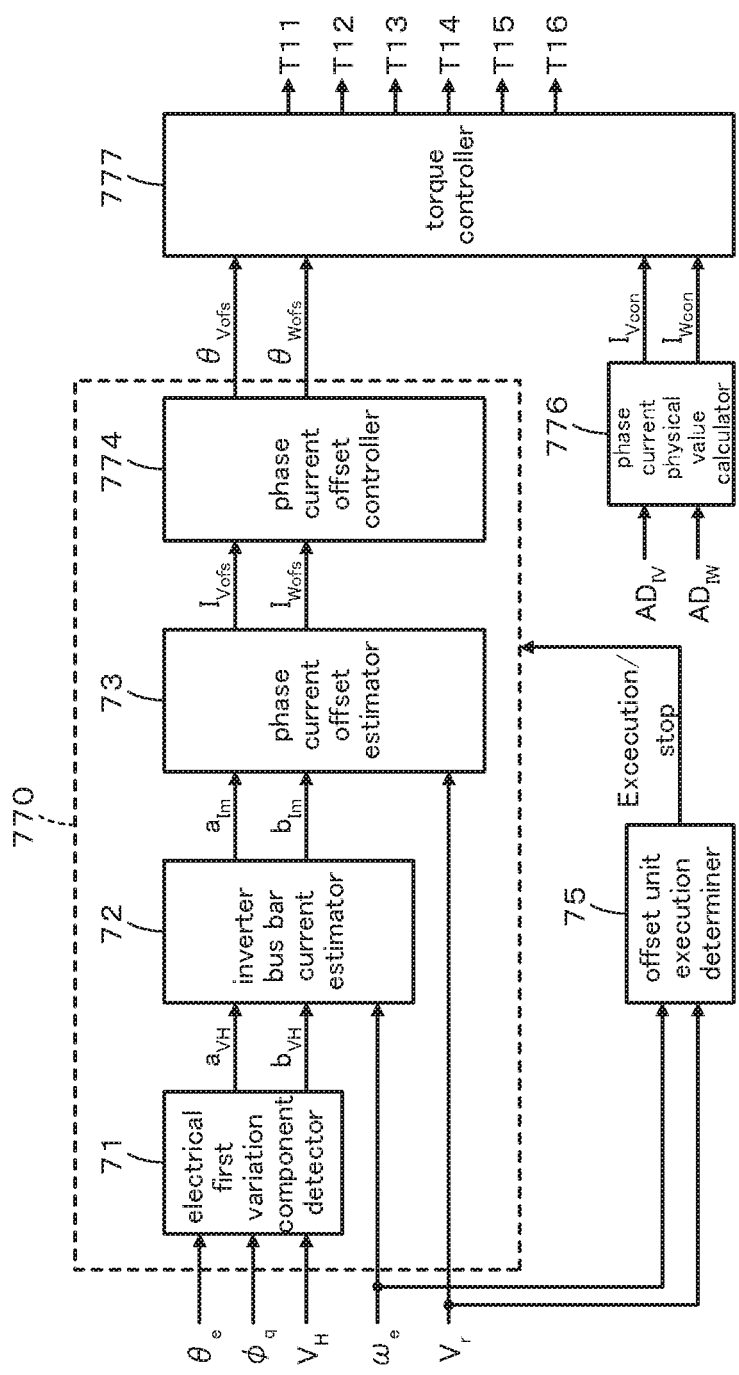
FIG. 41 is a control block diagram illustrating one example of control blocks for controlling the inverter in a rectangular wave control mode by the electronic control unit in a driving system according to an eighth embodiment.

The following describes a series of control of the inverter 34 performed by the electronic control unit 50 in the driving system 720 of the eighth embodiment. FIG. 41 is a control block diagram illustrating one example of control blocks for controlling the inverter 34 in a rectangular wave control mode by the electronic control unit in a driving system according to an eighth embodiment. The control block diagram of FIG. 41 is similar to the control block diagram of FIG. 2, except replacement of the phase current offset controller 74, the phase current physical value calculator 76 and the current controller 77 of the offset unit 70 with a phase current offset controller 774, a phase current physical value calculator 776 and a torque controller 777 of an offset unit 770. The phase current offset controller 774, the phase current physical value calculator 776 and the torque controller 777 are accordingly described in detail.

Figure 42:
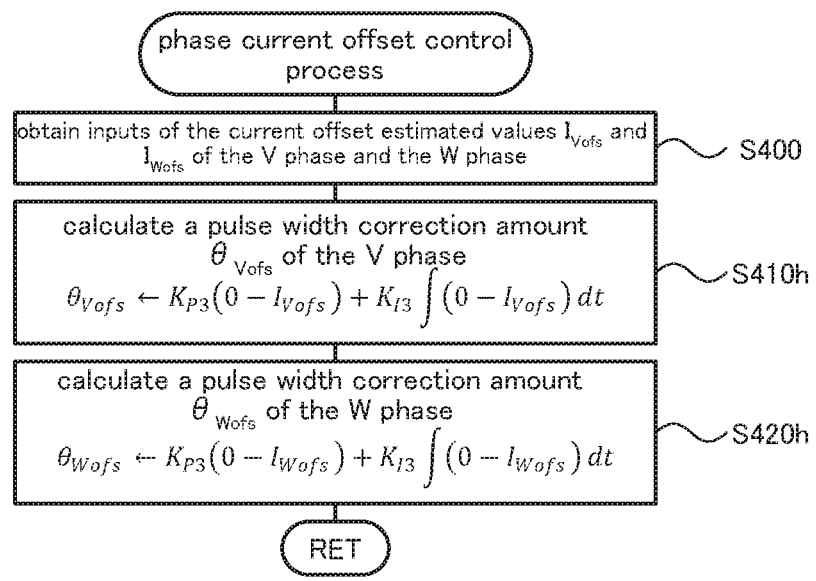
FIG. 42 is a flowchart showing one example of a phase current offset control process performed by a phase current offset controller according to the eighth embodiment.

The phase current offset controller 774 is described first. FIG. 42 is a flowchart showing one example of a phase current offset control process performed by a phase current offset controller according to the eighth embodiment. When the phase current offset control process of FIG. 42 is triggered, the phase current offset controller 774 first obtains the input data of the current offset estimated values $I_{Vofs}$ and $I_{Wofs}$ of the V phase and the W phase (step S400).

After obtaining the input data, the phase current offset controller 774 calculates a pulse width correction amount $\theta_{Vofs}$ of the V phase according to Expression (13-1) given below by using the input current offset estimated value $I_{Vofs}$ of the V phase (step S410h), calculates a pulse width correction amount $\theta_{Wofs}$ of the W phase according to Expression (13-2) given below by using the input current offset estimated value $I_{Wofs}$ of the W phase (step S420h), and then terminates the phase current offset control process of FIG. 42.

$$\theta_{Vofs} \leftarrow K_{P3}(0-I_{Vofs})+K_{I3}\int(0-I_{Vofs})dt \qquad (13\text{-}1)$$

$$\theta_{Wofs} \leftarrow K_{P3}(0-I_{Wofs})+K_{I3}\int(0-I_{Wofs})dt \qquad (13\text{-}2)$$

The pulse width correction amounts $\theta_{Vofs}$ and $\theta_{Wofs}$ of the V phase and the W phase respectively denote correction amounts used by the torque controller 777 for correction of pulse widths of rectangular wave pulse signals of the V phase and the W phase. Expression (13-1) and Expression (13-2) are relational expressions of feedback control respectively used to calculate the pulse width correction amounts $\theta_{Vofs}$ and $\theta_{Wofs}$, such that the current offset estimated values $I_{Vofs}$ and $I_{Wofs}$ of the V phase and the W phase become equal to a value 0. In Expression (13-1) and Expression (13-2), "$K_{P3}$" denotes a gain of a proportional, and "$K_{I3}$" denotes a gain of an integral term.

The phase current physical value calculator 776 is described next. The phase current physical value calculator 776 performs the phase current physical value calculating process of FIG. 39, like the phase current physical value calculator 676 of the driving system 620 of the seventh embodiment described above.

Figure 43:
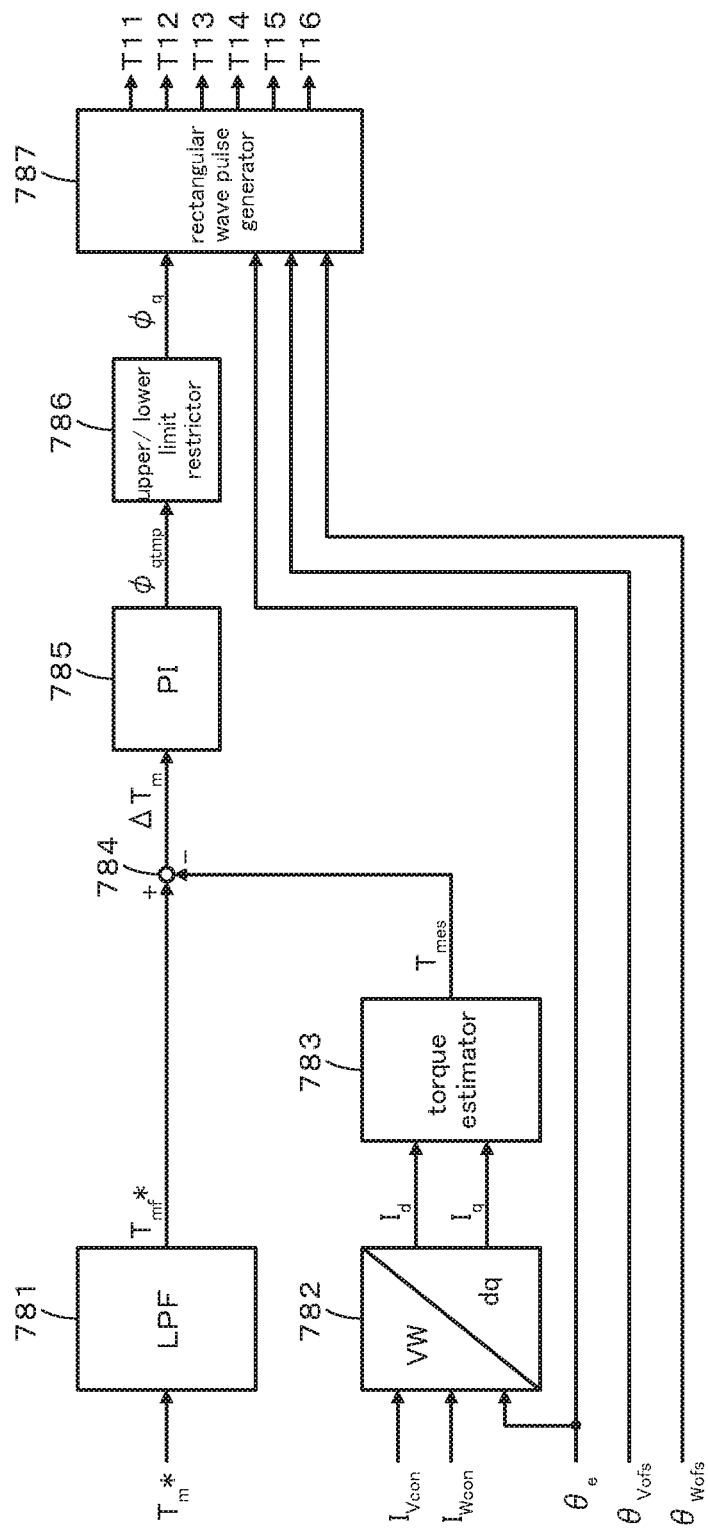
FIG. 43 is a control block diagram illustrating one example of control blocks for the purpose of describing respective processes performed by a torque controller according to the eighth embodiment.

The torque controller 777 is described below. FIG. 43 is a control block diagram illustrating one example of control blocks for the purpose of describing respective processes performed by a torque controller 777 according to the eighth embodiment. As shown in FIG. 43, the torque controller 777 includes a low pass filter (LPF) 781, a coordinate converter 782, a torque estimator 783, a subtractor 784, a feedback controller (PI controller) 785, an upper/lower limit restrictor 786, and a rectangular wave pulse generator 787.

The low pass filter 781 serves to process the torque command $T_m{}^*$ of the motor 32 by low pass filter processing and generate a filtered torque command $T_{mf}{}^*$. The coordinate converter 782 serves to perform coordinate conversion (three phase to two phase conversion) of the control currents $I_{Vcon}$ and $I_{Wcon}$ of the V phase and the W phase of the motor 32 into electric currents $I_d$ and $I_q$ of the d axis and the q axis by using the electrical angle $\theta_e$ of the motor 32 on the assumption that the sum of the electric currents of the respective phases is equal to zero. The torque estimator 783 serves to determine a torque estimated value $T_{mes}$ of the motor 32, based on the electric currents $I_d$ and $I_q$ of the d axis and the q axis. The subtractor 784 serves to calculate a difference $\Delta T_m$ between the filtered torque command $T_{mf}{}^*$ and the torque estimated value $T_{mes}$ of the motor 32.

The feedback controller 785 serves to perform torque feedback control and calculate a tentative voltage phase $\phi_{qtemp}$ that is a tentative value of the voltage phase $\phi_q$ of the output voltage of the inverter 34, such that the difference $\Delta T_m$ becomes equal to a value 0. The upper/lower limit restrictor 786 serves to set the voltage phase $\phi_q$ by applying upper limit and lower limit guarding to the tentative voltage phase $\phi_{qtemp}$.

The rectangular wave pulse generator 787 serves to generate rectangular wave pulses of the transistors T11 to T16 by using the electrical angle $\theta_e$ of the motor 32, the voltage phase $\phi_q$ of the output voltage of the inverter 34 and the pulse width correction amounts $\theta_{Vofs}$ and $\theta_{Wofs}$ of the V phase and the W phase and to perform switching control of the transistors T11 to T16.

Figure 44:
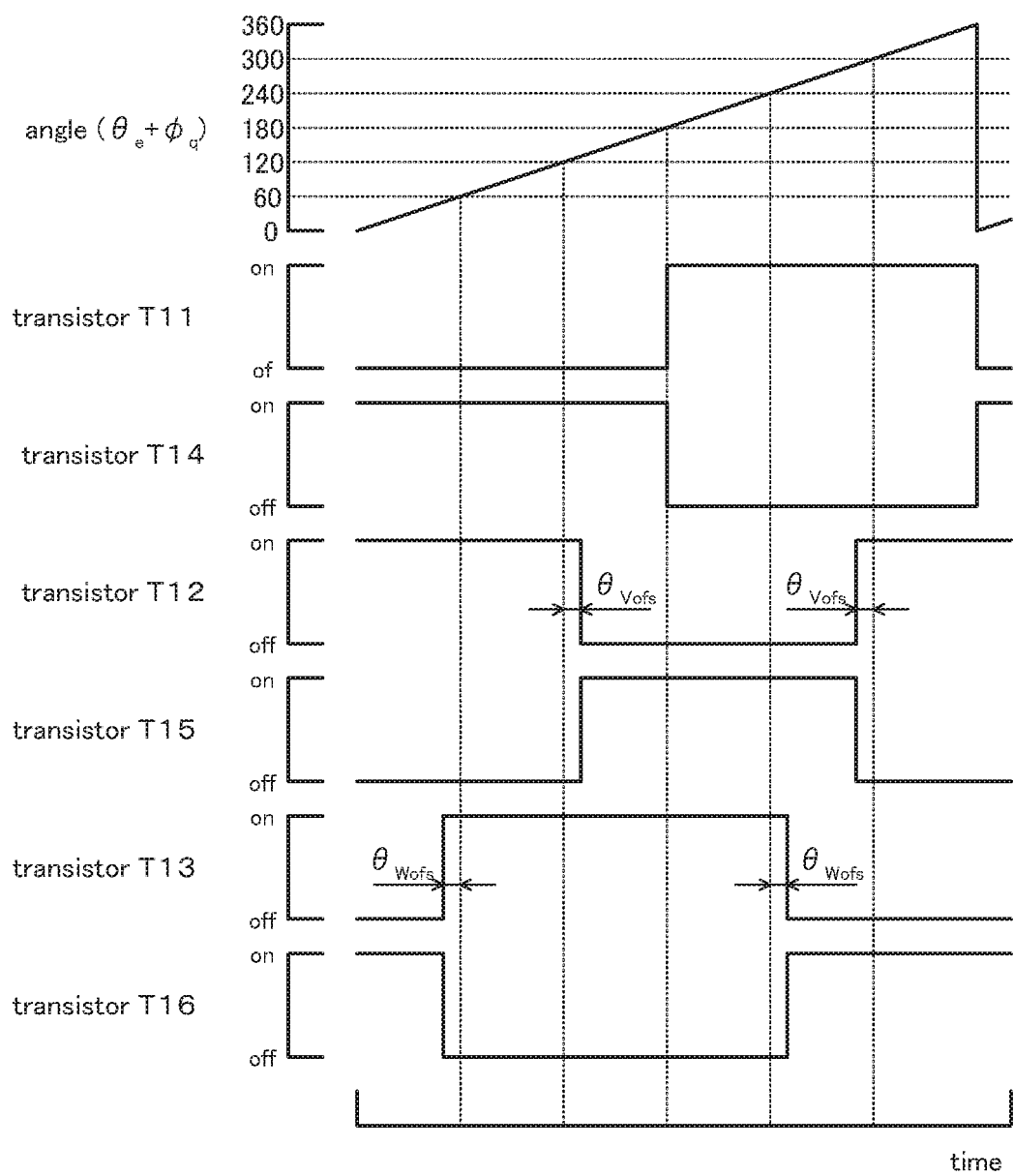
FIG. 44 is a diagram illustrating one example of a relationship between an angle $(\theta_e+\phi_q)$ of the motor to rectangular wave pulse signals of transistors T11 to T16 according to the eighth embodiment.

FIG. 44 is a diagram illustrating one example of a relationship between an angle ($\theta_e+\phi_q$) of the motor 32 to rectangular wave pulse signals of transistors T11 to T16 according to the eighth embodiment. More specifically, FIG. 44 show the relationships when both the pulse width correction amounts $\theta_{Vofs}$ and $\theta_{Wofs}$ of the V phase and the W phase are positive values. As shown in FIG. 44, the on/off switchover timings of the transistors T12 and T15 are regulated based on the pulse width correction amount $\theta_{Vofs}$ of the V phase, and the on/off switchover timings of the transistors T13 and T16 are regulated based on the pulse width correction amount $\theta_{Wofs}$ of the W phase.

As described above, like the driving system 20 of the first embodiment, the driving system 720 of the eighth embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 720 of the eighth embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Ninth Embodiments

The following describes a driving system 820 according to a ninth embodiment. The driving system 820 of the ninth embodiment has an identical hardware configuration with the hardware configuration of the driving system 20 of the first embodiment shown in FIG. 1. Accordingly, the detailed description is omitted with regard to the hardware configuration of the driving system 820 of the ninth embodiment.

Figure 45:
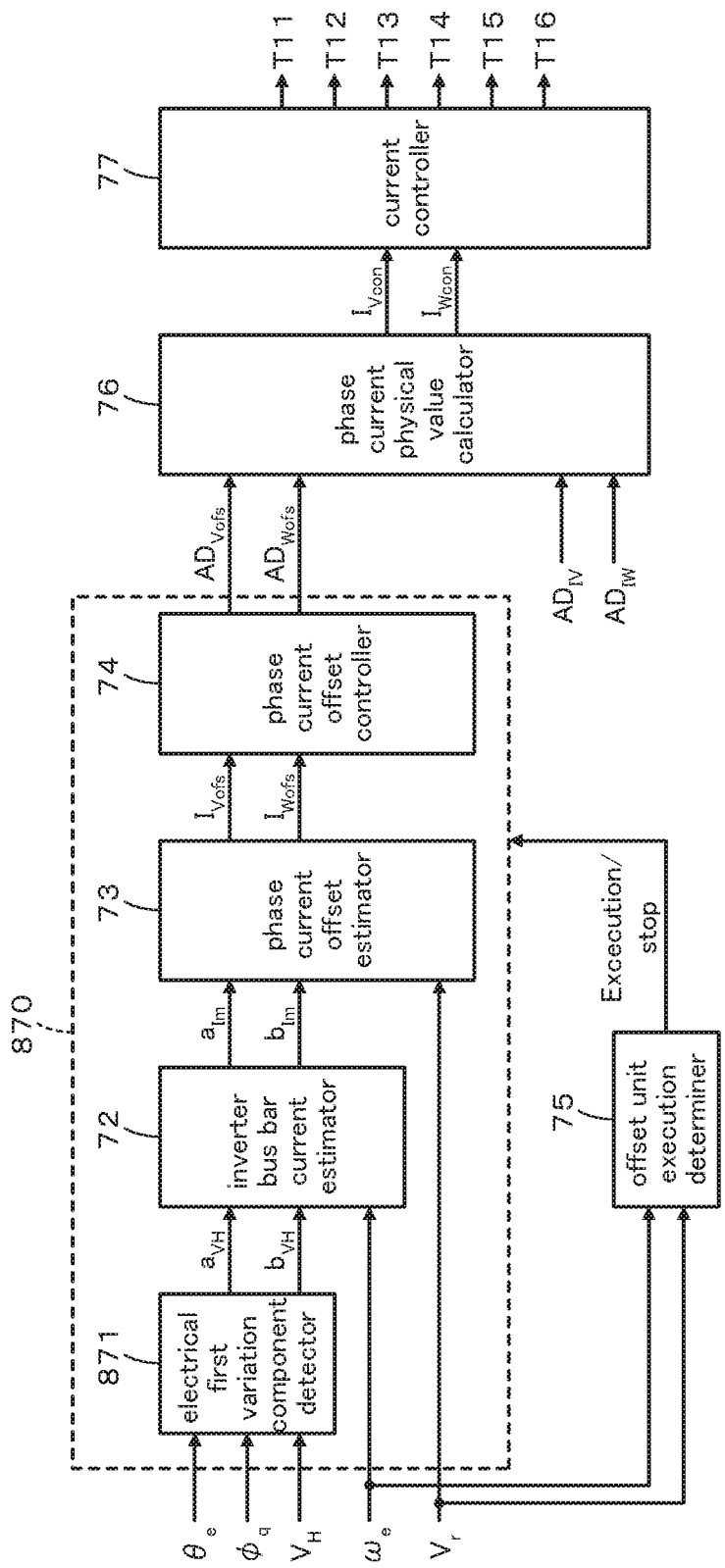
FIG. 45 is a control block diagram illustrating one example of control blocks for controlling the inverter in a PWM control mode by the electronic control unit in a driving system according to a ninth embodiment.

The following describes a series of control of the inverter 34 performed by the electronic control unit 50 in the driving system 820 of the ninth embodiment. FIG. 45 is a control block diagram illustrating one example of control blocks for controlling the inverter 34 in the PWM control mode by the electronic control unit 50 of the driving system 820 according to the ninth embodiment. The control block diagram of FIG. 45 is similar to the control block diagram of FIG. 2, except replacement of the electrical first variation component detector 71 of the offset unit 70 with an electrical first variation component detector 871 of an offset unit 870. The electrical first variation component detector 871 is accordingly described in detail.

Figure 46:
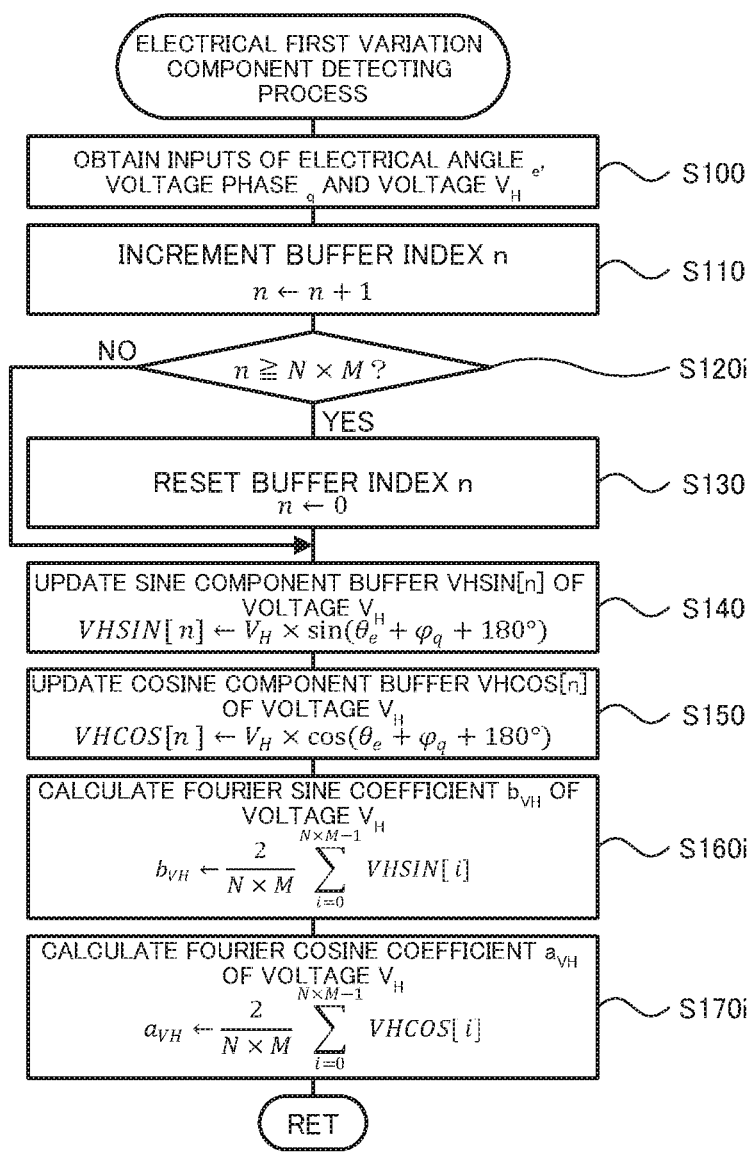
FIG. 46 is a flowchart showing one example of an electrical first variation component detecting process performed by an electrical first variation component detector according to the ninth embodiment.

FIG. 46 is a flowchart showing one example of an electrical first variation component detecting process performed by the electrical first variation component detector 871. The electrical first variation component detecting process of FIG. 46 is similar to the electrical first variation component detecting process of FIG. 3, except replacing of the processing of steps S120, S160 and S170 with the processing of steps S120i, S160i and S170i. The like processing steps are expressed by the like step numbers, and their detailed description is omitted.

In the electrical first variation component detecting process of FIG. 46, the electrical first variation component detector 871 updates the buffer index n by incrementing the buffer index n by the value 1 (step S110) and subsequently compares the updated buffer index n with the product of the value N described above and a value M (step S120i). The value M is an integral number that is equal to or larger than a value 2. Accordingly, the product of the value N and the value M indicates a frequency at the electrical angle $\theta_e$ of the motor 32.

When the buffer index n is smaller than the product of the value N and the value M at step S120i, the electrical first variation component detector 871 updates the sine component buffer VHSIN[n] and the cosine component buffer VHCOS[n] of the voltage $V_H$ of the smoothing capacitor 39 with regard to the buffer index n (steps S140 and S150). When the buffer index n is equal to or larger than the product of the value N and the value M, on the other hand, the electrical first variation component detector 871 resets the buffer index n to the value 0 (step S130) and updates the sine component buffer VHSIN[n] and the cosine component buffer VHCOS[n] of the voltage $V_H$ of the smoothing capacitor 39 with regard to the buffer index n (steps S140 and S150).

The electrical first variation component detector 871 subsequently calculates the Fourier sine coefficient $b_{VH}$ of the voltage $V_H$ of the smoothing capacitor 39 according to Expression (14-1) given below by using the sine component buffer VHSIN[i] (where i=0, . . . , N×M−1) of the voltage $V_H$ of the smoothing capacitor 39 (step S160i). The electrical first variation component detector 871 also calculates the Fourier cosine coefficient $a_{VH}$ of the voltage $V_H$ of the smoothing capacitor 39 according to Expression (14-2) given below by using the cosine component buffer VHCOS [i] of the voltage $V_H$ of the smoothing capacitor 39 (step S170i) and then terminates the electrical first variation component detecting process of FIG. 45.

$$b_{VH} \leftarrow \frac{2}{N \times M} \sum_{i=0}^{N \times M - 1} VHSIN[i] \qquad (14\text{-}1)$$

$$a_{VH} \leftarrow \frac{2}{N \times M} \sum_{i=0}^{N \times M - 1} VHCOS[i] \qquad (14\text{-}2)$$

Figure 47:
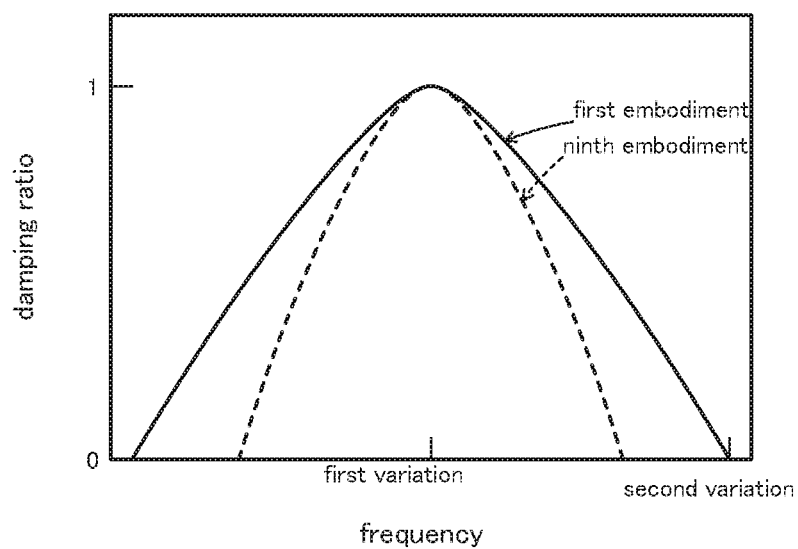
FIG. 47 is a diagram illustrating one example of relationships between the damping ratio and the frequency as results of execution of the procedures of the first embodiment and the ninth embodiment.

FIG. 47 is a diagram illustrating one example of relationships between the damping ratio and the frequency as results of execution of the procedures of the first embodiment and the ninth embodiment. In the diagram of FIG. 47, a solid line curve indicates the result of Fourier series expansion at the electrical first order by using signals of one electrical period of the motor 32 (where the value M is equal to a value 1) (i.e., the sine component buffer VHSIN[i] and the cosine component buffer VHCOS[i] of the voltage $V_H$ of the smoothing capacitor 39). A broken line curve indicates the result of Fourier series expansion at the electrical first order by using signals of two electrical periods of the motor 32

(where the value M is equal to a value 2). FIG. 47 shows that increasing the number of signals used for Fourier series expansion increases the removable frequency components (other than the electrical first order component) and thereby more effectively narrows the frequency band recognized as the electrical first order. It is accordingly expected to more sufficiently remove the noise (except the electrical first order) in the surroundings of the electrical first order. As the results of experiments and analyses, the inventors of the present application have also confirmed that Fourier series expansion at the electrical first order by using signals of M electrical periods of the motor 32 removes the frequency components of the integral multiples of the electrical frequency/M other than the electrical first order.

As described above, like the driving system 20 of the first embodiment, the driving system 820 of the ninth embodiment performs Fourier series expansion of the voltage $V_H$ of the smoothing capacitor 39 input from the voltage sensor 39a to calculate the Fourier cosine coefficient $a_{VH}$ and the Fourier sine coefficient $b_{VH}$ of the voltage $V_H$ of the smoothing capacitor 39, and controls the inverter 34, based on the Fourier cosine coefficient $a_{VH}$ and the Fourier sine coefficient $b_{VH}$ of the voltage $V_H$ of the smoothing capacitor 39. Like the configuration of the driving system 20 of the first embodiment, the configuration of the driving system 820 of the ninth embodiment sufficiently removes the components other than the electrical first variation component of the voltage $V_H$ of the smoothing capacitor 39 (for example, electrical second variation component and electrical sixth variation component) and more effectively suppresses a voltage variation of the smoothing capacitor 39 and a torque variation of the motor 32.

Furthermore, the driving system 820 of the ninth embodiment calculates the Fourier cosine coefficient $a_{VH}$ and the Fourier sine coefficient $b_{VH}$ of the voltage $V_H$ of the smoothing capacitor 39 by using the data of the period M (where M≥2) at the electrical angle $\theta_e$ of the motor 32. This configuration enables the Fourier cosine coefficient $a_{VH}$ and the Fourier sine coefficient $b_{VH}$ of the voltage $V_H$ of the smoothing capacitor 39 to be calculated with the higher accuracy.

In the driving systems 20, 120, 220, 320, 420, 520, 620, 720 and 820 of the first to the ninth embodiments described above, the offset unit execution determining process of FIG. 11 or FIG. 24 performed by the offset unit execution determiner 75 or 275 determines whether the respective processes of the offset unit 70, 170, 270, 370, 470, 570, 670, 770 or 870 are to be performed, based on the electrical angular velocity $\omega_e$ of the motor 32 and the modulation degree $V_r$ of the output voltage of the inverter 34 (and the duty command D of the boost converter 240). According to a modification, the configuration may exclude the offset unit execution determiner 75 or 275 and may cause the respective processes of the offset unit 70, 170, 270, 370, 470, 570, 670, 770 or 870 to be performed irrespective of the electrical angular velocity $\omega_e$ of the motor 32 and the modulation degree $V_r$ of the output voltage of the inverter 34 (and the duty command D of the boost converter 240).

In the driving system of the present invention, the control device may control the inverter by regulating an offset amount of the detected value of the current sensor, such that the electrical first variation component of the voltage of the smoothing capacitor becomes equal to the value 0. This configuration more effectively suppresses the electrical first variation component of the voltage of the smoothing capacitor by regulating the offset amount of the detected value of the current sensor.

In the driving system of the present invention, the control device may calculate an electrical first variation component of a bus bar current or a bus bar power of the inverter, based on the electrical first variation component of the voltage of the smoothing capacitor, and the control device may control the inverter, based on the calculated electrical first variation component of the bus bar current or the bus bar power of the inverter, such that the electrical first variation component of the voltage of the smoothing capacitor becomes equal to the value 0. This configuration calculates and uses the electrical first variation component of the bus bar current or the bus bar power of the inverter and thereby more effectively suppresses the electrical first variation component of the voltage of the smoothing capacitor.

In the driving system of the present disclosure calculating an electrical first variation component of a bus bar current or a bus bar power of the inverter, based on the electrical first variation component of the voltage of the smoothing capacitor, the control device may calculate the electrical first variation component of the bus bar current or the bus bar power of the inverter, based on the electrical first variation component of the voltage of the smoothing capacitor and a frequency characteristic of a circuit from the power storage device to the smoothing capacitor. This configuration enables the electrical first variation component of the bus bar current or the bus bar power of the inverter to be calculated by taking into account the frequency characteristic of the circuit from the power storage device to the smoothing capacitor. In the driving system of this aspect, the control device may use an amplitude ratio and a phase difference between the bus bar current of the inverter and the voltage of the smoothing capacitor as the frequency characteristic of the circuit from the power storage device to the smoothing capacitor.

In the driving system of the present disclosure calculating an electrical first variation component of a bus bar current or a bus bar power of the inverter, based on the electrical first variation component of the voltage of the smoothing capacitor, the driving system may include a boost converter that is provided between the inverter along with the smoothing capacitor and the power storage device on the power line and that may be configured to include switching elements of an upper arm and of a lower arm and a reactor, wherein the control device may calculate the electrical first variation component of the bus bar current or the bus bar power of the inverter, based on the electrical first variation component of the voltage of the smoothing capacitor and a frequency characteristic of a circuit from the power storage device to the smoothing capacitor, when the upper arm is kept on. This configuration enables the electrical first variation component of the bus bar current or the bus bar power of the inverter to be calculated by taking into account the frequency characteristic of the circuit from the power storage device to the smoothing capacitor, when the upper arm of the boost converter is kept on. In the driving system of this aspect, the control device may use an amplitude ratio and a phase difference between the bus bar current of the inverter and the voltage of the smoothing capacitor as the frequency characteristic of the circuit from the power storage device to the smoothing capacitor.

In the driving system of the present disclosure calculating an electrical first variation component of a bus bar current or a bus bar power of the inverter, based on the electrical first variation component of the voltage of the smoothing capacitor, the driving system may include a second current sensor configured to detect an electric current of the power storage device, wherein the control device may perform Fourier series expansion of a detected value of the second current sensor to calculate an electrical first variation component of the electric current of the power storage device, and the control device may calculate the electrical first variation component of the bus bar current or the bus bar power of the inverter, based on the electrical first variation component of the voltage of the smoothing capacitor and the electrical first variation component of the electric current of the power storage device. This configuration enables the electrical first variation component of the bus bar current or the bus bar power of the inverter to be calculated by taking into account the electrical first variation component of the electric current of the power storage device.

In the driving system of the present disclosure calculating an electrical first variation component of a bus bar current or a bus bar power of the inverter, based on the electrical first variation component of the voltage of the smoothing capacitor, the driving system may include a boost converter that is provided between the inverter along with the smoothing capacitor and the power storage device on the power line and that may be configured to include switching elements of an upper arm and of a lower arm and a reactor; and a third current sensor configured to detect an electric current of the reactor, wherein the control device may perform Fourier series expansion of a detected value of the third current sensor to calculate an electrical first variation component of the electric current of the reactor, and the control device may calculate the electrical first variation component of the bus bar current or the bus bar power of the inverter, based on the electrical first variation component of the voltage of the smoothing capacitor, the electrical first variation component of the electric current of the reactor and a duty command used to control the boost converter. This configuration enables the electrical first variation component of the bus bar current or the bus bar power of the inverter to be calculated by taking into account the electrical first variation component of the electric current of the reactor included in the boost converter.

In the driving system of the present disclosure calculating an electrical first variation component of a bus bar current or a bus bar power of the inverter, based on the electrical first variation component of the voltage of the smoothing capacitor, the control device may estimate an offset amount of the detected value of the current sensor, based on the electrical first variation component of the bus bar current or the bus bar power of the inverter, the control device may calculate a control current of each phase of the motor by correcting the detected value of the current sensor, such that the offset amount of the detected value of the current sensor becomes equal to a value 0, and the control device may control the inverter, based on the calculated control current of each phase of the motor.

In the driving system of the present disclosure calculating an electrical first variation component of a bus bar current or a bus bar power of the inverter, based on the electrical first variation component of the voltage of the smoothing capacitor, when the control device controls the inverter in a pulse width modulation control mode, the control device may estimate an offset amount of the detected value of the current sensor, based on the electrical first variation component of the bus bar current or the bus bar power of the inverter, and the control device may control the inverter with correcting a voltage command of each phase of the motor, such that the offset amount of the detected value of the current sensor becomes equal to a value 0.

In the driving system of the present disclosure calculating an electrical first variation component of a bus bar current or a bus bar power of the inverter, based on the electrical first variation component of the voltage of the smoothing capacitor, the inverter may have switching elements of an upper arm and a lower arm with respect to each phase, and when the control device controls the inverter in a rectangular wave control mode, the control device may estimate an offset amount of the detected value of the current sensor, based on the electrical first variation component of the bus bar current or the bus bar power of the inverter, and the control drive may control the inverter with correcting a pulse width of the upper arm and the lower arm with respect to each phase, such that the offset amount of the detected value of the current sensor becomes equal to a value 0.

In the driving system of the present disclosure, when an electrical angular velocity of the motor is equal to or higher than a predetermined angular velocity and a modulation degree of an output voltage of the inverter is equal to or higher than a predetermined modulation degree, the control device may perform Fourier series expansion of the detected value of the voltage sensor to calculate the electrical first variation component of the voltage of the smoothing capacitor, and the control device may control the inverter, such that the electrical first variation component of the voltage of the smoothing capacitor becomes equal to the value 0.

In the driving system of the present disclosure, the control device may calculate the electrical first variation component of the voltage of the smoothing capacitor by taking into account a frequency characteristic of the voltage sensor. This configuration enables the electrical first variation component of the voltage of the smoothing capacitor to be calculated with the higher accuracy.

In the driving system of the present disclosure, the control device may perform Fourier series expansion of the detected value of the voltage sensor by using data of multiple periods at an electrical angle of the motor. This configuration enables the electrical first variation component of the voltage of the smoothing capacitor to be calculated with the higher accuracy.

The following describes a correspondence relationship between the primary components of the respective embodiments described above and the primary components in the respective aspects of the present disclosure described in Summary. The motor 32, the inverter 34, the smoothing capacitor 39, the current sensors 32v and 32w, the electronic control unit 50 and the voltage sensor 39a of the embodiments respectively correspond to the "motor", the "inverter", the "smoothing capacitor", the "current sensor", the "control device", and the "voltage sensor" of the respective aspects.

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the driving system and so on.

What is claimed is:

1. A driving system, comprising:
a motor;
an inverter configured to drive the motor;
a power storage device connected with the inverter via a power line;
a smoothing capacitor mounted to the power line;
a voltage sensor configured to detect a voltage of the smoothing capacitor;
a current sensor configured to detect an electric current of each phase of the motor; and
a control device configured to control the inverter, based on a detected value of the current sensor, wherein
the control device performs Fourier series expansion of a detected value of the voltage sensor to calculate an electrical first variation component of the voltage of the smoothing capacitor, and
the control device controls the inverter, such that the electrical first variation component of the voltage of the smoothing capacitor becomes equal to a value 0.

2. The driving system according to claim 1,
wherein the control device controls the inverter by regulating an offset amount of the detected value of the current sensor, such that the electrical first variation component of the voltage of the smoothing capacitor becomes equal to the value 0.

3. The driving system according to claim 1,
wherein the control device calculates an electrical first variation component of a bus bar current or a bus bar power of the inverter, based on the electrical first variation component of the voltage of the smoothing capacitor, and
the control device controls the inverter, based on the calculated electrical first variation component of the bus bar current or the bus bar power of the inverter, such that the electrical first variation component of the voltage of the smoothing capacitor becomes equal to the value 0.

4. The driving system according to claim 3,
wherein the control device calculates the electrical first variation component of the bus bar current or the bus bar power of the inverter, based on the electrical first variation component of the voltage of the smoothing capacitor and a frequency characteristic of a circuit from the power storage device to the smoothing capacitor.

5. The driving system according to claim 3, further comprising:
a boost converter that is provided between the inverter along with the smoothing capacitor and the power storage device on the power line and that is configured to include switching elements of an upper arm and of a lower arm and a reactor, wherein
the control device calculates the electrical first variation component of the bus bar current or the bus bar power of the inverter, based on the electrical first variation component of the voltage of the smoothing capacitor and a frequency characteristic of a circuit from the power storage device to the smoothing capacitor, when the upper arm is kept on.

6. The driving system according to claim 3, further comprising:

a second current sensor configured to detect an electric current of the power storage device, wherein
the control device performs Fourier series expansion of a detected value of the second current sensor to calculate an electrical first variation component of the electric current of the power storage device, and
the control device calculates the electrical first variation component of the bus bar current or the bus bar power of the inverter, based on the electrical first variation component of the voltage of the smoothing capacitor and the electrical first variation component of the electric current of the power storage device.

7. The driving system according to claim 3, further comprising:
a boost converter that is provided between the inverter along with the smoothing capacitor and the power storage device on the power line and that is configured to include switching elements of an upper arm and of a lower arm and a reactor; and
a third current sensor configured to detect an electric current of the reactor, wherein
the control device performs Fourier series expansion of a detected value of the third current sensor to calculate an electrical first variation component of the electric current of the reactor, and
the control device calculates the electrical first variation component of the bus bar current or the bus bar power of the inverter, based on the electrical first variation component of the voltage of the smoothing capacitor, the electrical first variation component of the electric current of the reactor and a duty command used to control the boost converter.

8. The driving system according to claim 3,
wherein the control device estimates an offset amount of the detected value of the current sensor, based on the electrical first variation component of the bus bar current or the bus bar power of the inverter,
the control device calculates a control current of each phase of the motor by correcting the detected value of the current sensor, such that the offset amount of the detected value of the current sensor becomes equal to a value 0, and
the control device controls the inverter, based on the calculated control current of each phase of the motor.

9. The driving system according to claim 3,
wherein when the control device controls the inverter in a pulse width modulation control mode,
the control device estimates an offset amount of the detected value of the current sensor, based on the electrical first variation component of the bus bar current or the bus bar power of the inverter, and
the control device controls the inverter with correcting a voltage command of each phase of the motor, such that the offset amount of the detected value of the current sensor becomes equal to a value 0.

10. The driving system according to claim 3,
wherein the inverter has switching elements of an upper arm and a lower arm with respect to each phase, and
when the control device controls the inverter in a rectangular wave control mode,
the control device estimates an offset amount of the detected value of the current sensor, based on the electrical first variation component of the bus bar current or the bus bar power of the inverter, and
the control drive controls the inverter with correcting a pulse width of the upper arm and the lower arm with respect to each phase, such that the offset amount of the detected value of the current sensor becomes equal to a value 0.

11. The driving system according to claim 4, wherein the control device uses an amplitude ratio and a phase difference between the bus bar current of the inverter and the voltage of the smoothing capacitor, as the frequency characteristic of the circuit from the power storage device to the smoothing capacitor.

12. The driving system according to claim 1, wherein when an electrical angular velocity of the motor is equal to or higher than a predetermined angular velocity and a modulation degree of an output voltage of the inverter is equal to or higher than a predetermined modulation degree,
the control device performs Fourier series expansion of the detected value of the voltage sensor to calculate the electrical first variation component of the voltage of the smoothing capacitor, and
the control device controls the inverter, such that the electrical first variation component of the voltage of the smoothing capacitor becomes equal to the value 0.

13. The driving system according to claim 1, wherein the control device calculates the electrical first variation component of the voltage of the smoothing capacitor by taking into account a frequency characteristic of the voltage sensor.

14. The driving system according to claim 1, wherein the control device performs Fourier series expansion of the detected value of the voltage sensor by using data of multiple periods at an electrical angle of the motor.

* * * * *